(12) United States Patent
Ueda et al.

(10) Patent No.: US 7,336,708 B2
(45) Date of Patent: Feb. 26, 2008

(54) HIGH-EFFICIENCY ENCODER AND VIDEO INFORMATION RECORDING/REPRODUCING APPARATUS

(75) Inventors: Tomohiro Ueda, Nagaokakyo (JP);
Takashi Itow, Nagaokakyo (JP);
Yoshinori Asamura, Nagaokakyo (JP);
Ken Onishi, Nagaokakyo (JP);
Hidetoshi Mishima, Nagaokakyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 727 days.

(21) Appl. No.: 10/372,212

(22) Filed: Feb. 25, 2003

(65) Prior Publication Data

US 2003/0138044 A1  Jul. 24, 2003

Related U.S. Application Data

(62) Division of application No. 09/271,458, filed on Mar. 18, 1999, now Pat. No. 6,870,884, which is a division of application No. 09/113,287, filed on Jul. 10, 1998, now Pat. No. 5,909,252, which is a division of application No. 08/559,488, filed on Nov. 15, 1995, now Pat. No. 5,841,474, which is a division of application No. 08/011,243, filed on Jan. 29, 1993, now Pat. No. 5,479,264.

(30) Foreign Application Priority Data

| Jan. 29, 1992 | (JP) | ................................... 4-013719 |
| Feb. 25, 1992 | (JP) | ................................... 4-037599 |
| Feb. 25, 1992 | (JP) | ................................... 4-037821 |
| Feb. 28, 1992 | (JP) | ................................... 4-043075 |

(51) Int. Cl.
| H04N 7/12 | (2006.01) |
| H04N 11/02 | (2006.01) |
| H04N 11/04 | (2006.01) |
| H04B 1/66 | (2006.01) |

(52) U.S. Cl. ................................. 375/240.08
(58) Field of Classification Search ............ None
See application file for complete search history.

(56) References Cited

U.S. PATENT DOCUMENTS

| 4,217,609 A * | 8/1980 | Hatori et al. ........... 375/240.13 |
| 4,520,401 A | 5/1985 | Takahashi |
| 4,651,206 A | 3/1987 | Ohki |

(Continued)

FOREIGN PATENT DOCUMENTS

DE  38 31 277 A1  3/1990

(Continued)

OTHER PUBLICATIONS

Yasuhiro Yamada, Electronics, pp. 37-42, Apr. 1991.

(Continued)

*Primary Examiner*—Nhon Diep
(74) *Attorney, Agent, or Firm*—Birch, Stewart, Kolasch & Birch, LLP

(57) ABSTRACT

In a high-efficiency encoder which performs motion-compensation prediction, an intra-field is set every n fields. The presence of a scene change is detected. When a scene change occurs, a reference picture of motion-compensation prediction is switched, or the field immediately after the scene change is set as an intra-field.

4 Claims, 56 Drawing Sheets

U.S. PATENT DOCUMENTS

| | | | |
|---|---|---|---|
| 4,689,673 A | 8/1987 | Ohki et al. | |
| 4,827,338 A | 5/1989 | Gerard | |
| 4,982,285 A * | 1/1991 | Sugiyama | 375/240.12 |
| 5,047,852 A | 9/1991 | Hanyu | |
| 5,089,888 A | 2/1992 | Zdepski | |
| 5,091,782 A | 2/1992 | Krause | |
| 5,132,792 A | 7/1992 | Yonemitsu | |
| 5,134,499 A * | 7/1992 | Sata et al. | 386/109 |
| 5,144,423 A | 9/1992 | Knauer | |
| 5,150,432 A * | 9/1992 | Ueno et al. | 382/250 |
| 5,231,484 A | 7/1993 | Gonzales | |
| 5,309,292 A | 5/1994 | Takakura | |

FOREIGN PATENT DOCUMENTS

| | | |
|---|---|---|
| EP | 0267581 | 5/1988 |
| EP | 0 289 960 A1 | 11/1988 |
| EP | 0353758 | 2/1990 |
| EP | 0434427 | 6/1991 |
| EP | 0 493 136 A2 | 7/1992 |
| EP | 0536630 | 4/1993 |
| JP | 02-174388 A | 7/1990 |
| JP | 02-192378 A | 7/1990 |
| JP | 139083 3 | 6/1991 |
| JP | 04-010788 A | 1/1992 |
| JP | 04-051688 A | 2/1992 |
| JP | 04-051689 A | 2/1992 |
| JP | 468989 A | 3/1992 |
| JP | 4318785 | 11/1992 |
| JP | 4326280 | 11/1992 |
| JP | 5111015 | 4/1993 |
| WO | WO 8702854 | 5/1987 |

OTHER PUBLICATIONS

Etoh et al., Digital Video Recording Technique, pp. 133-155.
Kamae et al., "Digital Image Communication," Oct. 31, 1985, Sangyo Tosho K.K..

* cited by examiner

Fig. 3
Prior Art

| ORDINAL MODE | DISCRIMINANT MODE | SELECTIVE BLOCK |
|---|---|---|
| INTRA MODE | X | INPUT BLOCK |
| PREDICTION MODE | INTRA MODE | INPUT BLOCK |
|  | PREDICTION MODE | DIFFERENCE BLOCK |

X: IRRESPECTIVE OF DISCRIMINANT MODE

Fig. 6
Prior Art

| | PREDICTIVE METHOD IN Fig.4 | | PREDICTIVE METHOD IN Fig.5 | |
|---|---|---|---|---|
| | IMAGE A | IMAGE B | IMAGE A | IMAGE B |
| 1st FIELD | 38.61 (dB) | 37.79 (dB) | 38.61 (dB) | 37.79 (dB) |
| 2nd FIELD | 37.17 (dB) | 36.64 (dB) | 37.17 (dB) | 36.50 (dB) |
| 3rd FIELD | 36.21 (dB) | 36.55 (dB) | 36.21 (dB) | 36.54 (dB) |
| 4th FIELD | 36.02 (dB) | 36.25 (dB) | 36.34 (dB) | 36.29 (dB) |
| AVERAGE S/N | 37.00 (dB) | 36.81 (dB) | 37.08 (dB) | 36.78 (dB) |
| DATA AMOUNT | 21.6 (Mbps) | 17.5 (Mbps) | 18.6 (Mbps) | 18.0 (Mbps) |

Fig. 19
Prior Art

| ITEM | D1 METHOD | D2 METHOD |
|---|---|---|
| TAPE | 19mm(OXIDE) | 19mm(METAL POWDER) |
| RECORDING BIT RATE | 227Mb/s | 127Mb/s |
| RECORDING WAVELENGTH<br>TRACK PITCH | 0.91μm<br>45μm | 0.85μm<br>39μm |
| NUMBER OF REPRODUCTION HEADS<br>DRUM DIAMETER<br>DRUM ROTATION SPEED | 4<br>75.0mm<br>150rps | 4<br>96.4mm<br>90rps |
| FEED SPEED OF TAPE<br>TRACK/FIELD<br>(525/60 METHOD) | 286.6mm/s<br>10 | 131.7mm/s<br>6 |
| MODULATION METHOD<br>ERROR-CORRECTION METHOD | SCRAMBLED NRZ<br>REED-SOLOMON<br>PRODUCT CODE | $M^2$<br>REED-SOLOMON<br>PRODUCT CODE |
| RECORDING TIME(13μm TAPE)<br>S/M/L | 13/41/94 MIN. | 32/94/208 MIN. |

Fig. 20
Prior Art

| ITEM | D1 METHOD | D2 METHOD |
|---|---|---|
| TRACK PITCH [μm] | 45 | 39 |
| TRACK WIDTH [μm] | 40 | 42 |
| RECORDING WAVELENGTH [μm] | 0.91 | 0.85 |
| TOTAL TRACK LENGTH [mm] | 170 | 150.78 |
| VIDEO TRACK LENGTH [mm] | 77.7×2 | 132.94 |
| AUDIO TRACK LENGTH [mm] | 2.6×4 | 4.01×4 |
| TRACK ANGLE [DEG.] | 5.4005 | 6.1296 |
| AZIMUTH ANGLE [DEG.] | 0 | +14.97,−15.03 |
| EFFECTIVE TAPE WIDTH [mm] | 16.0 | 16.1 |

Fig. 21
Prior Art

| ITEM | D1 METHOD | D2 METHOD |
|---|---|---|
| FEED SPEED OF TAPE [mm/s] | 286.588 | 131.700 |
| DRUM DIAMETER [mm] | 75.0 | 96.444 |
| DRUM ROTATION SPEED [rps] | 150/1.001 | 90/1.001 |
| NUMBER OF HEADS [SET] | 4 | 4 |
| CONTACT ANGLE OF TAPE [DEG.] | 257 | 188 |
| RELATIVE SPEED [m/s] | 35.6 | 27.4 |

NOTE: FOR NTSC SIGNAL

Fig. 22
Prior Art
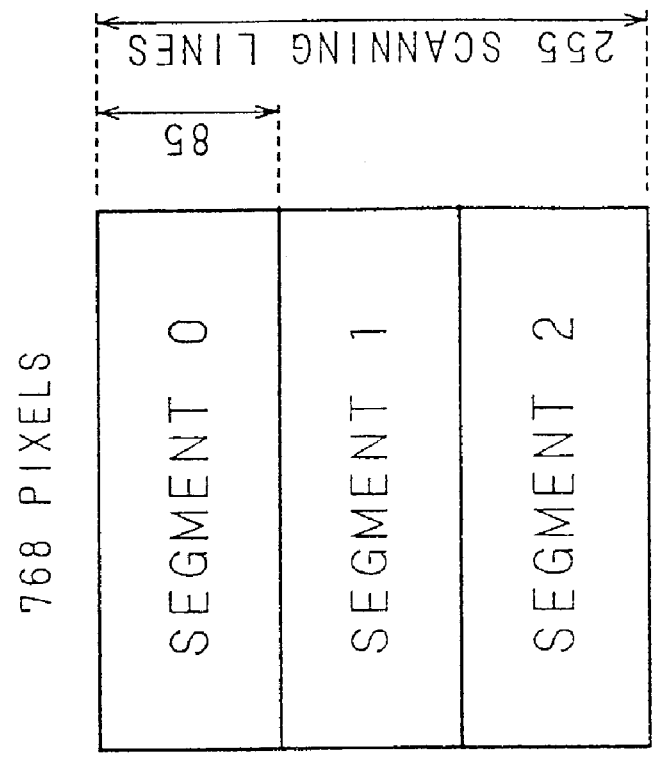
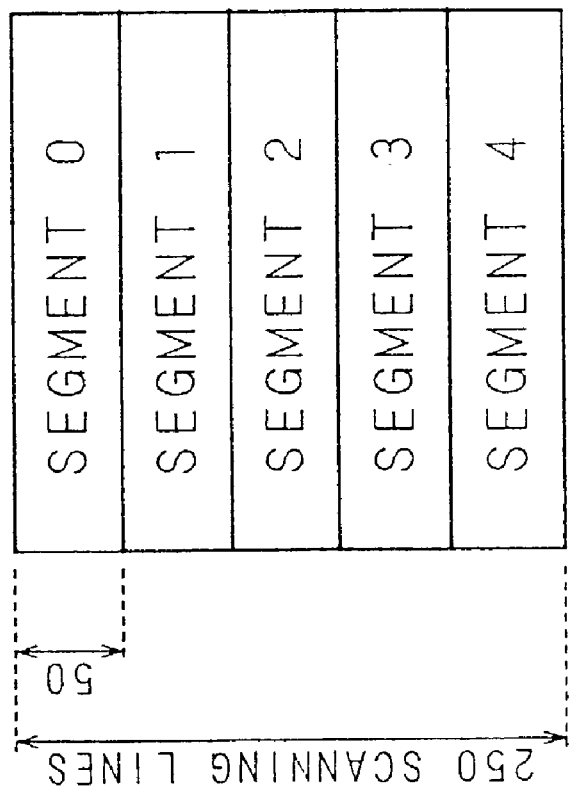

Fig. 29

|  | S/N [dB] | | | | DATA AMOUNT [Mbps] |
| --- | --- | --- | --- | --- | --- |
|  | 1st FIELD | 2nd FIELD | 3rd FIELD | 4th FIELD | |
| METHOD 1 | 38.61 | 37.17 | 36.21 | 36.33 | 23.83 |
| METHOD 2 | 38.61 | 37.17 | 36.21 | 36.34 | 24.26 |
| METHOD 3 | 38.61 | 37.17 | 36.21 | 36.34 | 20.83 |

Fig. 30

| | S/N [dB] | | | | DATA AMOUNT [Mbps] |
|---|---|---|---|---|---|
| | 1st FIELD | 2nd FIELD | 3rd FIELD | 4th FIELD | |
| METHOD 1 | 37.79 | 36.50 | 36.54 | 36.54 | 19.27 |
| METHOD 2 | 37.79 | 36.50 | 36.54 | 36.25 | 19.24 |
| METHOD 3 | 37.79 | 36.50 | 36.54 | 36.29 | 19.64 |

Fig. 41

| ORDINAL MODE | SC DETECTION | DISCRIMINANT MODE | SELECTIVE BLOCK |
|---|---|---|---|
| INTRA MODE | X | X | INPUT BLOCK |
| PREDICTION MODE | PRESENCE | X | INPUT BLOCK |
| | ABSENCE | INTRA MODE | INPUT BLOCK |
| | | PREDICTION MODE | DIFFERENCE BLOCK |

X: IRRESPECTIVE OF SC DETECTION AND DISCRIMINANT MODE

Fig. 45
ORDINAL MOTION-COMPENSATION　ORDINAL MOTION-COMPENSATION
　　　　PROCESS　　　　　　　　　　　　PROCESS
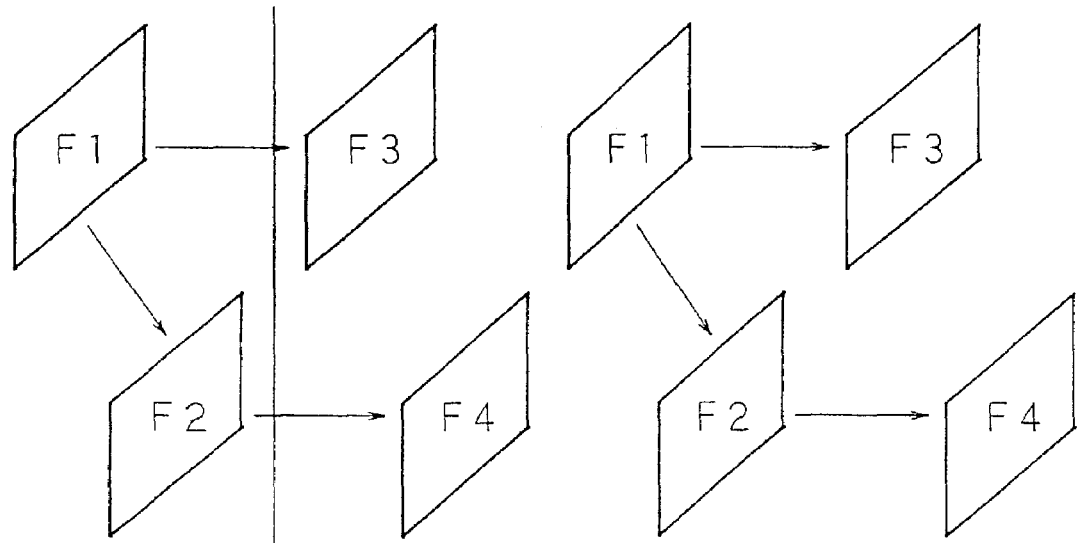
SCENE CHANGE
MOTION-　　　　　　MOTION-　　　　　　　MOTION-
COMPENSATION　　　COMPENSATION　　　　COMPENSATION
　PROCESS　　　　　　PROCESS　　　　　　　PROCESS
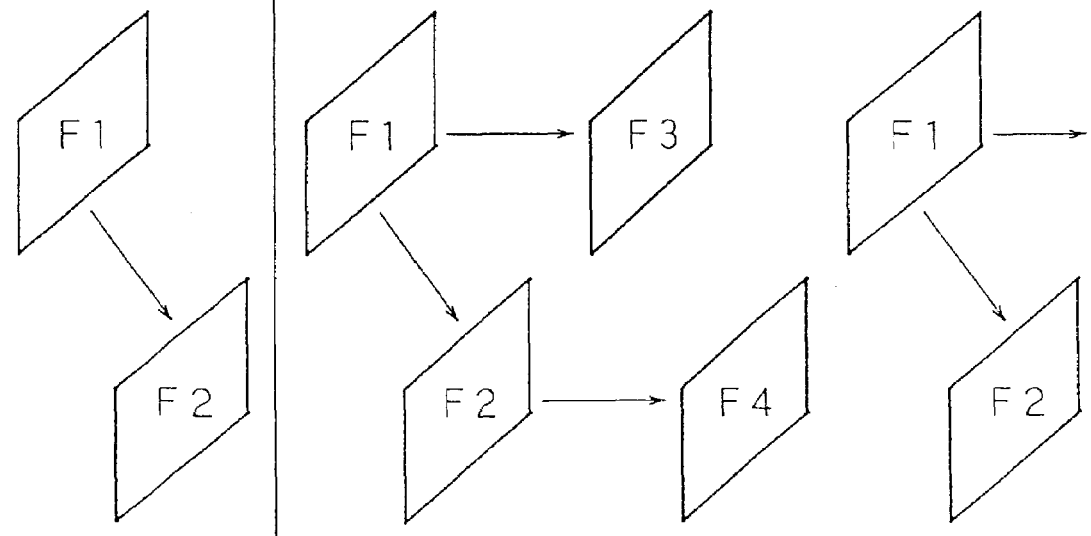

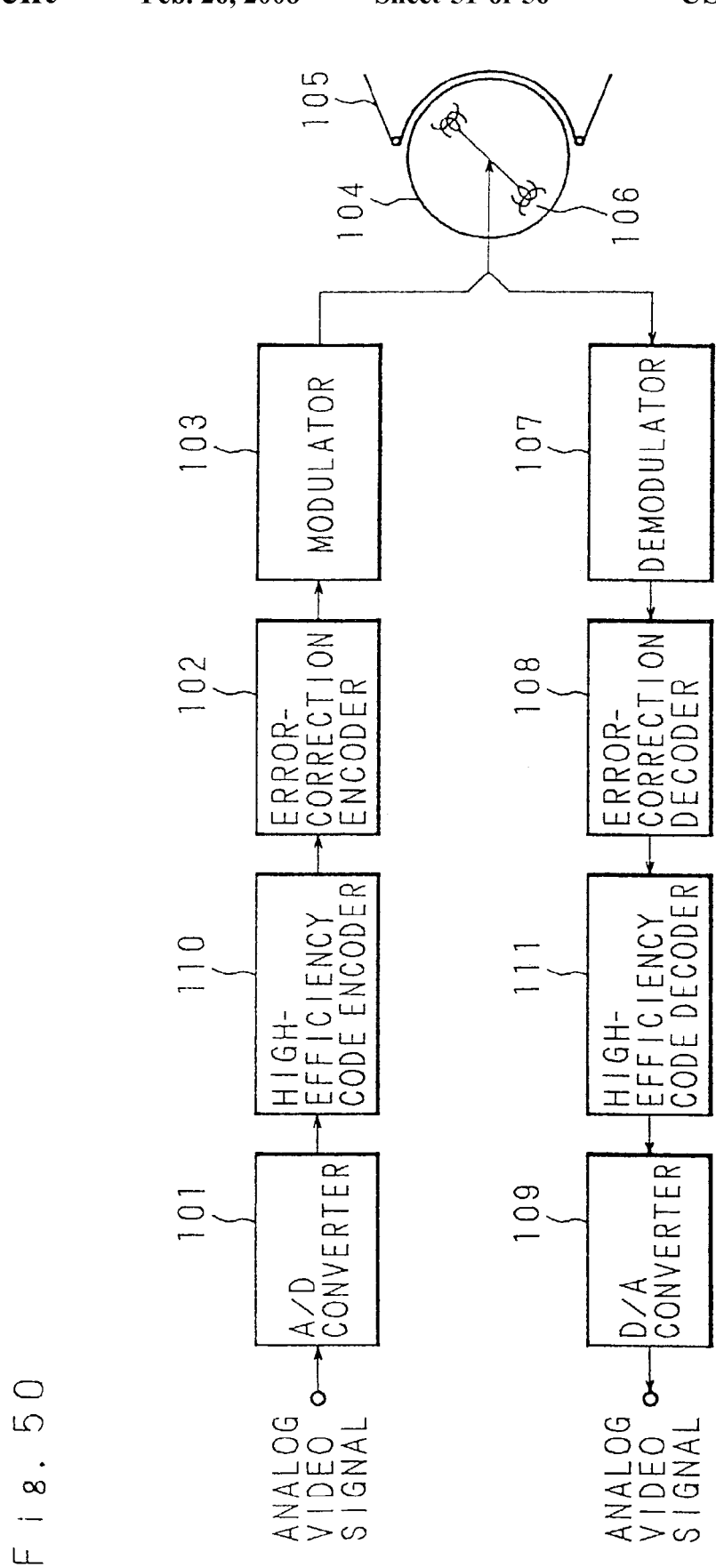

Fig. 51(b)

SIGNAL ALLOCATION ON TRACK

| AREA NAME | | SIGNAL NAME | CAPACITY (BYTE) | | | LENGTH (μm) | | | ANGLE (DEG.) | | |
|---|---|---|---|---|---|---|---|---|---|---|---|
| MARGIN 1 | | | | | 387 | | | 784 | | | 4.353 |
| | MAIN | PREAMBLE | 129 | | | 261 | | | 1.501 | | |
| | | SUB DATA | | 19,671 | 19,803 | | 39,857 | 40,124 | | 228.953 | 230.489 |
| | | POST AMBLE | 3 | | | 6 | | | 0.035 | | |
| GAP | | | | | 255 | | | 516 | | | 2.968 |
| | SUB | PREAMBLE | 129 | | 20,706 | 261 | | 41,954 | 1.501 | | 241.000 |
| | | SUB DATA | 516 | 648 | | 1,047 | 1,314 | | 6.006 | 7.542 | |
| | | POST AMBLE | 3 | | | 6 | | | 0.035 | | |
| MARGIN 2 | | | | | 255 | | | 516 | | | 2.968 |
| EFFECTIVE RECORDING AREA | | | | | | | | | | | |
| TOTAL | | | | | 21,348 | | | 43,254 | | | 248.321 |

HIGH-EFFICIENCY ENCODER AND VIDEO INFORMATION RECORDING/REPRODUCING APPARATUS

This application is a divisional of application Ser. No. 09/271,458, filed on Mar. 18, 1999, now U.S. Pat. No. 6,870,884 which is a divisional of application Ser. No. 09/113,287, filed Jul. 10, 1998, now U.S. Pat. No. 5,909,252 which is a divisional of application Ser. No. 08/559,488, filed Nov. 15, 1995, now U.S. Pat. No. 5,841,474 which is a divisional of application Ser. No. 08/011,243, filed on Jan. 29, 1993, now U.S. Pat. No. 5,479,264 the entire contents of which are hereby incorporated by reference and for which priority is claimed under 35 U.S.C. § 120; and this application claims priority of application Ser. No. 4-013719, 4-037599, 4-037821, and 4-043075 filed in Japan on Jan. 29, 1992; Feb. 25, 1992; Feb. 25, 1992 and Feb. 28, 1992 under 35 U.S.C. § 119.

BACKGROUND OF THE INVENTION

1. Field of the Invention

This invention relates to a digital signal recording/reproducing apparatus such as a video tape recorder (hereinafter, abbreviated as "VTR"), a video disk player and an audio tape recorder in which video and audio signals are recorded and reproduced in the digital form, and particularly to an apparatus which performs motion-compensation prediction on a video signal for compression-encoding.

2. Description of the Related Art

In a digital VTR for home use, data compression is indispensable in view of cost and hardware size. Hereinafter, therefore, data compression will be described taking mainly a digital VTR for home use as an example.

FIG. 1 is a schematic block diagram showing the structure of a digital VTR for home use. The reference numeral 900 designates an input terminal through which an analog video signal such as a television signal is input. The reference numeral 901 designates an A/D converter which converts the analog video signal into a digital video signal, 902 designates a data compressor which compresses the digital video signal to reduce the information amount of the signal, 903 designates an error-correction encoder which adds error-correcting codes to the coded signal so that errors are corrected in the reproduction, 904 designates a recording modulator which, in order to perform the recording, modulates the signal to codes suitable for the recording, 905 designates a recording amplifier which amplifies the record signal, and 906 designates a magnetic tape on which the record signal is recorded to be stored. The reference numeral 907 designates a head amplifier which amplifies a signal reproduced from magnetic tape 906, 908 designates a reproduction demodulator which demodulates the reproduced signal, 909 designates an error-correction decoder which performs error-correction on the reproduced and demodulated signal using the error-correcting codes, 910 designates a data expander which reconstructs the compressed data to its original form, 911 a D/A converter which converts the digital video signal into an analog video signal, and 912 designates an output terminal.

Next, the data compressor (high-efficiency encoder) 902 will be described. FIG. 2 is a block diagram of the high-efficiency encoder which employs one-way motion-compensation inter-frame prediction. The reference numeral 1 designates an input terminal for a digital video signal, 2 designates a blocking circuit which segments the input digital video signal, 3 designates a subtracter which outputs as a difference block a difference signal between an input block and a prediction block, 4 designates a difference power calculator which calculates the power of the difference block, 5 designates an original power calculator which calculates the AC power of the input block, 6 designates a determiner which compares the difference power with the original AC power to determine whether the current mode is a prediction mode or an intra mode, 7 designates a first switch which selectively outputs an encoded block in accordance with the determined mode, 8 designates a DCT circuit which performs on the encoded block the discrete cosine transform (hereinafter, abbreviated as "DCT") that is an orthogonal transform, 9 designates a quantizing circuit which quantizes a DCT coefficient, 10 designates a first encoder which performs the coding suitable for a transmission path, and 11 designates the transmission path.

Reference numeral 12 designates an inverse quantizing circuit which performs inverse-quantization on the quantized DCT coefficient, 13 designates an inverse DCT circuit which performs the inverse DCT on the inverse-quantized DCT coefficient, 14 designates an adder which adds a prediction block to the decoded block that is an output signal of the inverse DCT circuit 13 to generate an output block, 15 designates a video memory which stores output blocks in order to perform motion-compensation prediction, 16 designates an MC circuit which performs motion estimation from a motion-compensation search block segmented from a past image stored in the video memory 15 and the current input block, and performs motion-compensation prediction, 17 designates a MIX circuit which combines a motion vector with a mode signal determined by the determiner 6, 18 designates a second encoder which codes the output of the MIX circuit 17, and 19 designates a second switch which switches the prediction blocks in accordance with the mode determined by the determiner 6. The difference power calculator 4, original power calculator 5, determiner 6, inverse quantizing circuit 12, inverse DCT circuit 13, adder 14, video memory 15, MC circuit 16 and second switch 19 constitute a local decoding loop 20.

Then, the operation will be described. Irrespective of an intra-field in which motion-compensation prediction is not performed or a prediction-field (inter-field) in which motion-compensation prediction is performed, input digital video signals are divided by the blocking circuit 2 into input blocks in the unit of m [pixels]×n [lines] (where m and n are positive integers), and segmented. In order to obtain a difference block, the subtracter 3 calculates the difference in the unit of pixel between an input block and a prediction block. Then, the input block and the difference block are input into first switch 7. The difference power calculator 4 calculates the difference power of the difference block. On the other hand, the original power calculator 5 calculates the original AC power of the input block. The two calculated powers are compared with each other by the determiner 6 to control the first switch 7 so that the block having the smaller power is selected as the encoding subject. More specifically, when the difference power is smaller than the original AC power, the determiner 6 outputs a prediction mode signal, and in contrast with this, when the original AC power is smaller than the difference power, the determiner 6 outputs an intra mode signal.

The first switch 7 outputs the input block or the difference block as an encoded block in accordance with the mode signal determined by the determiner 6. When the processed image is in the intra-field, however, the first switch 7 operates so that all of the encoded blocks are output as input blocks. FIG. 3 illustrates this switching operation. The ordinary mode is a mode where, in a step of motion-compensation prediction which is completed in four fields as shown in FIG. 4, first field F1 of the four fields is always an intra-field and the succeeding second, third and fourth fields F2, F3 and F4 are prediction-fields.

The encoded block selected by the first switch 7 is converted into DCT coefficients by the DCT circuit 8, and then subjected to the weighting and threshold processes in the quantizing circuit 9 to be quantized to predetermined bit numbers respectively corresponding to the coefficients. The quantized DCT coefficients are converted by the first encoder 10 into codes suitable for the transmission path 11 and then output to the transmission path 11.

The quantized DCT coefficients also enter into the local decoding loop 20, and the image reproduction for next motion-compensation prediction is performed. The quantized DCT coefficients which have entered into the local decoding loop 20 are subjected to the inverse weighting and inverse quantizing processes in the inverse quantizing circuit 12. Then, the DCT coefficients are converted into a decoded block by inverse DCT circuit 13. The adder 14 adds the decoded block to a prediction block in the unit of pixel to reconstruct the image. This prediction block is the same as that used in the subtracter 3. The output of the adder 14 is written as an output block in a predetermined address of the video memory 15. The memory capacity of the video memory 15 depends on the type of the employed predictive method. Assuming that the video memory 15 consists of a plurality of field memories, the reconstructed output block is written in a predetermined address. A block which is segmented from an image reconstructed from past output blocks and is in the motion estimation search range is output from the video memory 15 to the MC circuit 16. The size of the block in the motion estimation search range is i [pixels]×j [lines] (where i≧m, j≧n, and i and j are positive integers). Data in the search range from the video memory 15 and an input block from the blocking circuit 2 are input to the MC circuit 16 as data, thereby extracting motion vectors. As a method of extracting motion vectors, there are various methods such as the total search block matching method, and the tree search block matching method. These methods are well known, and therefore their description is omitted.

The motion vectors extracted by the MC circuit 16 are input to the MIX circuit 17, and combined therein with the mode signal determined by the determiner 6. The combined signals are converted by the second encoder 18 into codes suitable for the transmission path 11, and then output together with the corresponding encoded block to the transmission path 11. The MC circuit 16 outputs as a prediction block signals which are segmented from the search range in the size (m [pixels]×n [lines]), which is equal to that of the input block. The prediction block to be output from the MC circuit 16 is produced from past video information. The prediction block is supplied to second switch 19, and output from the respective output terminal of the switch in accordance with the field of the currently processed image and the mode signal of the decoded block. Namely, the prediction block is output from one of the output terminals of the second switch 19 to the subtracter 3 in accordance with the processed field, and from the other output terminal in accordance with the mode signal of the current decoded block and the processed field.

As a predictive method used in such a circuit block, for example, the method shown in FIG. 4 may be employed. In this method, an intra-field is inserted after every three fields, and the three intermediate fields are set as prediction-fields. In FIG. 4, first field F1 is an intra-field, and the second, third and fourth fields F2, F3 and F4 are prediction-fields. In the prediction by this method, second field F2 is predicted from first field F1 which is an intra-field, third field F3 is predicted in a similar manner from first field F1, and fourth field F4 is predicted from reconstructed second field F2.

Initially, first field F1 is blocked in the field and subjected to the DCT. Then, first field F1 is subjected to the weighting and threshold processes and quantized, and thereafter encoded. In the local decoding loop 20, the quantized signals of first field F1 are decoded or reconstructed. The reconstructed image is used in motion-compensation prediction for second and third fields F2 and F3. Then, motion-compensation prediction is performed on second field F2 using first field F1. After the obtained difference block is subjected to the DCT, encoding is performed in a similar manner as in first field F1. In this case, when the AC power of the input block is smaller than the power of the difference block, the input block in place of the difference block is subjected to the DCT, and thereafter encoding is performed in a similar manner as in first field F1. Second field F2 is decoded and reconstructed in the local decoding loop 20 in accordance with the mode signal of each block, and then used in motion-compensation prediction for fourth field F4. In a similar manner as in second field F2, using first field F1, motion-compensation prediction and encoding are performed on third field F3. Motion-compensation prediction is performed on fourth field F4 using second field F2 reconstructed in the video memory 15, and then, fourth field F4 is encoded in a similar manner as in third field F3. Also in third and fourth fields F3 and F4, when the AC power of the input block is smaller than the power of the difference block, the input block in place of the difference block is subjected to the DCT, and thereafter encoding is performed in a similar manner as in first field F1.

For example, the digital VTR for home use shown in FIG. 1 is expected to achieve the high image quality and high tone quality. In order to realize this, it is essential to improve data compression, i.e., performance of high-efficiency encoder. Therefore, there arise following problems in the above-described conventional predictive method.

In such a predictive method, since motion-compensation prediction is performed using the video data of the one preceding field or frame, there arises a first problem that the capacity of the field memory or frame memory is increased and the hardware is enlarged in size.

In the conventional predictive method, when a scene change once occurs in the unit of frame, it is difficult during encoding of the image after the scene change to perform the compression according to motion-compensation prediction from the reference picture which was obtained before the scene change, thereby causing a second problem that the total amount of codes is increased. If the inter-frame motion-compensation prediction is performed on the whole sequentially in the temporal direction, it may be possible to suppress the increase in the data amount to a minimum level even when a scene change occurs. In the case of encoding interlace images without scene change and with less motion, however, there is a tendency that the data amount is increased as a whole. In a predictive method in which third and fourth fields F3 and F4 are adaptively switched from first, second and third fields F1, F2 and F3 as shown in FIG. 5, there is a drawback that the capacity of the field memory or frame memory is increased and the hardware is enlarged in size. FIG. 6 shows the data amount and S/N ratio of a luminance signal, for example, when an image A with scene changes is processed by the predictive method of FIG. 4 or the predictive method of FIG. 5. In the image A, a scene change occurs in the unit of frame. FIG. 6 also shows the data amount and S/N ratio of a luminance signal in when an image B without scene changes is processed by the predictive method of FIG. 4 or the predictive method of FIG. 5. In this case, for the image A with scene changes, the predictive method of FIG. 5 is advantageous, and, for the image B without scene changes, the predictive method of FIG. 4 is advantageous.

In the case that the encoding is done by performing prediction as in the prior art, FIGS. 4 and 5 there is a third problem that, when a scene change occurs in a step of a motion-compensation prediction process, the quality of the image immediately after the scene change is deteriorated. This problem is caused owing to the scene change, by motion-compensation prediction which unsatisfactorily performs time correlation, thereby increasing the information amount being generated. The information amount generated in this way can compare with the level of the information amount of a usual intra-field. For the generated information amount, the field having this information amount is used as the prediction-field, and therefore, the information amount is compressed to the level of the information amount of the prediction-field, resulting in the image quality of the field after a scene change being substantially deteriorated. FIG. 7 shows a change of the information amount of images for five seconds when encoding is performed by a conventional predictive method. In this case, the average for five seconds is less than 20 [Mbps], but a scene change exists as a position A, thereby increasing the information amount. The change of the S/N ratio in this case is shown in FIG. 8. Although there is no great deterioration in the portion of the scene change, the decrease of the information amount makes the S/N ratio deteriorated. When that field is used in the next motion-compensation prediction, it is necessary to perform motion-compensation prediction on the image with the deteriorated image quality and the reduced time correlation, the result being that the information amount being generated is again increased. This vicious cycle continues until the next refresh field is processed. If deterioration of the image quality occurs in this way, even though it is immediately after a scene change, that means a digital video recording/reproducing apparatus, which is required to have a high image quality, fails to perform up to this level of quality.

As conventional VTRs for home use of helical scanning type, there are VHS type, β type and 8-mm type VTRs. Hereinafter, a VTR of 8-mm type will be described as an example of a prior art. FIG. 9 is a diagram showing the tape format according to the 8-mm VTR standard, and FIG. 10 is a diagram showing the format of one track. FIG. 11 is a diagram showing the relationship between a rotary head drum and a magnetic tape wound around it, and FIG. 12 is a graph showing the frequency allocation of each signal according to the 8-mm VTR standard. In an 8-mm VTR for the NTSC system or PAL system, a video signal is recorded by a color undermethod which is a basic recording method for VTRs for home use. The luminance signal is frequency-modulated with a carrier of 4.2 to 5.4 MHz, chroma signal subcarrier is converted into a low frequency signal of 743 kHz, and the two signals are subjected to the frequency multiplex recording. The recording format on a tape is as shown in FIG. 9. All signals required for a VTR at least including a video signal (luminance signal, color signal), audio signals and tracking signals are subjected to the frequency multiplex recording by rotary video head.

In FIG. 9, magnetic tracks 401 and 402 of a video signal track portion 410 are tracks for a video signal, and each corresponds to one field. Magnetic tracks 403 and 404 indicated with oblique lines in an audio signal track portion 411 are magnetic tracks for audio signals. A cue track 405 and audio track 406 for a fixed head are respectively set on the both edges of the tape. Since the control track on the tape edge is not used in an 8-mm VTR, this track can be used as the cue track for performing specific point searching, addressing the contents of recording or the like. The width of one track (track pitch) is 20.5 μm, and is slightly greater than that in the economy recording mode of β type and VHS type (19.5 μm in β–7, 19.2 μm in the 6-hour mode of VHS). No guard band for preventing a crosstalk from occurring is set between tracks. Instead, azimuth recording using two heads is employed in order to suppress a crosstalk.

Next, a specific example of the operation of a conventional apparatus will be described with reference to FIGS. 13 to 16. FIG. 13 is a block diagram of a conventional VTR. A video signal given to a video signal input terminal 201 is supplied to a video signal processing circuit 203 and also to a synchronizing signal separating circuit 204. The output signal of the video signal processing circuit 203 is fed through gate circuits 205 and 206 to adders 213 and 214. In contrast, a vertical synchronizing signal which is an output of the synchronizing signal separating circuit 204 is supplied to delay circuits 207 and 208. The Q output of the delay circuit 207 which combines with the synchronizing signal separating circuit 204 to constitute head switch pulse generation means is supplied as a gate pulse to the first gate circuit 205 and also to a fourth gate circuit 212 which will be described later. The $\overline{Q}$ output is supplied as a gate pulse to the second gate circuit 206 and also to a third gate circuit 211 which will be described later. The output signal of the delay circuit 208 is supplied to a time-base compressing circuit 209 and also to an erasing current generator 240.

An audio signal given to an audio signal input terminal 202 is supplied through the time-base compressing circuit 209, a modulating circuit 210 and a switch 241 for switching between the recording and the erasing, to the third and fourth gate circuits 211 and 212. The output of the erasing current generator 240 is supplied through the switch 241 to the third and fourth gate circuits 211 and 212. The output signals of the third and fourth gate circuits 211 and 212 are supplied to the adders 213 and 214, respectively. The output signal of the adder 213 is given to a rotary transformer 217 through a changeover switch 215 for switching between the recording and the erasing. The output signal of the rotary transformer 217 is given to a rotary magnetic head 221 through a rotation shaft 219 and a rotary head bar 220, so that a recording current or an erasing current flows into a magnetic tape 223.

The output signal of the adder 214 is given to a rotary transformer 218 through a switch 216 which is used for switching between recording and the erasing and is interlocked with the switch 215. The output signal of the rotary transformer 218 is given to another rotary magnetic head 222 through the rotation shaft 219 and the rotary head bar 220, so that a recording current or an erasing current flows into the magnetic tape 223. The magnetic tape 223 is guided by guide posts 224 and 225 placed on the either sides of a table guide drum 226 which has rotary magnetic heads 221 and 222 built in, and is run at a constant speed in the direction of arrow 227, by a well known magnetic tape running device (not shown) which consists of capstans and pinch rollers. The table guide drum 226 may have a well known structure, and therefore its specific description is omitted.

In the reproduction process, a signal reproduced by the rotary magnetic head 221 is supplied to a separating circuit 228 through the rotary head bar 220, the rotation shaft 219, the rotary transformer 217 and the switch 216. On the other hand, a signal reproduced by the rotary magnetic head 222 is supplied to a separating circuit 229 through the rotary head bar 220, the rotation shaft 219, the rotary transformer 218 and the switch 216. One of the outputs of the separating circuit 228 and one of the outputs of the separating circuit 229 are supplied to an adder 230. The other output of the separating circuit 228 and the other output of the separating circuit 229 are supplied to an adder 231. The output signal of the adder 230 is supplied to a video signal output terminal 233 through a video signal processing circuit 232. In contrast, the output signal of the adder 231 is supplied to an audio signal output terminal 237 through time-base correcting circuit 234, a demodulating circuit 235 and a time-base expanding circuit 236.

Then, the operation will be described. A video signal given to the video signal input terminal 201 is converted into an FM signal by the video signal processing circuit 203. When the video signal includes a chrominance signal, the chrominance signal is converted into a low frequency signal of less than about 1.2 MHz. There will be no problem that, for example, the phase of the chrominance signal is shifted by 90 deg. or inverted every 1 H (horizontal scanning interval) as means for eliminating an adjacent color signal. This is a technique of eliminating a crosstalk between tracks with using the line correlation of chrominance signal. Such processed video signal is supplied to first and second gate circuits 205 and 206.

On the other hand, since the video signal is given also to the synchronizing signal separating circuit 204, a vertical synchronizing signal is obtained at the end of the output of the circuit. The vertical synchronizing signal is supplied to the delay circuits 207 and 208. The delay circuit 207 has functions of dividing an input signal into a half frequency and delaying a signal. From the ends of Q and $\overline{Q}$ outputs of the delay circuit 207, pulse signals Q and $\overline{Q}$ for switching the heads and shown in FIGS. 14(b) and 14(c) are supplied to the first and second gate circuits 205 and 206, respectively. In order to clarify the relationship in phase between these pulse signals Q and $\overline{Q}$ and the input video signal, the waveform of the input video signal is shown in FIG. 14(a). From the ends of outputs of first and second gate circuits 205 and 206, the processed video signals are output as shown in FIGS. 15(a) and 15(b) during the periods in which the pulse signals Q and $\overline{Q}$ are at H level. These signals are added to a modulated compressed audio signal and erasing signal which will be described later, by adders 213 and 214, and then supplied to switches 215 and 216. The compressed audio signal is subjected to modulation suitable for the tape and head system (preferably, the pulse code modulation (PCM), or FM, PM, AM or the like, or in certain cases, the non-modulation AC bias recording), by the modulating circuit 210. Particularly, PCM is advantageous because a high S/N ratio can be expected and well known error correction means can be used for the drop-out, etc. The modulated compressed audio signal is given through the switch 241 to the third and fourth gate circuits 211 and 212 to which the pulse signals Q and $\overline{Q}$ are respectively supplied. These gate circuits 211 and 212 output the compressed audio signal to the adders 213 and 214 during the periods in which the pulse signals Q and $\overline{Q}$ are at H level.

The erasing current generator 240 generates an erasing current of a certain frequency (for example, 100 kHz). The timing of starting the oscillation of the erasing current is controlled by a trigger signal T which is obtained by delaying the vertical synchronizing signal in the delay circuit 208. The erasing current is output through the switch 241 to the third and fourth gate circuits 211 and 212 to which the pulse signals Q and $\overline{Q}$ are respectively supplied, and supplied to the adders 213 and 214. In the same manner as the recording of compressed audio signals, during the periods in which $\overline{Q}$ pulse signals $\overline{Q}$ and Q are at H level. FIGS. 16(a) and 16(b) shows the waveforms of the output currents of the adders 213 and 214, i.e., time-multiplexed signals of a processed video signal A and a processed audio signal B or the erasing signal. These signals are supplied via the above-mentioned paths to the rotary magnetic heads 221 and 222, whereby the magnetic pattern of a tape shown in FIG. 9 is obtained.

During the reproduction process, the moving contacts of the switches 215 and 216 are positioned at fixed contacts P. This allows the two-channel reproduction signal reproduced by the rotary magnetic heads 221 and 222 to be respectively transmitted through the rotary head bar 220, the rotation shaft 219, the rotary transformers 217 or 218 and the switches 215 or 216, and to be respectively separated into a video signal and an audio signal on the time-base in separating circuits 228 and 229. The separated video signals are converted by the adder 230 into a one-channel video signal which is continuous in terms of time, and then supplied to the video signal processing circuit 232. The video signal processing circuit 232 reconstructs the original video signal from the input signal, and outputs the reconstructed signal to the video signal output terminal 233. On the other hand, the separated audio signals are converted into a one-channel of signal by the adder 231, and then supplied to the time-base correcting circuit 234. The time-base correcting circuit 234 consists of a semiconductor memory device such as a CCD (charge-coupled device) and a BBD (bucket brigade device), and eliminates time-base variations (so-called jitter and skew distortion) of the tape and head system. The output signal of the time-base correcting circuit 234 is demodulated to the original compressed audio signal by the demodulating circuit 235. The demodulated signal is then converted into the original audio signal by the time-base expanding circuit 236 consisting of a semiconductor memory device such as a CCD and a BBD, and output to the audio signal output terminal 237.

As described above, in an 8-mm VTR, video signals and audio signals for one field are recorded on and reproduced from one track on a tape.

FIG. 17 is a block diagram showing the configuration of a conventional video information recording/reproducing apparatus. In FIG. 17, a digital VTR of the D2 or D2 method which is used for business or broadcasting use is shown. The reference numeral 101 designates an A/D converter which converts an analog video signal into a digital video signal, 102 designates an error-correction encoder which adds error-correcting codes, 103 designates a modulator which modulates the digital signal to a signals suitable for the recording on a magnetic tape, 104 designates a rotary head drum, 105 designates a magnetic tape, 106 designates magnetic head for recording and reproduction, 107 designates a demodulator which demodulates the reproduced signal, 108 designates an error-correction decoder which detects and corrects a transmission error, and 109 designates a D/A converter which converts the digital video signal into an analog video signals.

FIG. 18 shows the tape formats of the two methods. In the both methods, a video signal and a 4-channel audio signal are recorded in different positions in the same track. In the D2 method, an audio signal is recorded in the center of a track, and, in the D2 method, at the ends of a track. When a video signal and an audio signal are recorded in the same track, components such as a magnetic head and an amplifying circuit which are necessary for recording and reproducing can be used in common for a video signal and an audio signal, and furthermore, a parity code required for the error correction as described later and a circuit for generating the parity code can be used in common.

FIG. 19 shows the overall specifications of the D1 and D2 methods, FIG. 20 shows the specifications of the tape formats, and FIG. 21 shows the specifications of the tape running systems. The area recording density with guard bands being taken into account is 21.5 $\mu m^2$/bit in the D1 method, and 16.6 $\mu m^2$/bit in the D2 method. In the D1 method, guard bands are set between recording tracks, but, in the D2 method, guard bands do not exist. As a result, the track density of the D2 method is higher than that of the D1 method by about 15%, which contributes to the long-time recording by the D2 method. On the other hand, when guard bands do not exist, it is more likely to reproduce a signal of an adjacent track in addition to a signal of the track originally intended to be reproduced. In order to cope with this crosstalk between tracks in the reproduction process, the D2 method employs the azimuth recording system. Generally, a recording magnetic head and a reproduction magnetic head are so positioned that their head gaps form the equal angle with a magnetic track. If the two head gaps are arranged so as to form an angle with each other, the level of a reproduced signal shows an attenuation characteristic. The azimuth angle $\theta$ in the D2 method is about ±15 deg. as shown in FIG. 20. As a result, even if a signal from an adjacent track is mixed in signals, to be reproduced the unnecessary component is attenuated. Accordingly, even if guard bands do not exist, the effect of the crosstalk is reduced. Since the loss due to the azimuth angle cannot be expected for DC components, however, signals to be recorded are required to have no DC component. Therefore, the D2 method employs a modulation system which does not include DC components.

In a digital recording, it is not necessary to record a video signal during the entire period. In a blanking interval, a video signal has a constant waveform irrespective of the contents of an image. Since this waveform can be synthesized after the reproduction, in both the D1 and D2 methods, the recording is performed only during the effective video period. Also a color burst signal appearing in a blanking interval of an NTSC signal can be synthesized after the reproduction. This is because the sampling phase in the D2 method is set to the I and Q axes and the phase of the color burst (lagging behind Q axis by (180+33) deg.) can be determined using a reproduced sampling clock.

FIG. 22 shows the ranges in which pixels can be actually recorded in the D1 and D2 methods. These effective pixels are divided into several segments. In the D1 method, pixels of 50 scanning lines constitute one segment, and, in the D2 method, pixels of 85 scanning lines constitute one segment. In other words, pixels of one field constitute five segments in the D1 method, and three segments in the D2 method.

When a video signal in a segment is to be recorded, it is divided into four channels in the D1 method, and into two channels in the D2 method. As a result, the number of pixels per one channel of one segment is $\{(720+360\times2)/4\}\times 50=360\times50=18,000$ in the D1 method and $(768/2)\times85=384\times 85=32,640$ in the D2 method. Channels are distributed so that they are uniformly dispersed on a screen. Accordingly, even when the characteristics of a specific channel are deteriorated, code errors caused by this deterioration are not concentrated on one portion of the screen so as to be inconspicuous. Therefore, the effect of correction on errors which have not been corrected is also enormous.

In both the D1 and D2 methods, two kinds of error-correction codes which are respectively called an outer code and an inner code are used together. In an actual process of generating outer and inner codes, an operation of rearranging the sequence of the codes is performed. This operation is called shuffling. The shuffling disperses the effect of code errors, improves the correction capability, and reduces the display deterioration caused by errors which have not been corrected. The shuffling process consists of the shuffling for one scanning line which is performed before the generation of an outer code, and the shuffling which is performed in one sector after the addition of an outer code and before the generation of an inner code. As described above, in a VTR of the D1 or D2 method, video signals and audio signals for one field are recorded in a plurality of tracks on a tape.

In order to record all information of standard television signals of currently used NTSC and PAL systems, in a VTR for home use, the carrier frequency of an FM luminance signal is raised and the bandwidth and deviation are increased so as to improve the resolution and C/N ratio. However, a VTR for home use still fails to match with a VTR for business use in S/N ratio, waveform reproducibility, etc. The down sizing of a VTR is highly expected to be achieved, and, there are demands for further improvement in performance as well as realization of VTR which is light and compact. Hence, it is difficult to attain the desired performance by only improving the present techniques. On the other hand, in the field of VTRs for business use and broadcasting use, rapid advance in digitalization of an apparatus has been made to achieve multifunction and high performance in the apparatuses, and most of VTRs for broadcasting use are replaced with digital VTRs. However, a digital VTR consumes a large amount of tape, which obstacles to achieve prolongation of the recording time and the down sizing.

Recently, in view of the redundancy of information contained in an image, studies on compressing recorded information have been actively conducted, and the application of the results of these studies to a VTR is being examined. It is expected to realize a VTR which is compact and light, has high image quality and can operate long-time by achieving high image quality, and reduction of tape consumption due to high density recording and information compression which are inherent in the digital recording.

FIG. 23 shows a communication apparatus of a high-efficiency encoded video information compression method (according to CCITT H. 261, etc.) which is used in the field of communication including a video telephone and a video conference. The reference numeral 101 designates an A/D converter which converts an analog video signal into a digital video signal, 110 designates a high-efficiency code encoder which compression-encodes a video signal, 112 designates a buffer memory which is used for delivering generated compressed codes at a constant speed, 102 designates an error-correction encoder which adds error-correcting codes, 103 designates a modulator which modulates the digital signal to a transmission signal suitable for the communication, 114 designates a transmission path, 107 designates a demodulator which demodulates a received signal to a digital signal, 108 designates an error-correction decoder which detects and corrects a transmission error, 113 designates a buffer memory which is used for supplying compressed codes that have been received at a constant speed, in accordance with the request from the next stage, 111 designates a high-efficiency code decoder which expands the compressed video signal to the original signal, and 109 designates a D/A converter which converts the digital video signal into an analog video signal.

The redundancy of an input video signal always varies, and therefore, the amount of codes which are compression-coded using this redundancy also varies. However, the amount of information which can be transmitted through the transmission path 114 is limited. In order to exhibit the best of the performance, the variation of the code amount is buffered using the buffer memory 113, and the information amount is controlled to be within a predetermined range so that overflow or underflow of a memory does not occur. FIG. 24 shows the buffer operation performed at the receiving side. Data which have been received at a constant rate are stored in the buffer memory, and, when the data amount reaches the level B0, decoding of the codes starts. At the time when data of d1 have been consumed for the display of the first picture and the decoding for the second picture starts, the amount of the accumulated data is B1. In the same manner, data accumulation and data consumption are alternately repeated. The amount of consumed data varies depending on the displayed picture, but the average amount of consumed data is equal to the receiving rate. The operation of the receiving side has been described. The operation of the transmitting side is performed in the entirely opposite way to that of the receiving side.

Since the communication apparatus is controlled as described above, the relationship between fields of an input video signal and transmitted codes is not clearly defined. Unlike an application in the field of communication, a VTR is required to perform functions peculiar to a VTR and including a special reproduction different from normal reproduction such as a still reproduction, slow reproduction and high-speed reproduction, an assemble edition, and an insert edition. Therefore, it is desirable to clearly define the relationship between fields and tracks. In order to produce a practical VTR, it is essential to select a recording format which can solve these problems.

As a method of compressing a moving picture such as a television signal, there is a method using an intra-field (or intra-frame) in which the encoding is completed within an individual field (or frame) independently of another field (or frame), and prediction-field (or prediction frame) in which the predictive encoding is performed using information of another field (or frame). Generally, the information which the prediction between fields (or frames) is not used is two or more times the code amount of the prediction-field using the prediction between planes. When record areas of the same size (number of tracks) are allocated to the intra field (or intra-frame) and the prediction (or prediction frame), there arises a fourth problem that in the intra-field (or intra-frame), the record area is not sufficient and in the prediction-field (or prediction frame), the record area has a useless portion.

SUMMARY OF THE INVENTION

It is an object of the invention to provide a high-efficiency encoder which does not perform motion-compensation on an intra-field (or intra-frame) in every n fields (or n frames) and which performs motion-compensation prediction with an intra-field (or intra-frame) in other fields (or frames), thereby solving the first problem and reducing the hardware size.

It is another object of the invention to provide a high-efficiency encoder in which a reference picture is previously set using a method fixed somewhat for a normal picture having no scene change, and, when a scene change occurs in the step of the motion-compensation prediction process, the reference picture is switched so as to suppress the amount of generated information as much as possible, thereby solving the above mentioned second problem. Further, the S/N ratio of a picture can be maintained while suppressing the increase in the hardware size.

It is a further object of the invention to provide a high-efficiency encoder in which motion-compensation prediction is performed while a reference picture is previously set using a method fixed somewhat for a normal picture having no scene change, and, when a scene change occurs in the step of the motion-compensation prediction process, the picture immediately after the scene change is encoded in a field (or frame) as an intra-field (or intra-frame). Thus, the third problem mentioned above is solved and the deterioration of a picture quality is suppressed after the scene change as much as possible.

It is a still further object of the invention to provide a video information recording/reproducing apparatus in which signals of a plurality of fields (or frames) are collected into one recording unit to be recorded in a predetermined number of tracks, thereby solving the above mentioned fourth problem and coping with the special reproduction and edition required in a VTR.

In a high-efficiency encoder of the invention, only an intra-field (or intra-frame) is used as a reference picture for motion-compensation prediction, and therefore the information compression in which the deterioration of the image quality is not conspicuous can be performed with a reasonable hardware size.

In the other high-efficiency encoder of the invention, motion-compensation prediction is usually performed using a fixed reference picture, and, when a scene change occurs in the step of the motion-compensation prediction process, the reference picture is adaptively switched, thereby suppressing the increase in the information amount. In this case, for example, blocks which are judged to be in an intra mode are counted in order to determine whether a scene change occurred, and, when blocks of an intra mode, the number of which is greater than a preset threshold, are generated, the reference picture for the next field (or frame) is switched. Therefore, the amount of generated codes can be suppressed and the S/N ratio of a reproduced picture can be maintained at a high level, by monitoring the encoding mode of a block, determining whether a scene change occurred, and switching the reference picture for motion-compensation prediction.

When a scene change is detected, the picture immediately after the scene change makes an intra picture immediately information amount is compressed, an encoding error is caused only by the difference in this field (or frame), thereby reducing the effect on the motion-compensation prediction process of the next field (or frame). Namely, when motion-compensation prediction is performed before and after a scene change, the amount of information generated in the field (or frame) is increased, such that even when the information is compressed, the effect of an encoding error increase. Therefore, when the same amount of information as that of the generated information is encoded as an intra-field (or intra-frame), higher subjective evaluation can be obtained. In the further high-efficiency encoder of the invention, when a scene change occurs in a motion-compensation prediction process unit, the field (or frame) immediately after the scene change is encoded as an intra-field (or intra-frame). Accordingly, even when the information amount of the field (or frame) is compressed to the level of a prediction-field (or prediction frame), by performing encoding of the field as an intra-field (or intra-frame), the deterioration of the image quality of a picture can be suppressed more efficiently.

In the video information recording/reproducing apparatus of the invention, input signals of n fields (or n frames) are collected into one recording unit block, and recorded in tracks of a predetermined number which is calculated from the amount of information to be recorded and the recording capacity of one track. The compression encoding is performed on blocks which are collected into the recording unit in such a manner that at least one intra-field (or intra-frame) is included in the unit. Input television signals of n fields (or n frames) are subjected as one recording unit block to the compression encoding by a high-efficiency encoder. The compression-encoded television signals of n fields (or n frames) are divided to be recorded in recording areas of m tracks. The reproduced signals of m tracks are restored to television signals of n fields (or n frames) by a high-efficiency decoder.

The above and further objects and features of the invention will more fully be apparent from the following detailed description with accompanying drawings.

BRIEF DESCRIPTION OF THE DRAWINGS

FIG. 3 shows the block selection operation in the motion-compensation prediction processing apparatus;

FIG. 6 shows code amounts and S/N ratios in conventional motion-compensation prediction;

FIG. 19 shows the overall specifications of VTRs of the D1 and D2 methods;

FIG. 20 shows the specifications of the tape formats of VTRs of the D1 and D2 methods;

FIG. 21 shows the specifications of the tape running systems of VTRs of the D1 and D2 methods;

FIG. 22 is a diagram showing the ranges of pixels recorded by VTRs of the D1 and D2 methods;

FIG. 29 shows simulation results obtained in the case that there is a scene change;

FIG. 30 shows simulation results obtained in the case that there is no scene change;

FIG. 41 shows the operation of selecting blocks in the high-efficiency encoder of FIG. 40;

FIG. 45 is a diagram showing another switching between a reference picture and an intra-field in the high-efficiency encoder of FIG. 40;

FIG. 50 is a block diagram showing the configuration of a video information recording/reproducing apparatus according to the invention;

DESCRIPTION OF THE PREFERRED EMBODIMENTS

Embodiment 1

Figure 25:
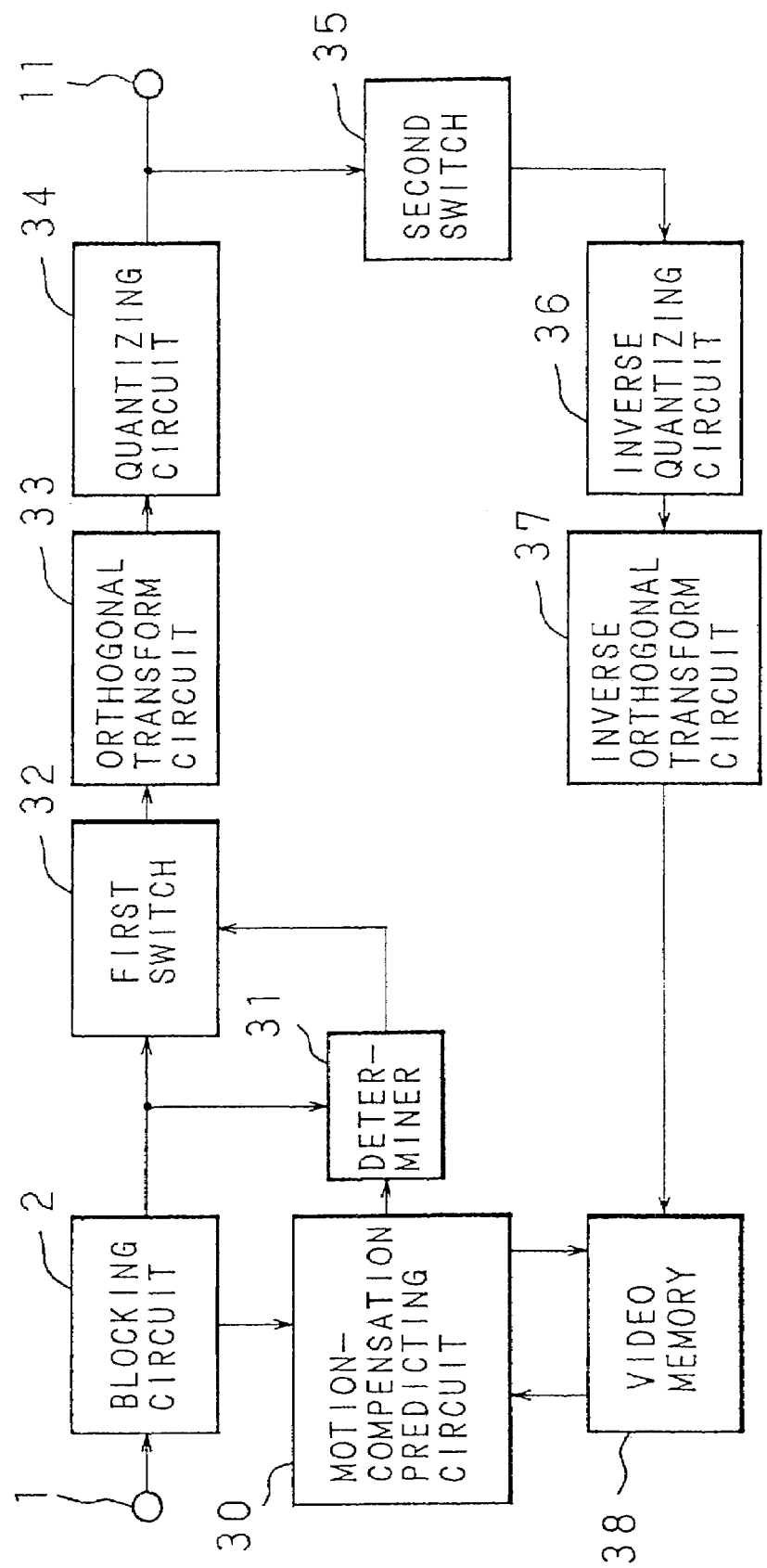
FIG. 25 is a block diagram showing the configuration of a high-efficiency encoder according to the invention.

Hereinafter, a first embodiment of the present invention will be described with reference to the drawings. FIG. 25 is a block diagram illustrating the first embodiment of the invention. In FIG. 25, 1 designates an input terminal for a digital video signal, 2 designates a blocking circuit, which forms into a block a digital video signal input through the digital video signal input signal terminal 1, 30 designates a motion-compensation predicting circuit which performs motion-compensation prediction between the block output from the blocking circuit 2 and an intra-field and outputs a difference signal between an input block and a prediction block, 31 designates a determiner which selects the one having the smaller sum of absolute values between the input signal from the blocking circuit 2 and a prediction difference signal from the motion-compensation predicting circuit 30, 32 designates a first switch which selectively outputs encoded blocks output from the blocking circuit 2 and determiner 31, depending on the determined mode, 33 designates a orthogonal transform circuit which performs the orthogonal transform on an encoded block output from the first switch 32, 34 designates a quantizing circuit which quantizes the output of the orthogonal transform circuit 33, 11 is a transmission path, 35 designates a second switch which selects and outputs the quantizing results output from the quantizing circuit 34, only in the case of an intra-field, 36 designates an inverse quantizing circuit which inverse quantizes the output of second switch 35, 37 designates an inverse orthogonal transform circuit which performs an inverse orthogonal transform on the output of the inverse quantizing circuit 36, and 38 designates a video memory which stores one field of the reproduced image of an intra-field output from the inverse orthogonal transform circuit 37 and outputs a reference picture in a search range of the prediction field to the motion-compensation predicting circuit 30.

Figure 26:
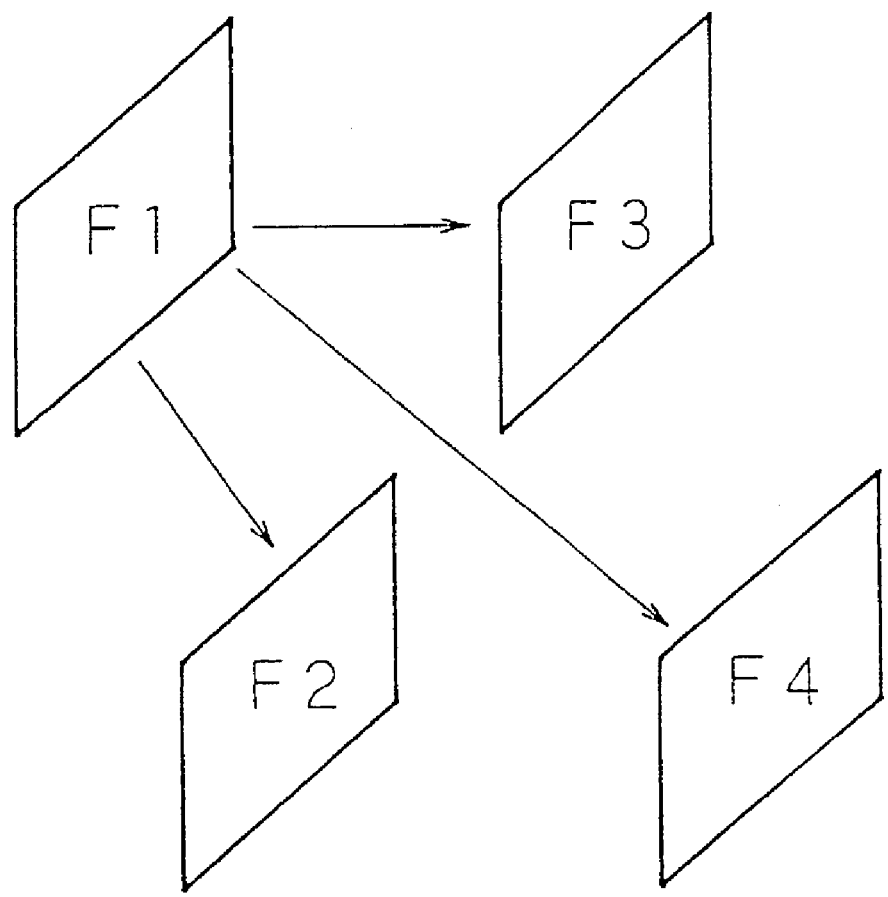
FIG. 26 is a diagram showing the relationship between fields in a motion-compensation prediction process.

As a predictive method used in such a circuit block, for example, the method shown in FIG. 26 may be employed. In this method, an intra-field is inserted every four fields, and the three intermediate fields makes prediction-fields. In FIG. 26, first field F1 is an intra-field, and second, third and fourth fields F2, F3 and F4 are prediction-fields. In this method, second, third and fourth fields F2, F3 and F4 are predicted from first field F1. At first, first field F1 which is an intra-field is blocked in the field, and the orthogonal transform being performed, the block is quantized, and then encoded. In the local decoding loop, the quantized signals of first field F1 are decoded or reconstructed. The reconstructed image is used in motion-compensation prediction for second, third and fourth fields F2, F3 and F4. Then, motion-compensation prediction is performed on second field F2 using first field F1. After orthogonal transform is performed on the obtained difference blocks, encoding is performed in a similar manner as in first field F1. In this case, when the sum of the absolute values of the input blocks is smaller than that of the difference blocks, orthogonal transform is performed on the input blocks in place of the difference blocks, and thereafter encoding is performed in a similar manner as in first field F1. In a similar manner as in second field F2, using first field F1, also third and fourth fields F3 and F4 are motion-compensation prediction processed and encoded. Also in third and fourth fields F3 and F4, when the sum of absolute values of the AC powers of the input blocks is smaller than that of the difference blocks, orthogonal transform is performed on the input blocks in place of the difference blocks, and thereafter encoding is performed in a similar manner as in first field F1.

Then, the operation will be described. Irrespective of the field (an intra-field or a prediction-field), digital video signals input through the digital video signal input terminal 1 are blocked by the blocking circuit 2 in the unit of, for example, 8 pixels×8 lines. The motion-compensation predicting circuit 30 performs motion-compensation prediction on input blocks which are output from the blocking circuit 2 in the case of a prediction-field, while using as a reference picture the reproduced video data of an intra-field stored in the video memory 38. The motion-compensation predicting circuit 30 performs motion estimation while setting the search range of motion estimation at, for example, 16 pixels×16 lines, to obtain a motion vector, and further obtains the difference signal between the reference picture and the input image in accordance with the motion vector obtained in the motion estimation. The difference signal is output together with the motion vector to determiner 31. The determiner 31 obtains the sum of absolute values of components of each of the input blocks output from the blocking circuit 2 and the difference blocks output from the motion-compensation predicting circuit 30. When the input blocks are indicated by I(i, j) (i, j=1 to 8), the sum of their absolute values is indicated by Is, the difference blocks are indicated by P(i, j) (i, j=1 to 8), and the sum of their absolute values is indicated by Ps, Is and Ps can be expressed by the following expressions:

$$Is = \sum_{j=1}^{8} \sum_{i=1}^{8} |I(i, j)|$$

$$Ps = \sum_{j=1}^{8} \sum_{i=1}^{8} |P(i, j)|$$

When Ps<Is, it is determined that the information amount of the difference blocks is smaller than that of the input signal blocks, and then the difference blocks are output together with the motion vectors to first switch 32. In contrast, when Ps≧Is, it is determined that the information amount of the input signal blocks is smaller than that of the difference signal blocks, and then the input blocks are output together with a forced intra signal indicating that the block is the forced intra block, in place of the motion vectors, to the first switch 32.

The first switch 32 selects the output of the blocking circuit 2 in the case of an intra mode, and the output of the determiner 31 in the case of a prediction mode, and supplies the selected output to the orthogonal transform circuit 33.

The orthogonal transform circuit 33 performs, for example, the two-dimensional DCT on each of the 8×8 blocks which are input thereinto. The quantizing circuit 34 performs variable length coding and quantizes the orthogonal transform coefficients output from the orthogonal transform circuit 33. Furthermore, in the case of a prediction mode, quantizing circuit 34 quantizes also the motion vectors or the forced intra signals in addition to the orthogonal transform coefficients, and outputs them together to a transmission path 11. On the other hand, in order to produce reference data for the motion-compensation prediction, only in the case of the intra-field, the second switch 35 outputs the orthogonal transform coefficients which have been quantized by the quantizing circuit 34, to the inverse quantizing circuit 36. The inverse quantizing circuit 36 inverse-quantizes and performs variable length decoding the data which have been performed variable length coding by the quantizing circuit 34, and the decoded data are output to inverse orthogonal transform circuit 37. The inverse orthogonal transform circuit 37 performs, for example, the inverse two-dimensional DCT on the data to reconstruct the blocks of the intra-field. The blocks of the intra-field which have been reconstructed by the inverse orthogonal transform circuit 37 are stored in the video memory 38. The video memory 38 stores the reconstructed pictures of the intra-field for one field, as the reference data in the case of the motion-compensation prediction, and outputs the reference pictures within the motion vector detection range to motion-compensation predicting circuit 30.

In the embodiment described above, a block for the orthogonal transform has the size of 8 pixels×8 lines. This size is not necessarily 8 pixels×8 lines, and the block may have the size of n pixels×m lines. Similarly, it is not necessary to set the search range for motion vectors to 16 pixels×16 lines, and the search range may be set to k pixels×s lines (k≧n, s≧m). In the above embodiment, the predictive encoding is completed every four fields. It is not necessary to complete the predictive encoding every four fields, and the predictive encoding may be completed every arbitrary number of fields. Furthermore, it is not necessary to complete the predictive encoding every arbitrary number of fields, and predictive encoding may be completed every arbitrary number of frames. According to the above embodiment, in the determiner 31, the output having the smaller sum of absolute values is selected from the outputs of the blocking circuit 2 and motion-compensation predicting circuit 30, to be output to the first switch 32. Alternatively, without performing the motion-compensation determination, only the output of the motion-compensation predicting circuit 30 may be output to the first switch 32.

Embodiment 2

According to Embodiment 1 described above, in the determiner 31, the output having the smaller sum of absolute values is selected from the outputs of the blocking circuit 2 and motion-compensation predicting circuit 30, to be output to the first switch 32. In a field where determiner 31 selects the forced intra mode more frequently than the prediction mode, it may be judged that a scene change has occurred in the field, and assuming that the whole field is in the intra mode encoding may be performed. An embodiment constructed so as to perform this operation is Embodiment 2 described below.

Figure 27:
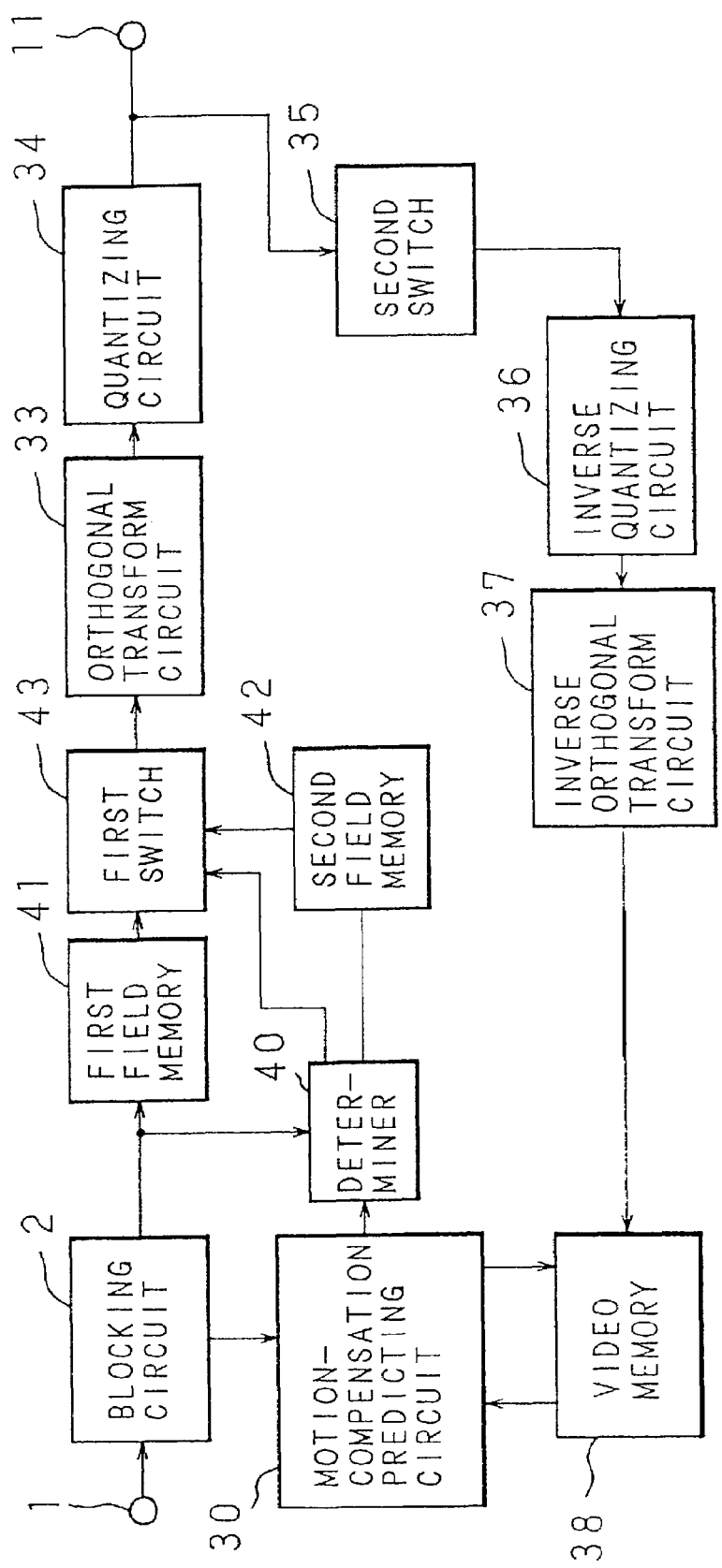
FIG. 27 is a diagram showing the configuration of another high-efficiency encoder according to the invention.

FIG. 27 is a block diagram showing the configuration of the second embodiment. In the figure, 40 designates a determiner which selects the one having the smaller sum of absolute values, from an input block from the blocking circuit 2 and a prediction difference block from the motion-compensation predicting circuit 30, and which judges a field where the input block from the blocking circuit 2 is selected more frequently, to be an intra-field, 41 designates a first field memory which stores the input blocks output from the blocking circuit 2 as data of an intra-field, 42 designates a second field memory which stores the blocks of a prediction-field output from the determiner 40, and 43 designates a first switch which, in the intra mode and when the determiner 40 judges that the forced intra mode more frequently occurs than the prediction mode, selects the output of the first field memory 41 and outputs it to the orthogonal transform circuit 33, and which, in other case than the above-mentioned two cases, selects the output of the second field memory 42.

Then, the operation will be described. In the process between the digital video signal input terminal 1 and motion-compensation predicting circuit 30, operation is carried out in the same manner as those in the first embodiment, and therefore the description is omitted. The determiner 40 selects the one having the smaller sum of absolute values of components, from input blocks output from the blocking circuit 2 and difference blocks output from the motion-compensation predicting circuit 30, and outputs it. When the output front the motion-compensation predicting circuit 30 is selected, the determiner 40 outputs motion vectors and blocks of difference signal. When the output from the blocking circuit 2 is selected, motion vectors are output together with a signal indicative of a forced intra-block. When the number of forced intra-blocks in one field reaches or exceeds a value n, determiner 40 judges that a scene change has occurred, and outputs a control signal so that the whole current field is to be encoded by the intra mode.

The output of the determiner 40 is stored as data of the prediction mode in the second field memory 42, and, after data for one field have been stored, it is output to the first switch 43. In contrast, the output of the blocking circuit 2 is stored as data of the intra mode in the first field memory 41, and, after data for one field have been stored, it is output to the first switch 43. In the intra mode and when the determiner 40 determines to force the intra mode on the field, the first switch 43 selects the output of the first field memory 41, and, in another case, selects the output of second field memory 42. The output of the first switch 43 is supplied to the orthogonal transform circuit 33. In the succeeding process from the orthogonal transform circuit 33 to the video memory 38, the operation is carried out in the same manner as those in the first embodiment, and therefore the description is omitted. However, when it is determined by the determiner 40 that a scene change occurs, it is required to update also the contents of the video memory 38. In this case, therefore, the second switch 35 operates, in the same manner as in the intra mode, to supply the output of the quantizing circuit 34 to the inverse quantizing circuit 36.

Hereinafter, examples in which encoding and decoding are respectively performed by three kinds of predictive encoding methods shown in FIGS. 26, 4 and 28 will be described. In the predictive encoding method shown in FIG. 28, prediction between fields is performed in a field, and third field F3 is predicted from first field F1. Referring to the encoding methods shown in FIGS. 26, 4 and 28 respectively as methods 1, 2 and 3, FIG. 29 shows results of simulation processes which were conducted on sample images for five seconds wherein a scene change exists. Similarly, FIG. 30 shows results of simulation processes which were conducted on sample images for five seconds wherein no scene change exists. For these sample images, 4:2:2 component signals (Y: 720×240, Cb and Cr: 360×240, 60 Fields/sec.) are used. As seen from the results shown in FIGS. 29 and 30, to images having a scene change, method 3 is advantageous in the view point of the S/N ratio, but, for images having no scene change, there is little difference between methods 1 to 3. As a result, when a scene change occurs, the intra-field is employed forcedly, and a high-efficiency encoder of which hardware size is smaller than that of a conventional predictive encoder can be realized.

In Embodiment 2 described above, the intra mode is created every n fields and the succeeding (n−1) fields are prediction-encoded from an intra-field, and, when a scene change occurs, the intra-field is forcedly created and the remaining fields are predicted from the forced intra mode. It is not necessary that an intra-field exists every n fields. Alternatively, when a forced intra-field is created, the succeeding (n−1) fields which comes after the forced intra-field may be prediction-encoded. In the above-described embodiment, the predictive encoding is performed in the unit of field. It is not necessary to perform predictive encoding in the unit of field, and predictive encoding may he performed in the unit of frame.

As described above, since the high-efficiency encoders of Embodiments 1 and 2 create an intra-field every n fields and in the other fields, perform motion-compensation prediction using this intra-field as a reference picture, the hardware size including a calculation circuit for obtaining motion vectors can be reduced.

Embodiment 3

Figure 1:
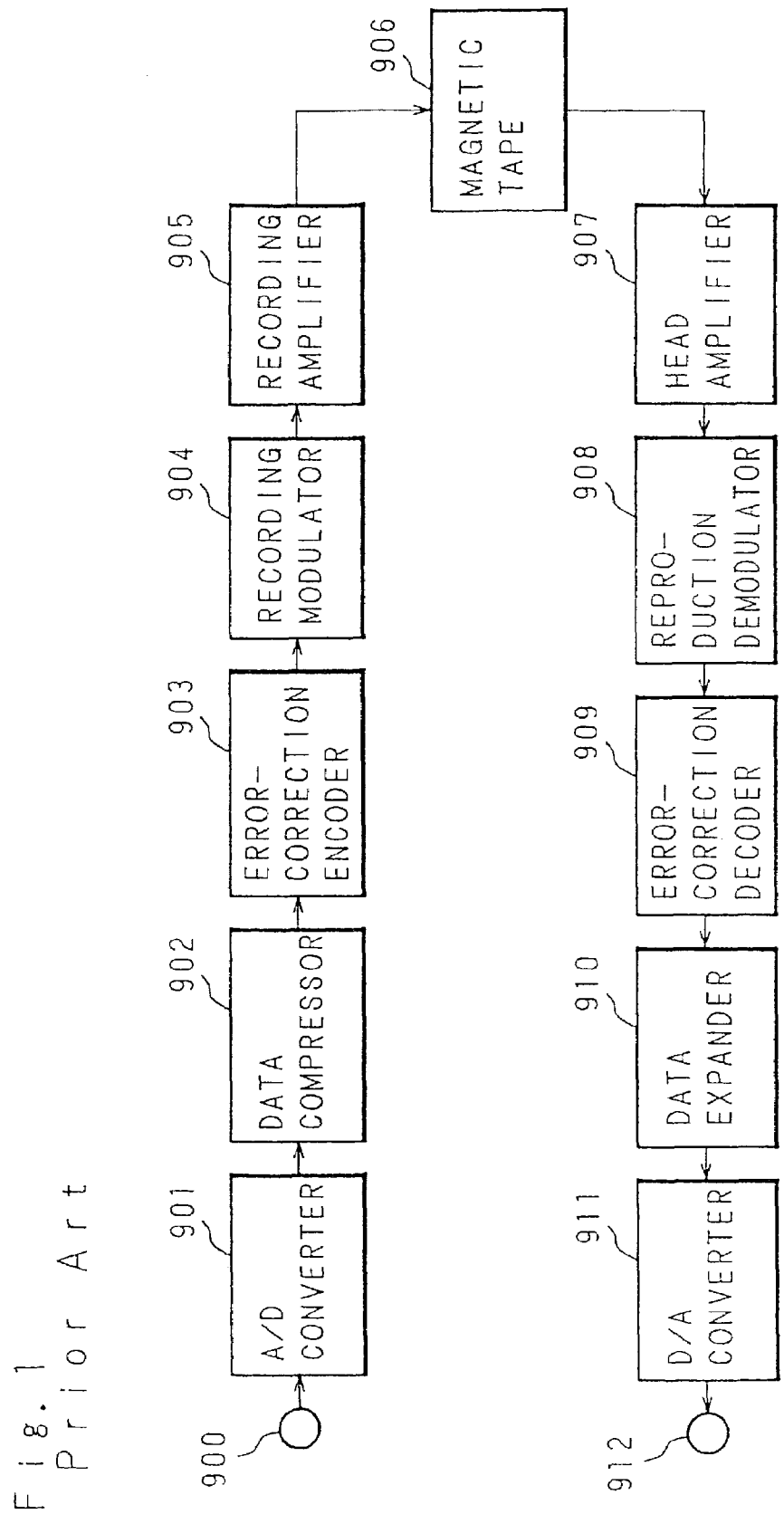
FIG. 1 is a block diagram showing the configuration of a digital VTR.
Figure 2:
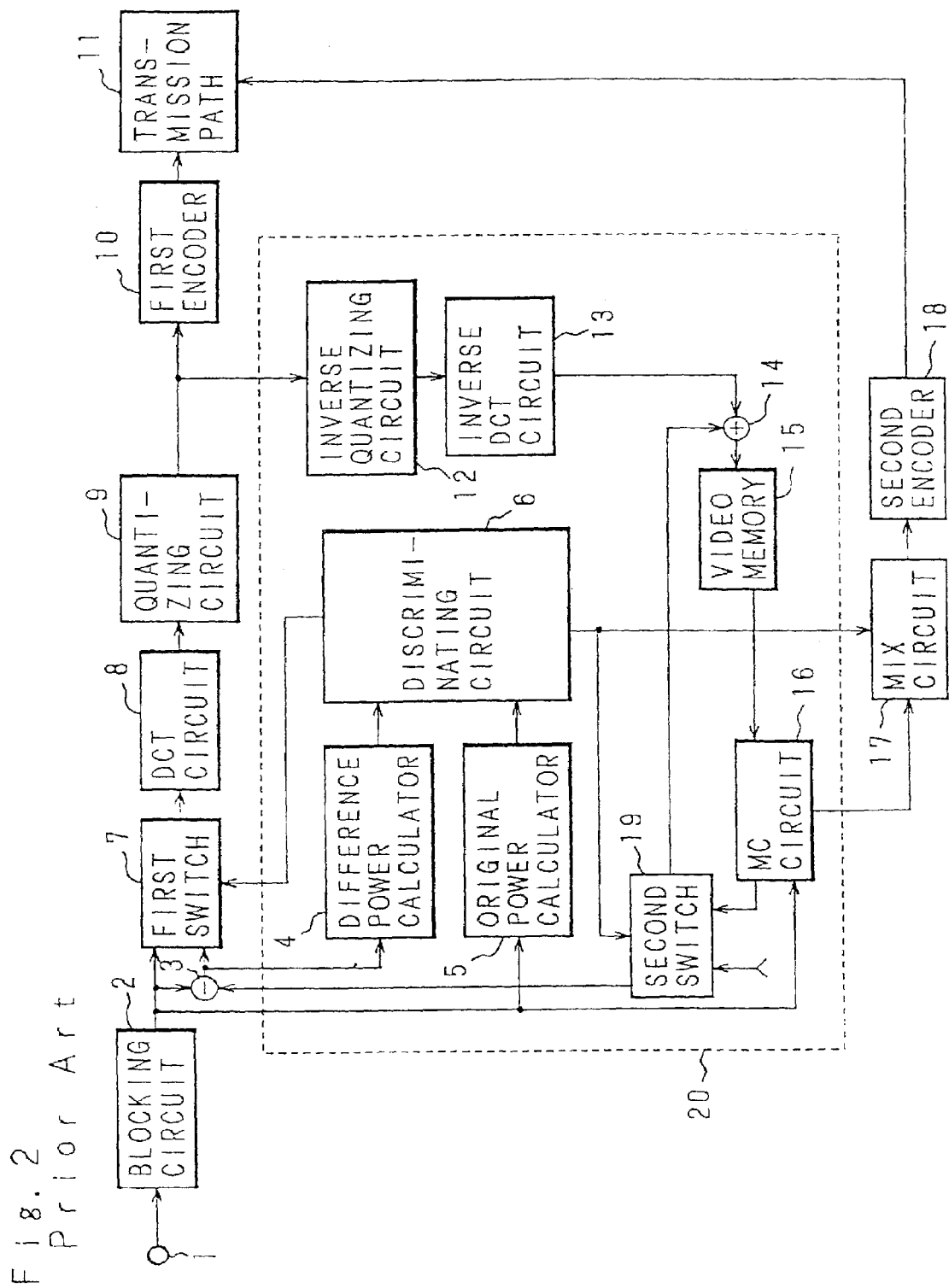
FIG. 2 is a block diagram showing the configuration of a motion-compensation prediction processing apparatus.
Figure 31:
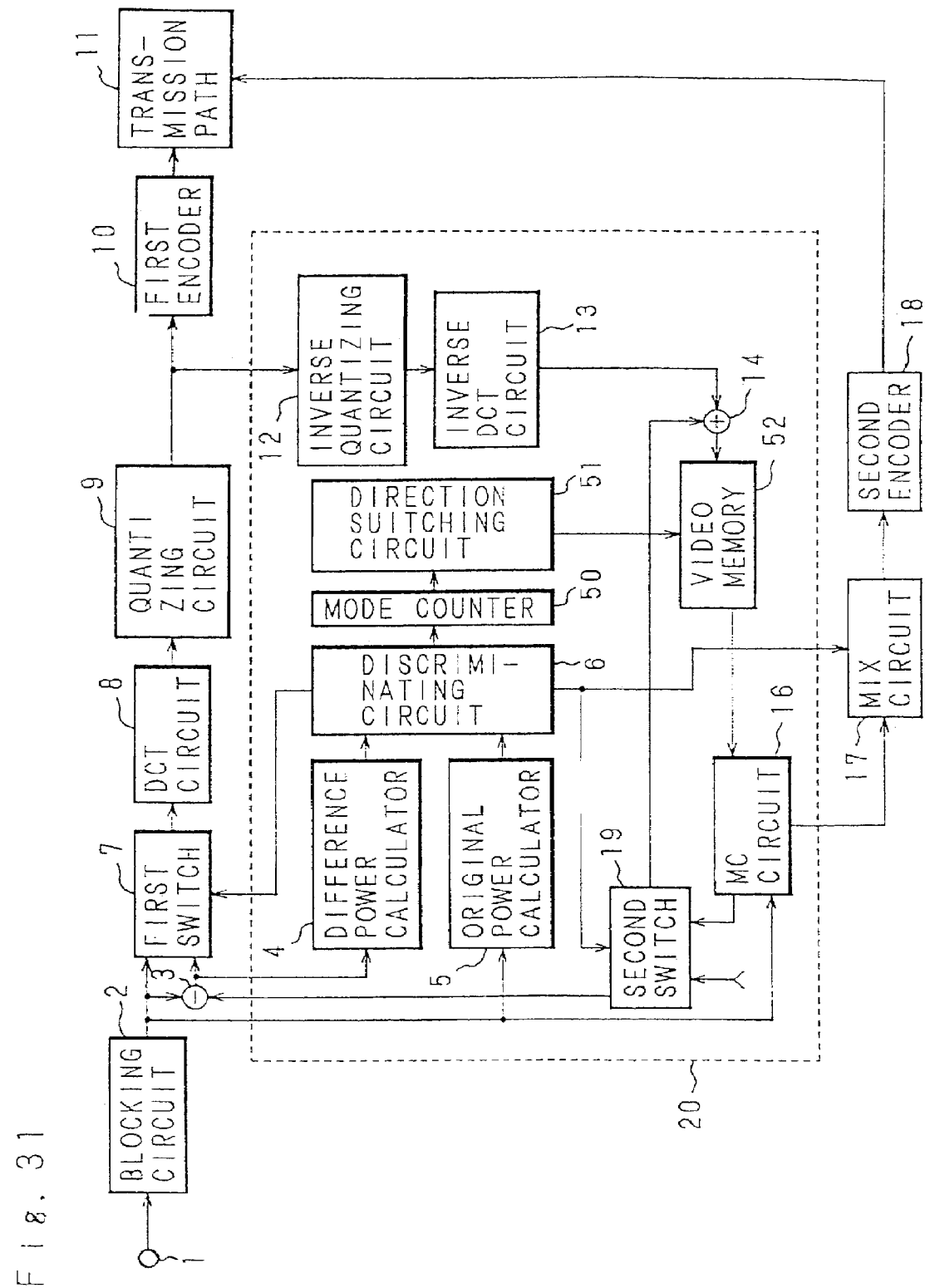
FIG. 31 is a block diagram showing the configuration of a further high-efficiency encoder according to the invention.

FIG. 31 is a block diagram showing the configuration of a high-efficiency encoder in Embodiment 3. In FIG. 31, 1-14 and 16-20 designate the elements identical to those of the conventional apparatus in FIG. 2. The reference numeral 50 designates a mode counter which counts the number of blocks of the intra mode, 51 designates a direction switching circuit which compares a predetermined number of blocks with the number of blocks of the intra mode output from the mode counter and which determines the reference picture for the next field, and 52 designates a video memory which stores output blocks in order to perform motion-compensation prediction and which outputs the reference picture for the next field as the search range.

Then, the operation will be described. Irrespective of an intra-field or a prediction-field, input digital video signals are by the blocking circuit 2 segmented into input blocks a unit of which consists of m [pixels]×n [lines]. In order to obtain a difference block, subtracter 3 calculates the difference in the unit of pixel between an input block and a prediction block. In this way, an input block and a difference block are supplied to first switch 7. In order to calculate the power, the difference block is supplied also to difference power calculator 4 and the difference power is calculated. In order to calculate the AC power, the input block is supplied also to the original power calculator 5 and the original power is calculated. The outputs of the difference power calculator 4 and original power calculator 5 are supplied to the determiner 6 which in turn selects the one having the smaller power from the two powers outputting the result to the first switch 7 as the mode signal. More specifically, when the difference power is smaller than the original AC power, the prediction mode signal is output so that the first switch 7 is set to the prediction mode to output the difference block as an encoded block. When the original power is smaller than the difference power, the intra mode signal is output so that first switch 7 is set to the intra mode to output the input block as an encoded block.

The mode signal from determiner 6 is input to the mode counter 50. Since the input mode signal is generated for every block of a prediction-field, the mode counter 50 counts the number of blocks selecting the intra mode or prediction mode, from the blocks of one field, and outputs the number of blocks selecting an intra mode or prediction mode to the direction switching circuit 51. The direction switching circuit 51 compares a predetermined number of blocks (which is smaller than the total number of blocks of one field) with the number of blocks selecting an intra mode which number has been input from mode counter 50, and outputs a reference picture switching signal to video memory 52. When the predetermined number of blocks is greater (or smaller) than the number of blocks selecting an intra mode (or a prediction mode), direction switching circuit 51 outputs to video memory 52 a reference picture switching signal so that the reference picture is not to be switched. When the number of predetermined blocks is smaller (or greater) than the number of blocks selecting an intra mode (or a prediction mode), the direction switching circuit 51 outputs to the video memory 52 a reference picture switching signal so that the reference picture is to be switched.

The first switch 7 outputs an input block or a difference block as an encoded block, depending on the mode signal determined by the determiner 6. In this case, when the input block is the intia-field, the first switch 7 surely outputs the input blocks as encoded blocks. The encoded blocks enter the DCT circuit 8 to be converted into DCT coefficients. The DCT coefficients are subjected to the weighting and threshold processes in the quantizing circuit 9 to be quantized to predetermined bit numbers each corresponding to the coefficients. The DCT coefficients which have been quantized to the respective predetermined bit numbers are converted by the first encoder 10 into codes suitable for transmission path 11 and then output to transmission path 11.

The DCT coefficients on which weighting and threshold processes and quantization have been performed by the quantizing circuit 9 also enter the local decoding loop 20, and are subjected to the inverse weighting and inverse quantizing processes in the inverse quantizing circuit 12. Then, the DCT coefficients on which inverse weighting and inverse quantizing processes have been performed in the local decoding loop 20 are converted into a decoded block by inverse DCT circuit 13. The adder 14 adds the decoded block to a prediction block in the unit of pixel. This prediction block is the same as that used in the subtracter 3. The result of addition by the adder 14 is written as an output block in a predetermined address of the video memory 52. Video memory 52 switches the reference picture in response to the reference picture switching signal from the direction switching circuit 51, and outputs the motion estimation search range to the MC circuit 16. The size of the block in the motion estimation search range is, for example, i [pixels]×j [lines] (where i≧m, j≧n). A block in the motion estimation search range output from the video memory 52, and an input block from the blocking circuit 2 are input into the MC circuit 16. The MC circuit 16 performs the motion estimation on each block to extract motion vectors of the input block.

The motion vectors extracted by the motion estimation in the MC circuit 16 are input into the MIX circuit 17. The MIX circuit 17 combines the motion vectors from the MC circuit 16 with the mode signal determined by the determiner 6. The motion vectors and mode signal which have been combined with each other in the MIX circuit 17 are converted by the second encoder 18 into codes suitable for the transmission path 11, and then output together with the corresponding encoded blocks to the transmission path 11. The prediction block is output from the MC circuit 16 in the form of a block which is blocked into the size (m [pixels]×n [lines]) equal to that of the input block from the motion estimation range. This prediction block is supplied to the second switch 19, and output from the respective output terminal of the switch, in accordance with the field of the input block the currently being processed and the mode signal of the decoded block. Namely, the prediction block is output from one of the output terminals of the second switch 19 to the subtracter 3 in accordance with the processed field, and from the other output terminal in accordance with the mode signal of the current decoded block and the processed field.

Figure 4:
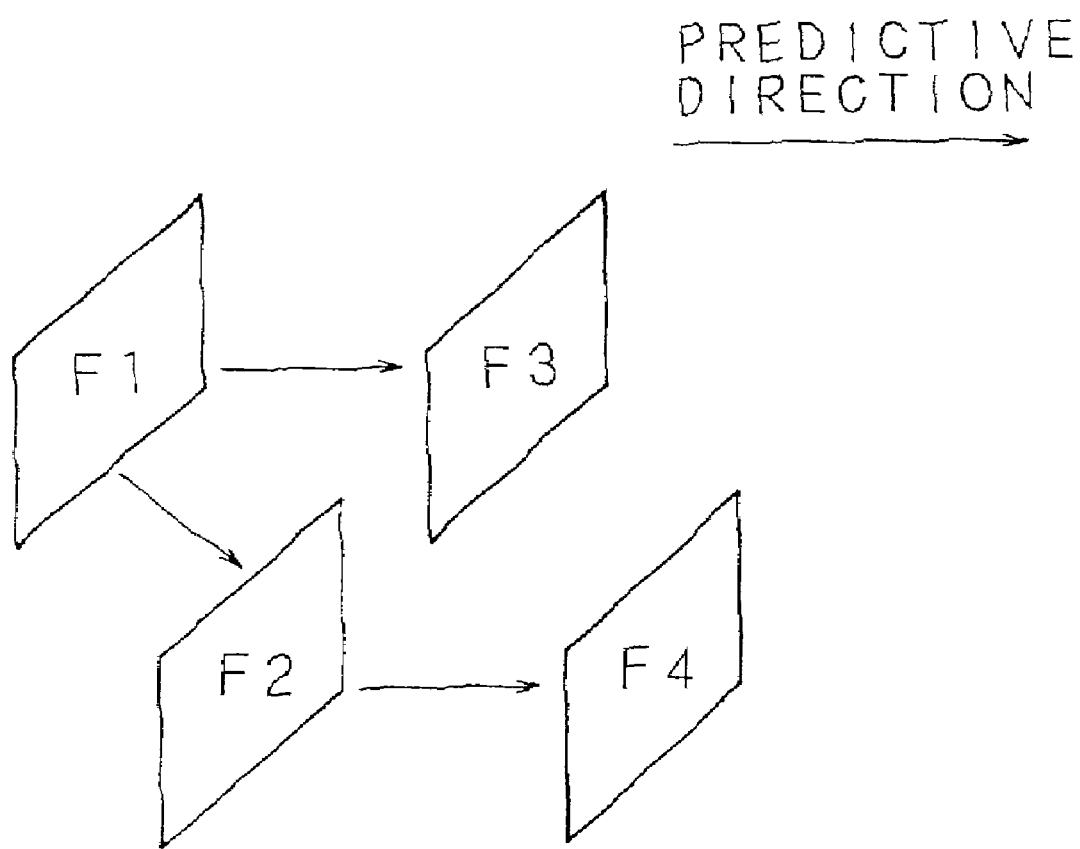
FIG. 4 is a diagram showing the relationship between fields in a motion-compensation prediction process.
Figure 5:
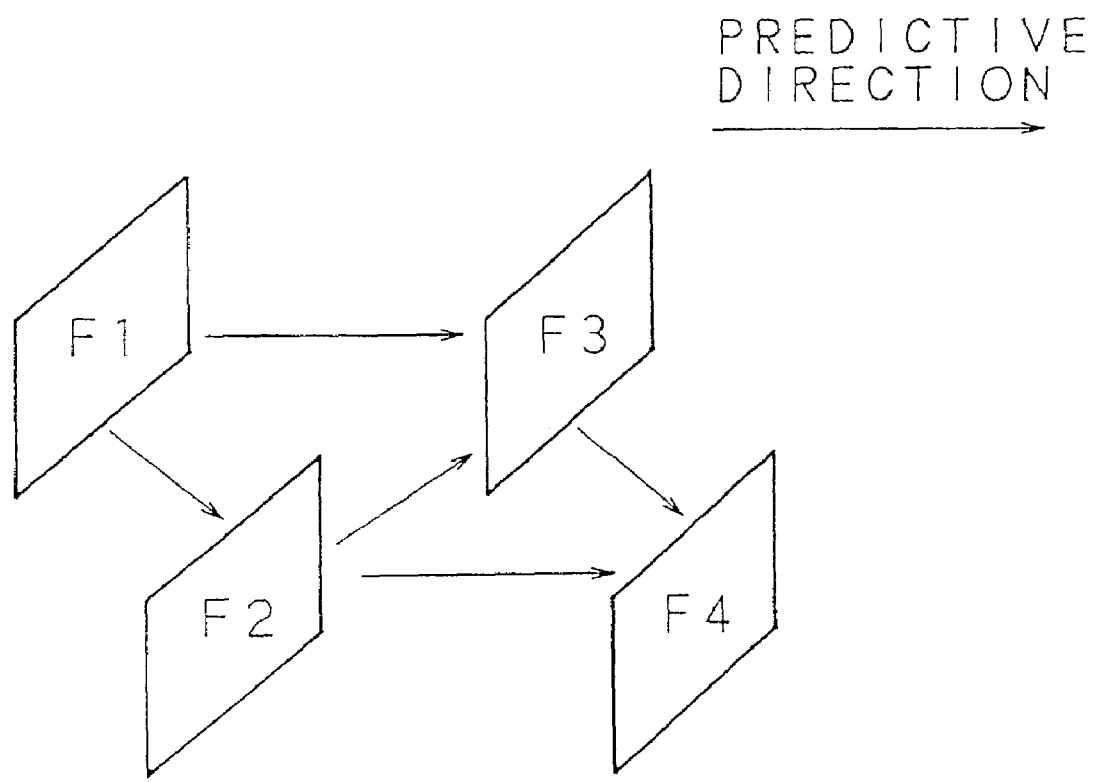
FIG. 5 is a diagram showing the relationship between fields in a motion-compensation prediction process.
Figure 7:
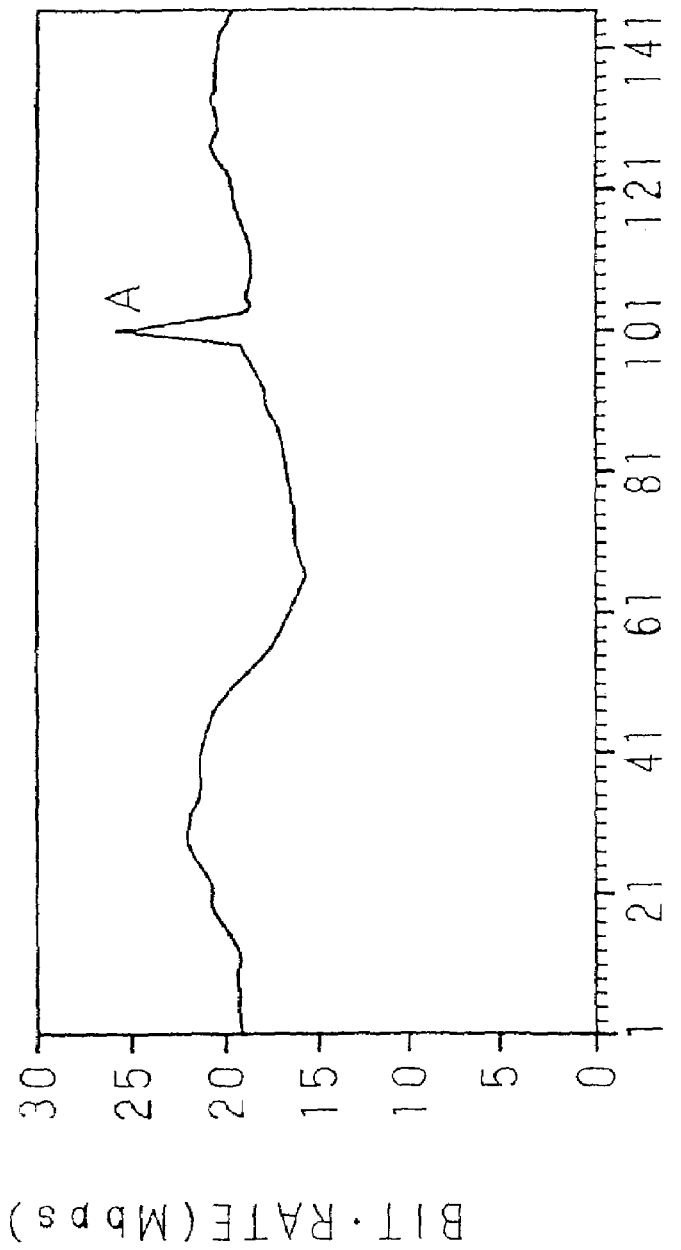
FIG. 7 shows the change of the information amount for five seconds in case that a reference picture is not switched.
Figure 8:
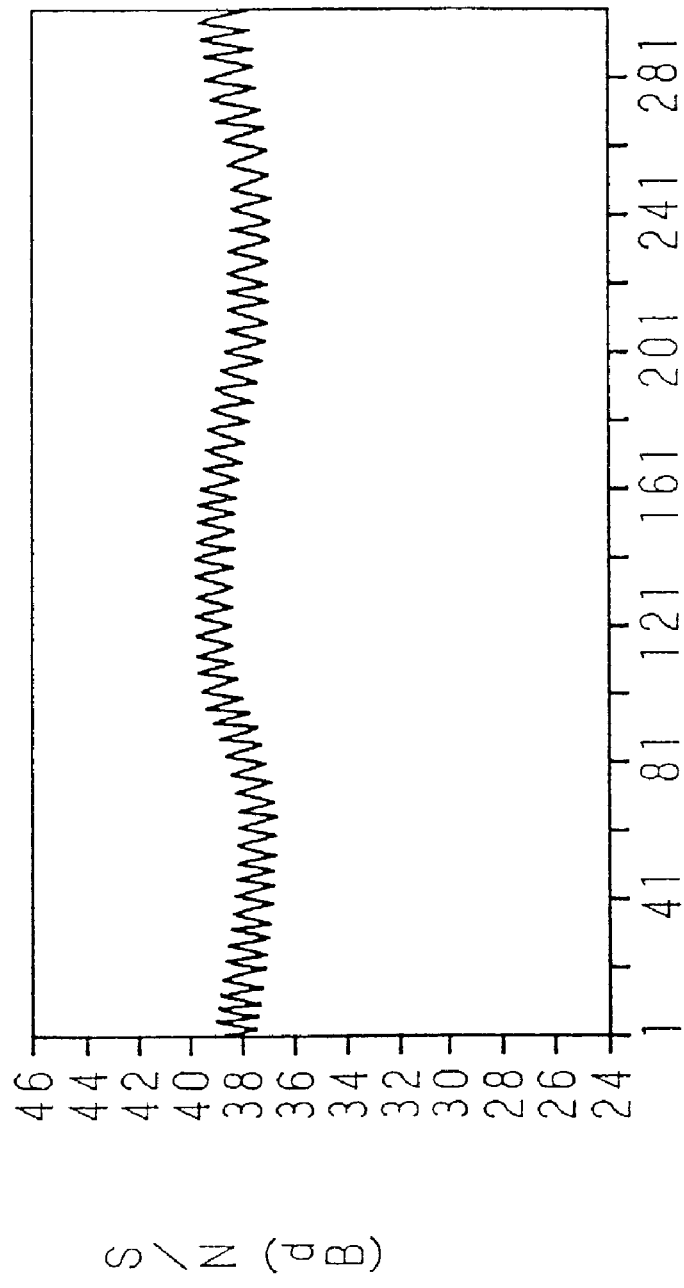
FIG. 8 shows the variation of the S/N ratio for five seconds in the case that a reference picture is not switched.
Figure 9:
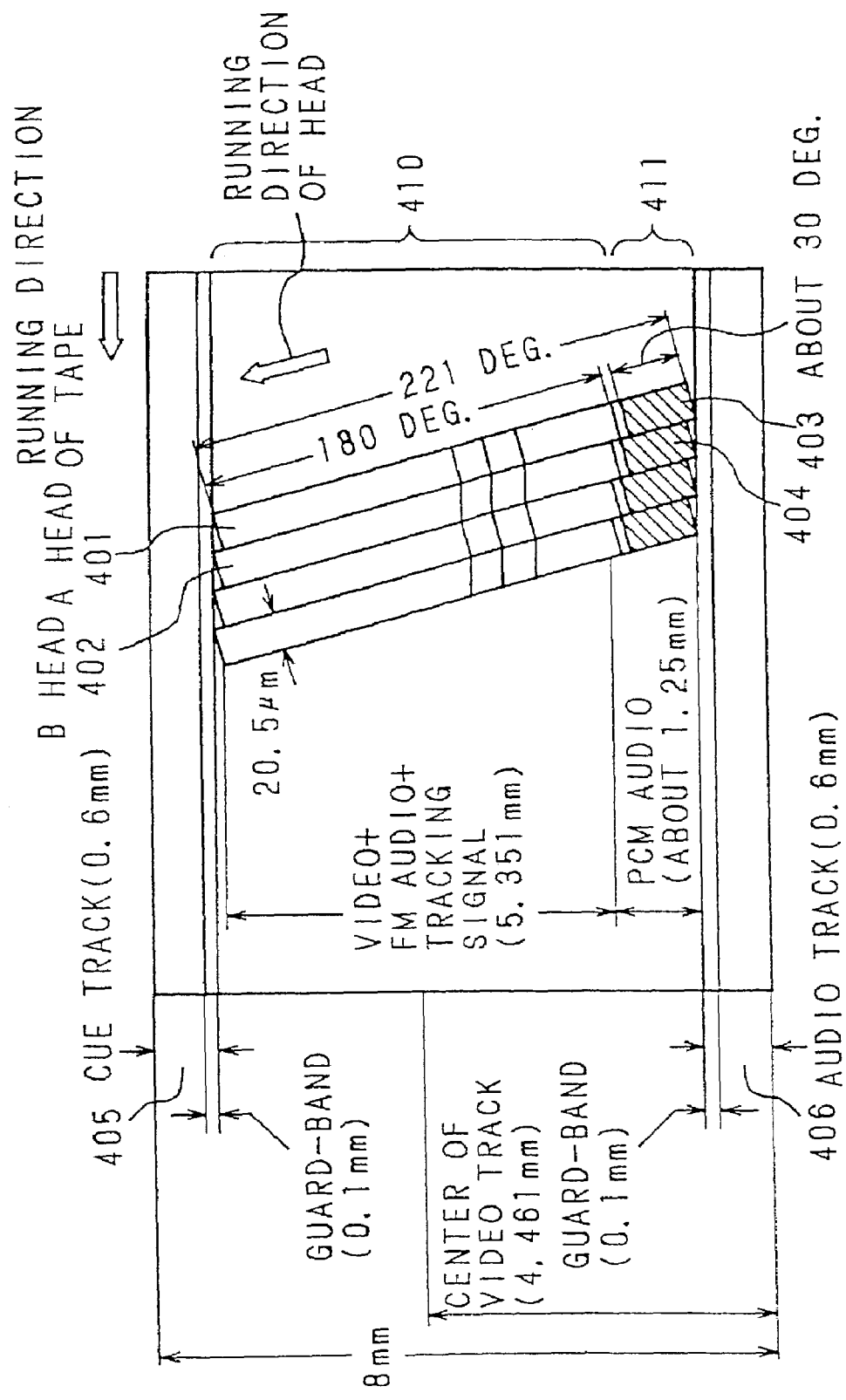
FIG. 9 is a diagram showing the tape format according to the 8-mm VTR standard.
Figure 10:
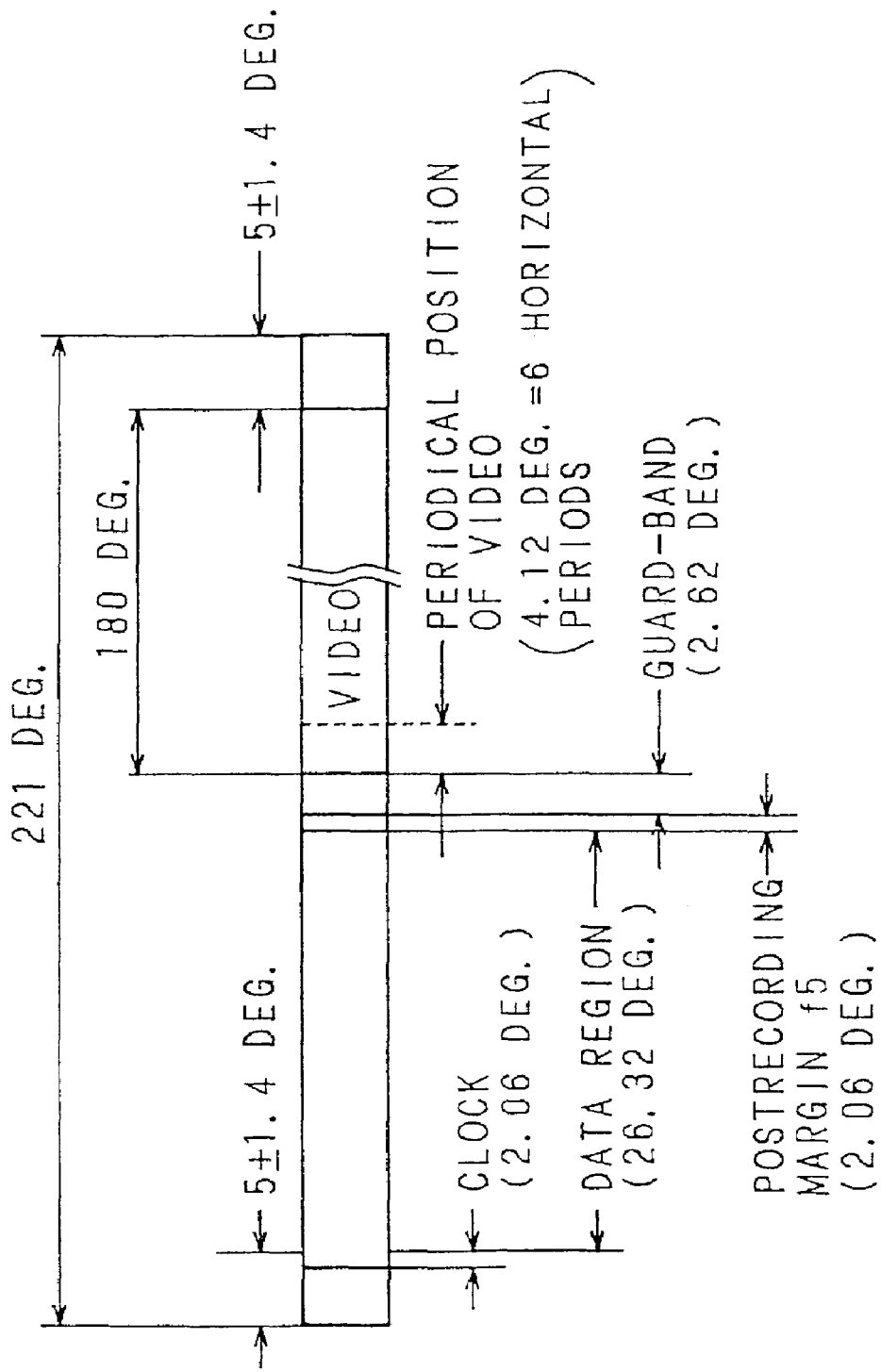
FIG. 10 is a diagram showing the format of one track according to the 8-mm VTR standard.
Figure 11:
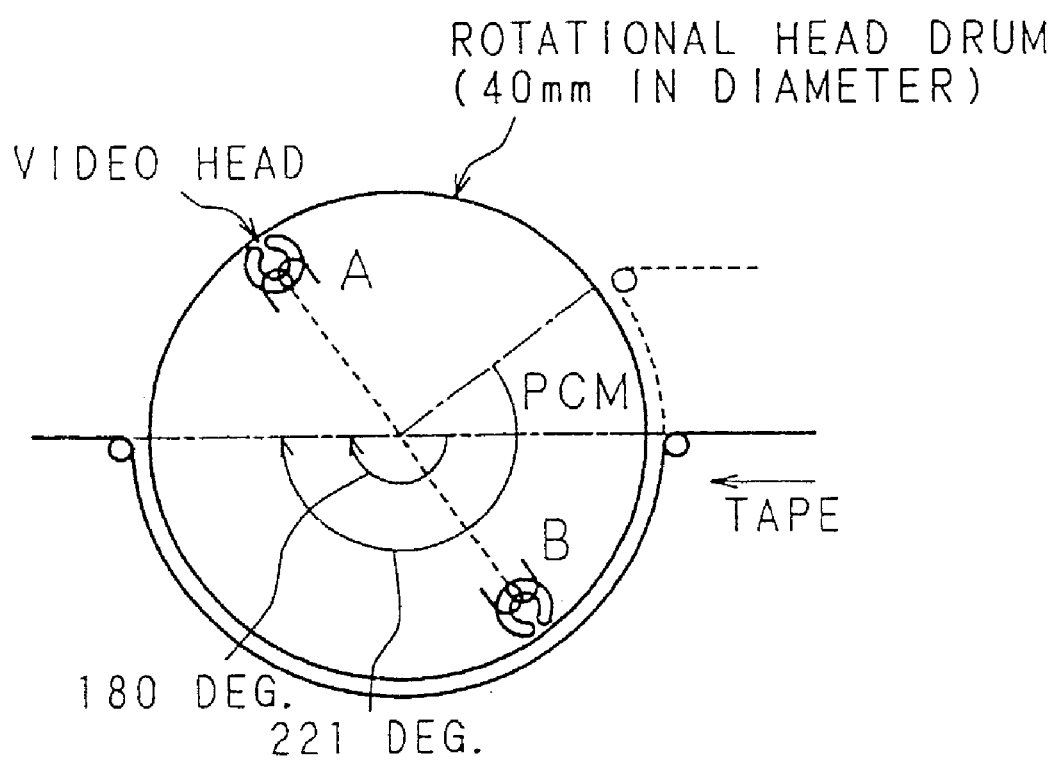
FIG. 11 is a diagram showing the relationship between a rotational head drum and a magnetic tape wound around it used in an 8-mm VTR.
Figure 12:
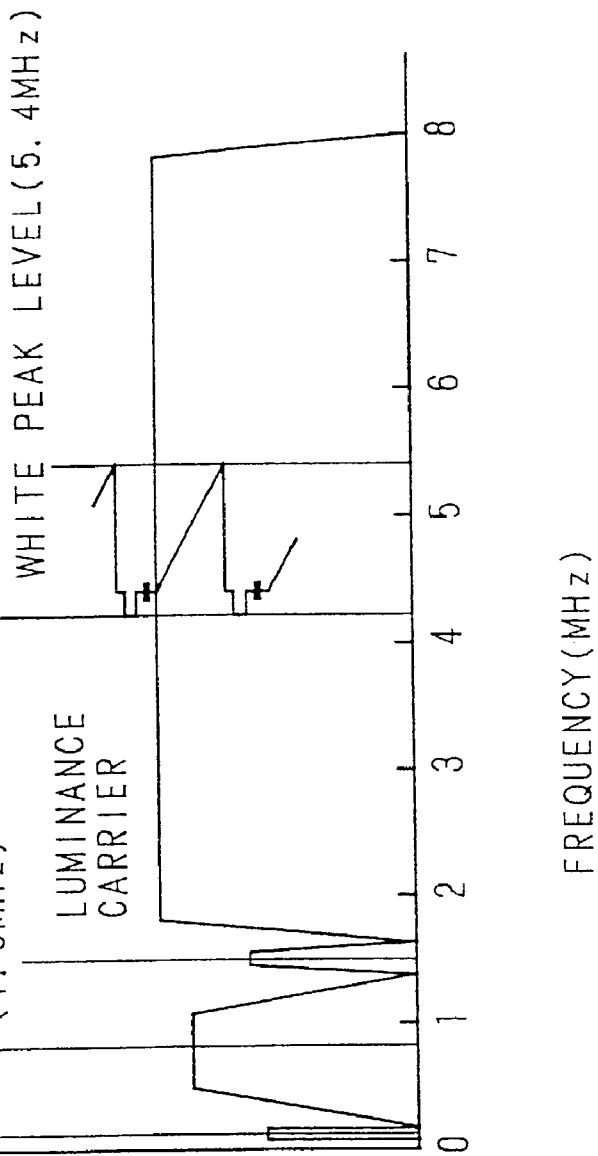
FIG. 12 is a graph showing the frequency allocation of each signal in the 8-mm VTR standard.
Figure 13A:
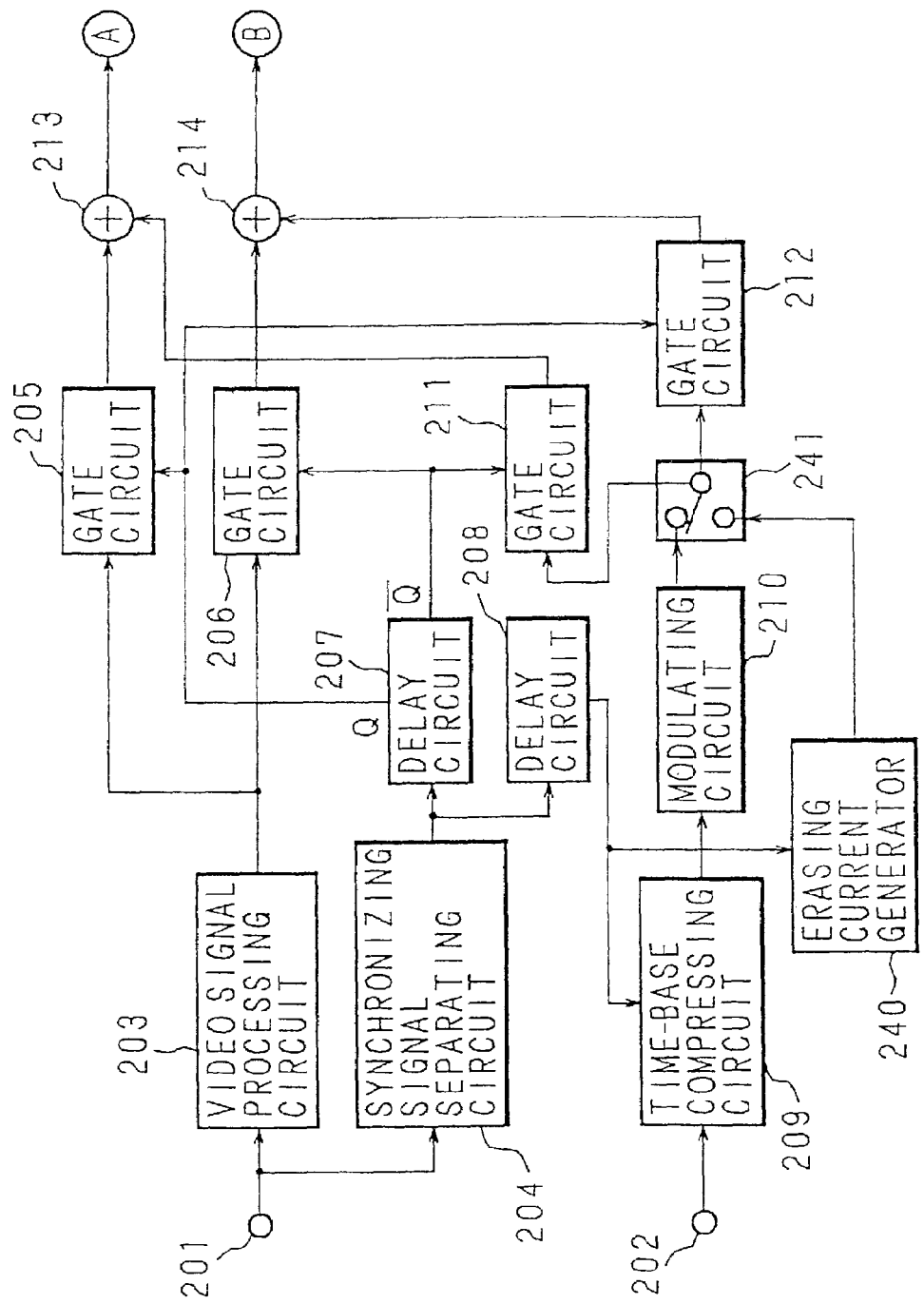
FIGS. 13A and B is a block diagram showing the configuration of a conventional video information recording/reproducing apparatus.
Figure 13B:
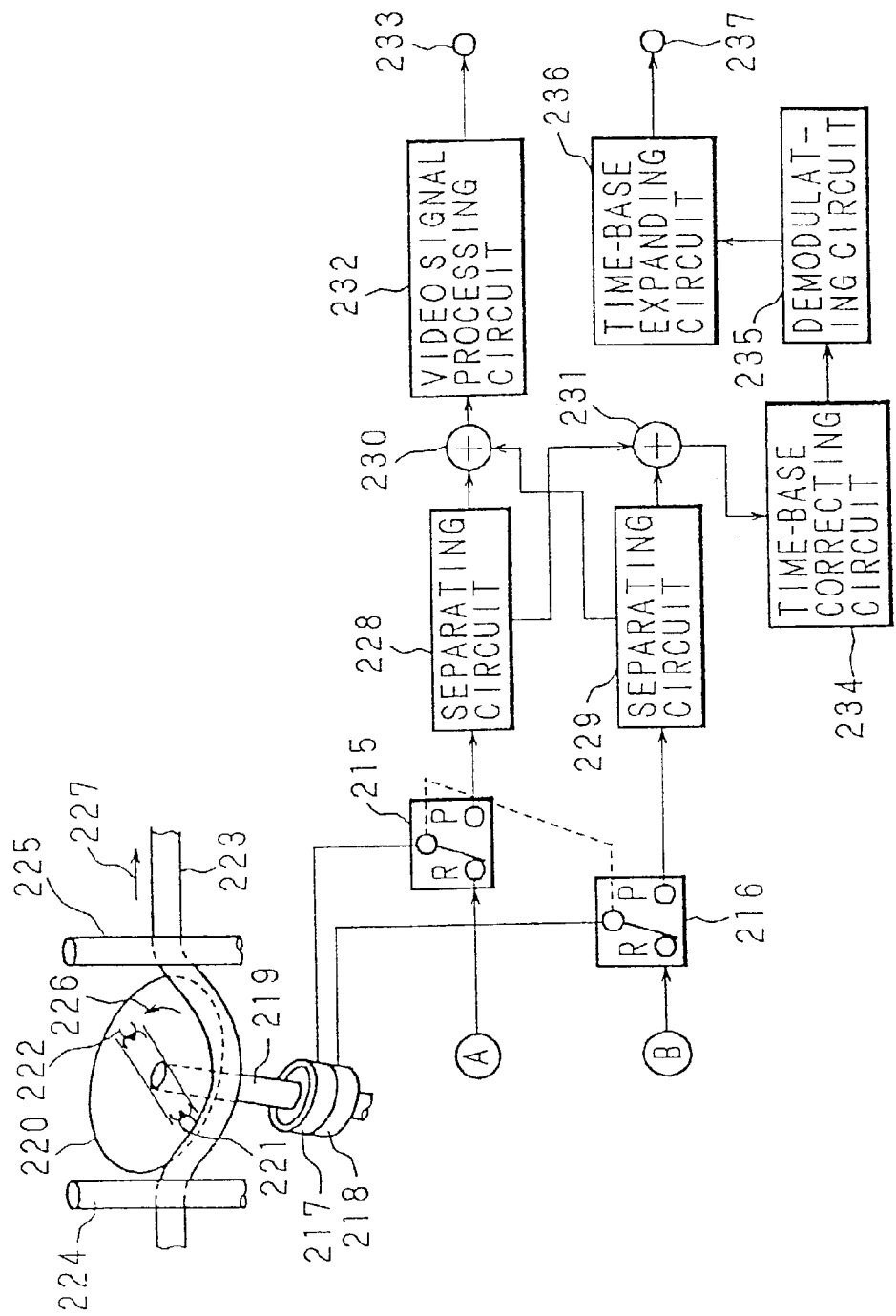
Figure 14:
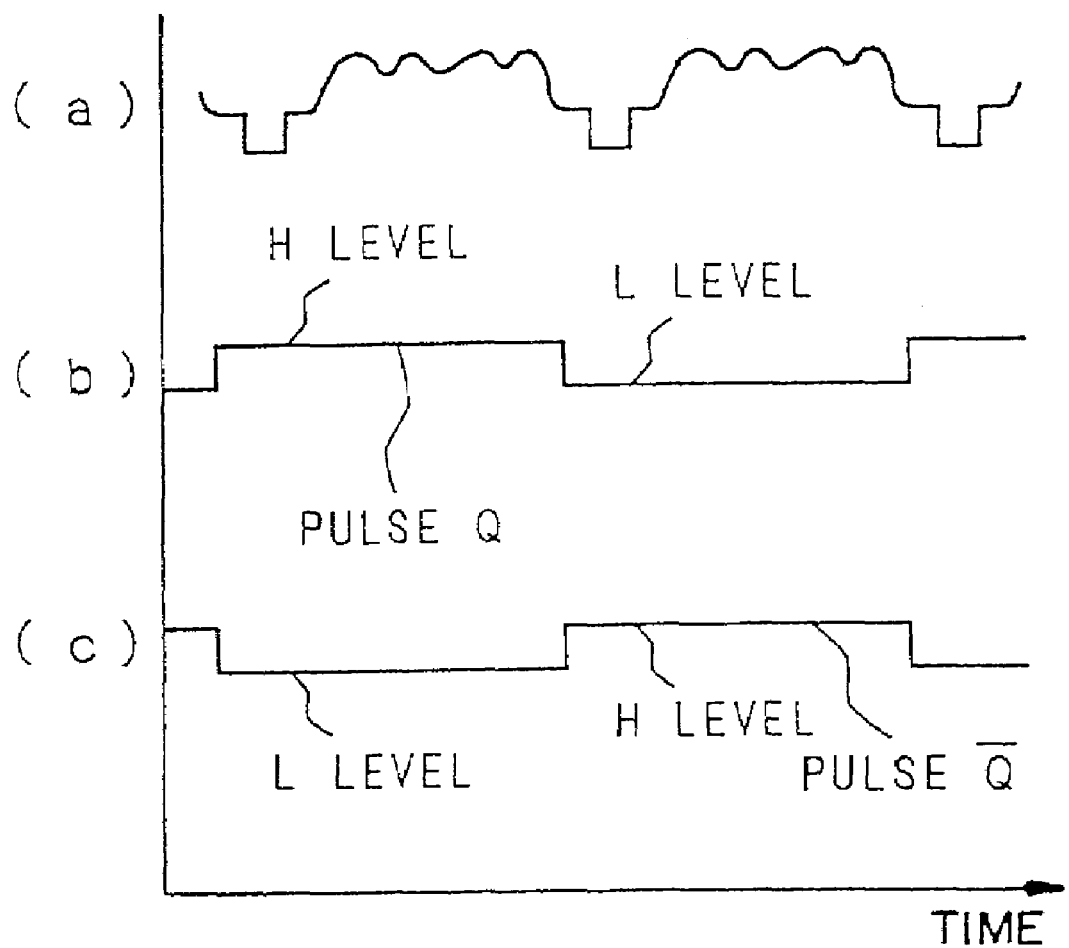
FIGS. 14A, B and C is a timing chart showing the relationship in phase between pulse signals for switching a head and input video signals in the video information recording/reproducing apparatus of FIG. 13.
Figure 15:
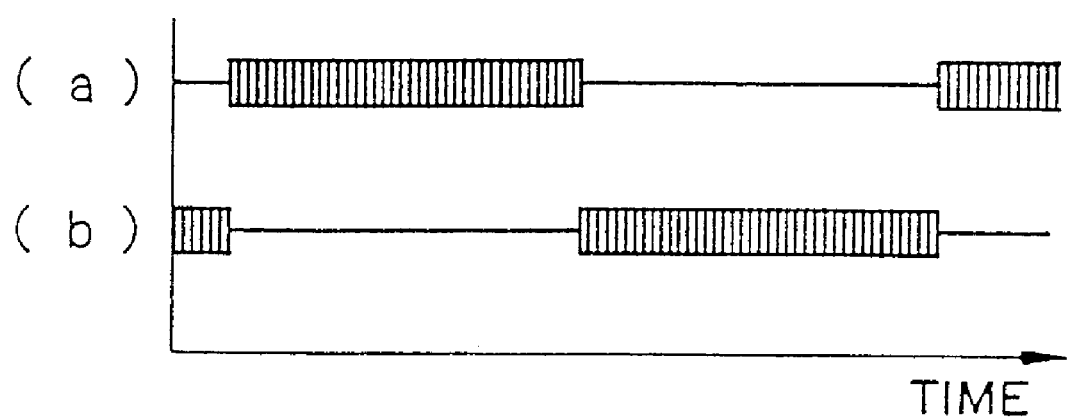
FIGS. 15A and B is a waveform chart showing video signals processed by gate circuits in the video information recording/reproducing apparatus of FIG. 13.
Figure 16:
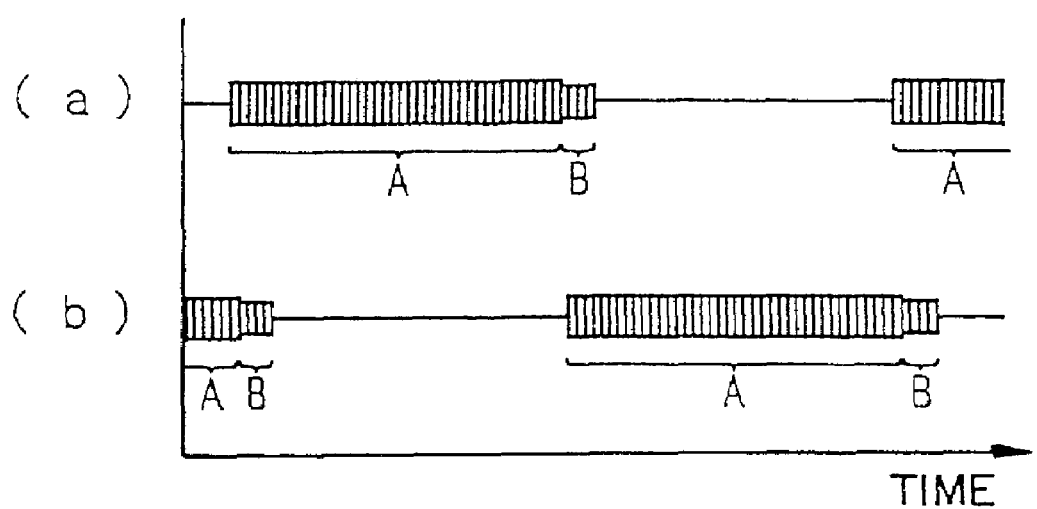
FIGS. 16A and B is a waveform chart showing time-base multiplexed signals in the video information recording/reproducing apparatus of FIG. 13.
Figure 17:
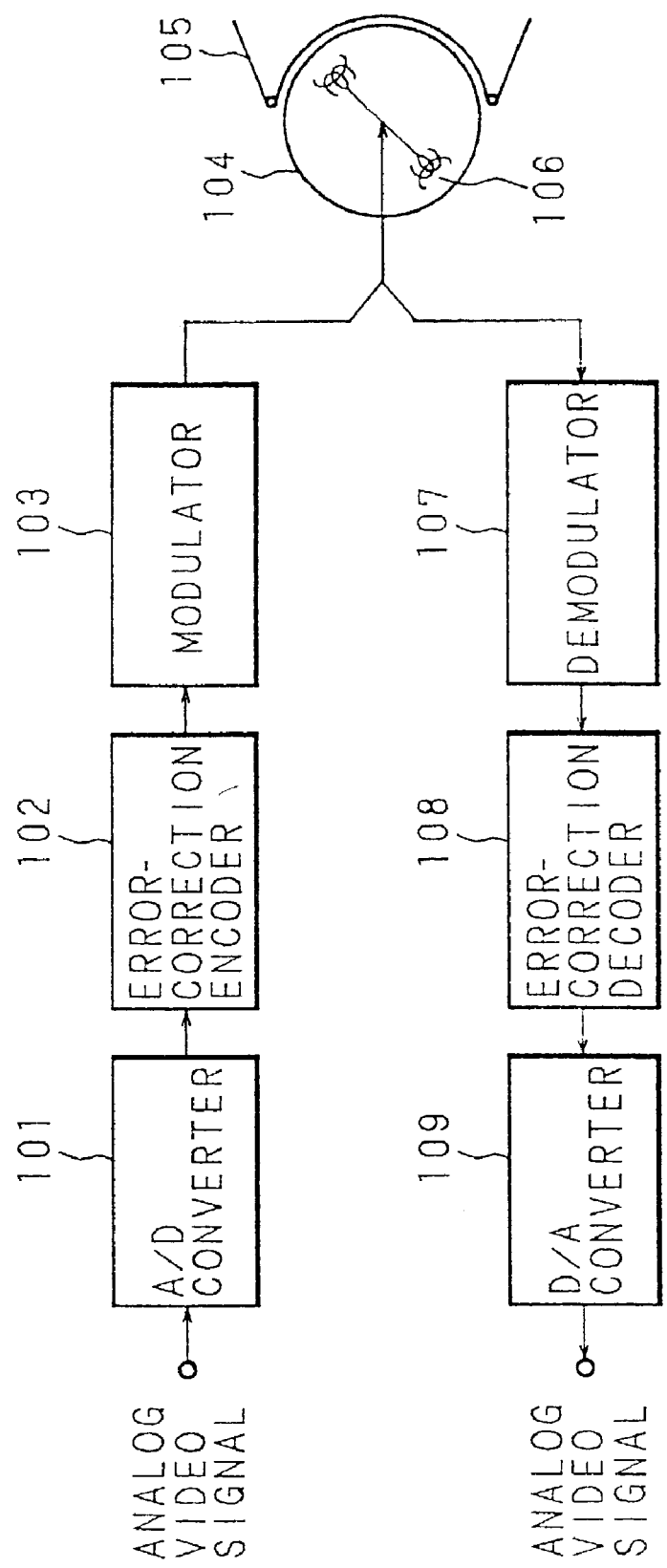
FIG. 17 is a block diagram showing the configuration of another conventional video information recording/reproducing apparatus.
Figure 18:
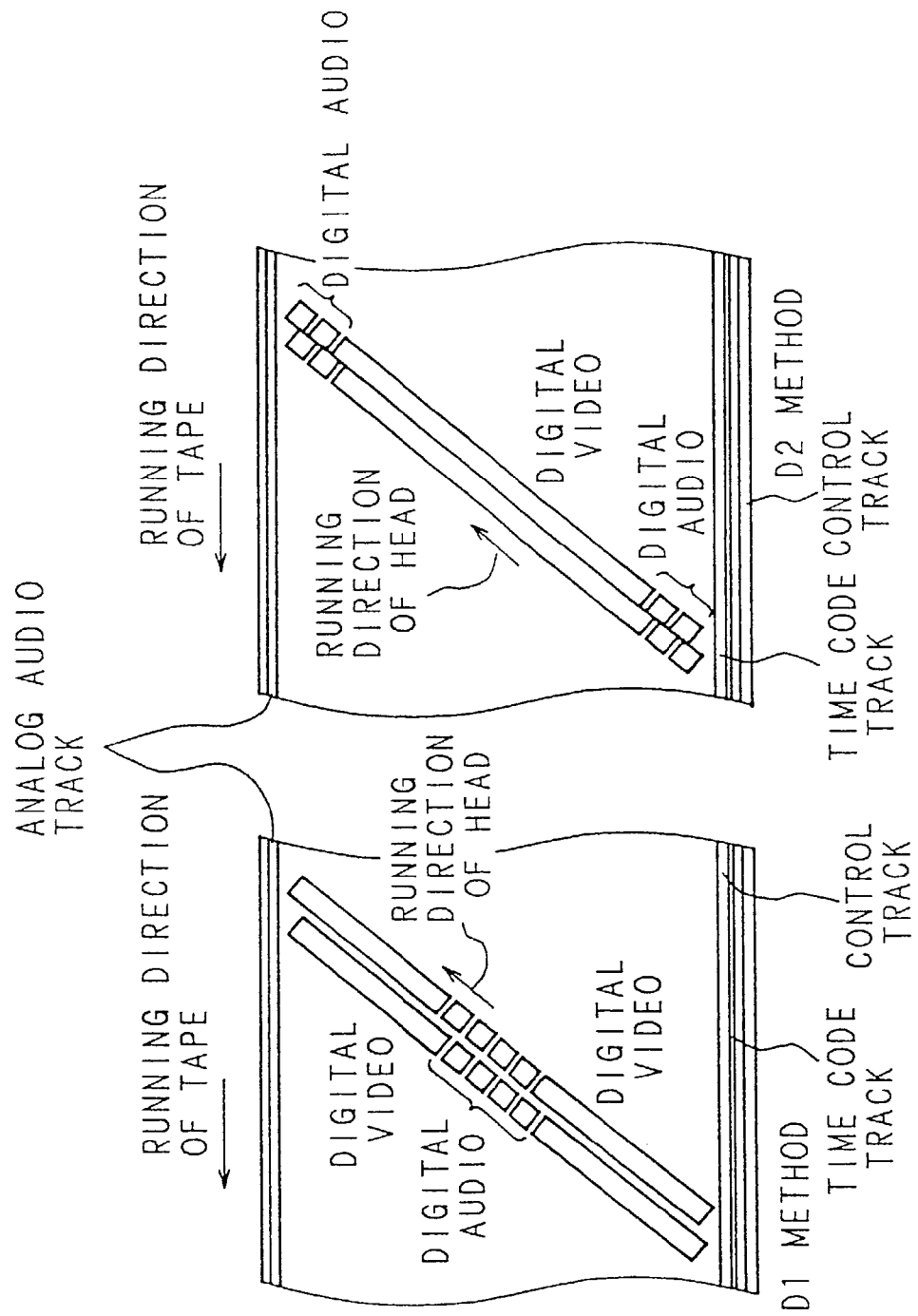
FIG. 18 is a diagram showing the tape formats of VTRs of the D1 and D2 methods.
Figure 28:
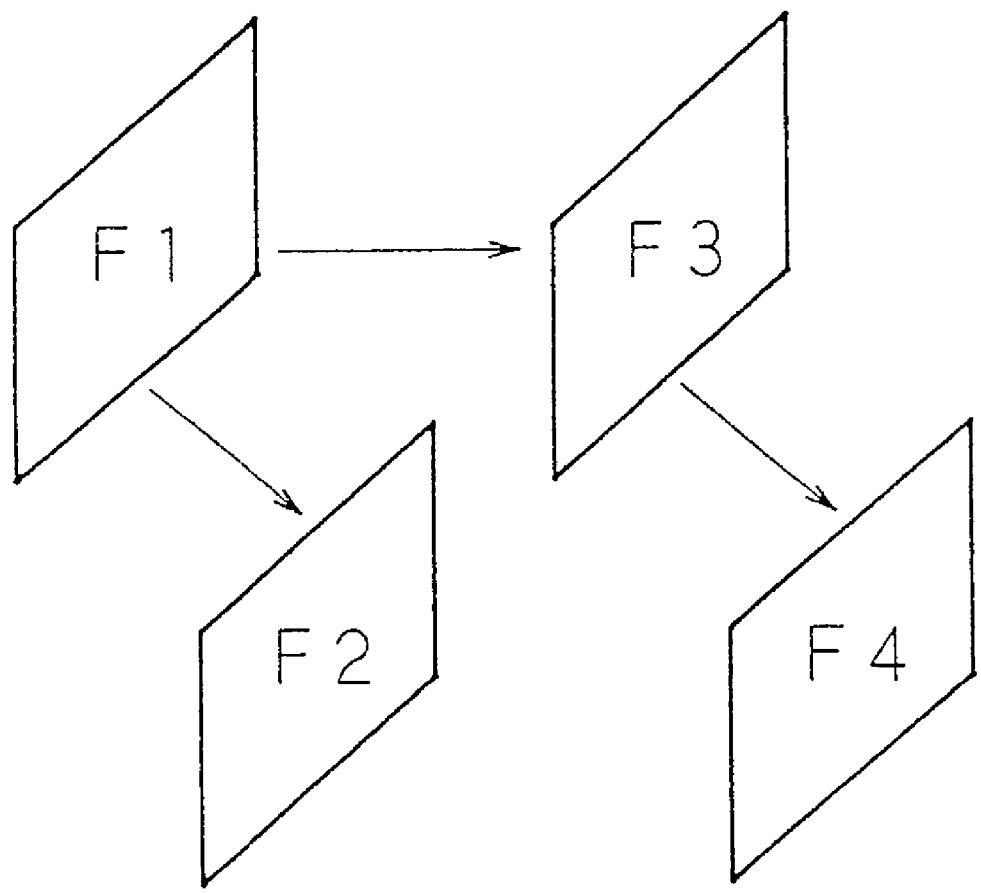
FIG. 28 is a diagram showing the relationship between fields in a motion-compensation prediction process.

According to the present invention, in the case that a scene change occurs in the unit of frame when the predictive method shown in FIG. 4 is used for an ordinary picture, the number of blocks, which select an intra mode in encoding the picture immediately after the scene change, increases, and the reference picture used thereafter can be switched as shown in FIG. 28.

Figure 32:
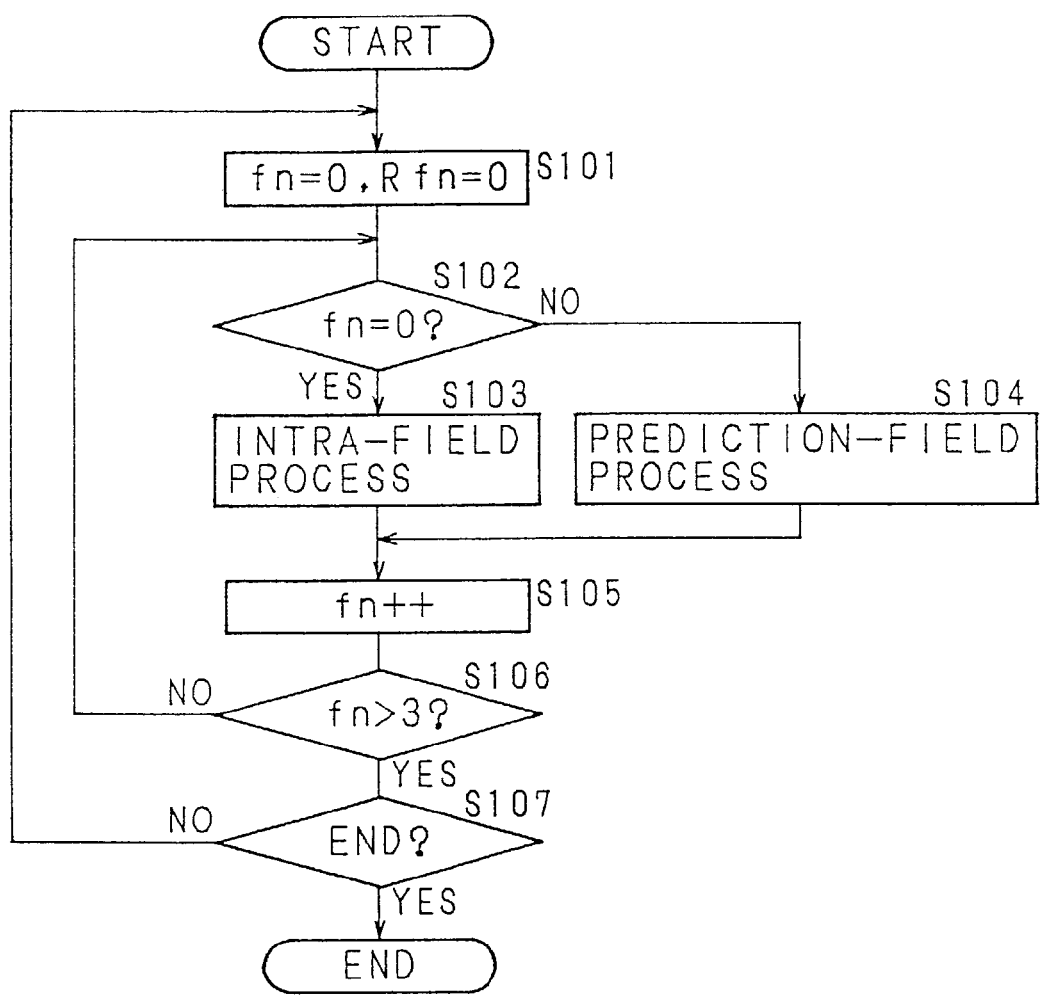
FIG. 32 is a flowchart of the operation of the high-efficiency encoder of FIG. 31.
Figure 33:
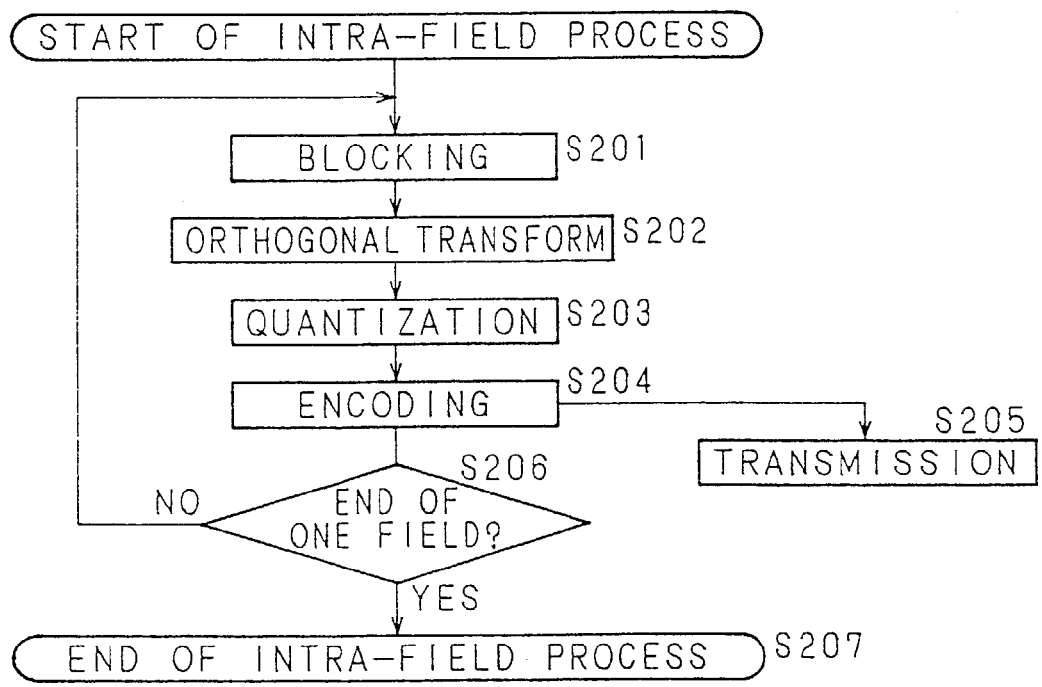
FIG. 33 is a flowchart of an intra-field process in FIG. 32.
Figure 34:
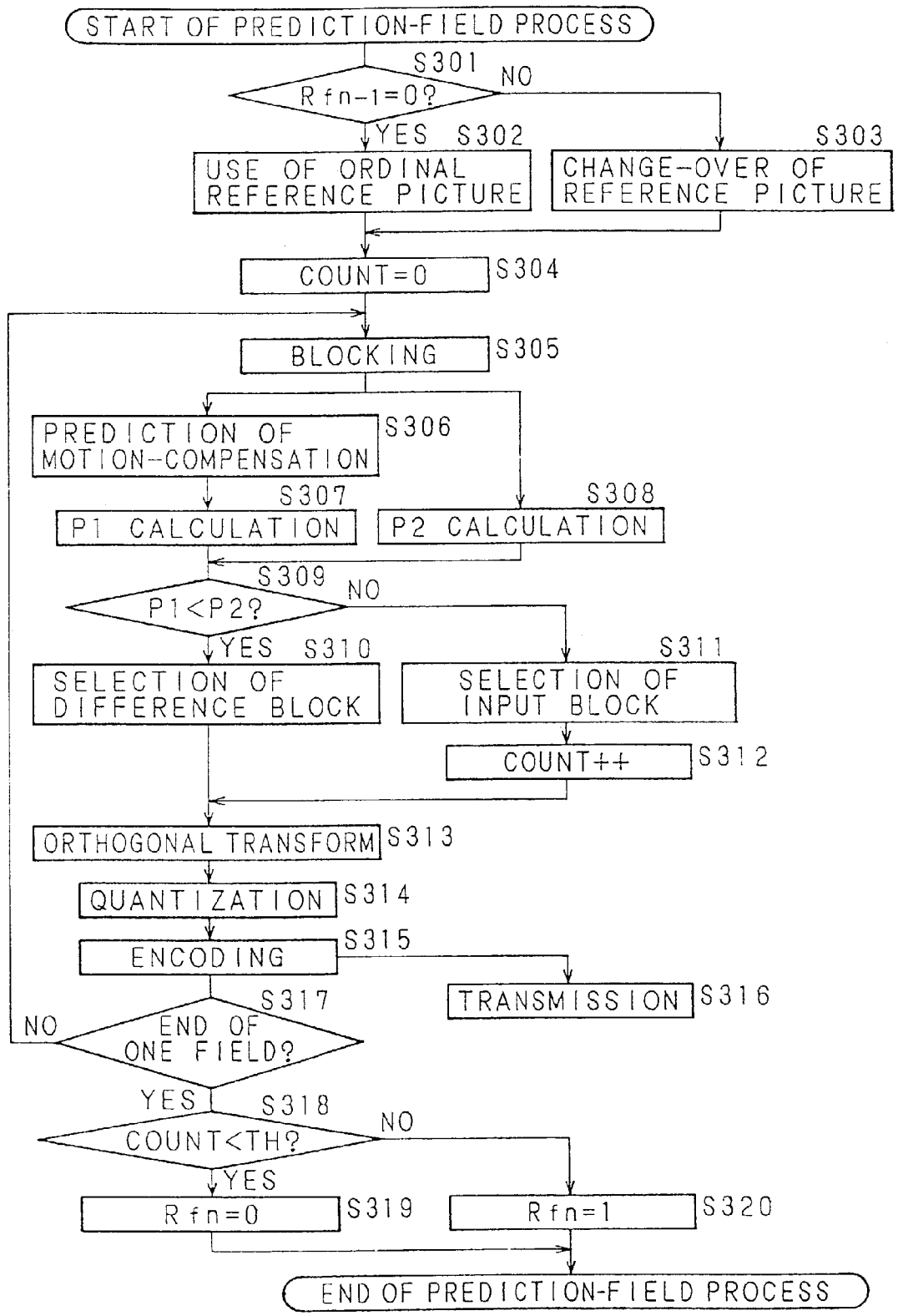
FIG. 34 is a flowchart of a prediction-field process in FIG. 32.

The operation in Embodiment 3 is summarized below with reference to flowcharts in FIGS. 32, 33 and 34. FIG. 32 is a flowchart showing the whole operation in Embodiment 3, FIG. 33 is a flowchart showing an intra-field process of step S103 in FIG. 32, and FIG. 34 is a flowchart showing a prediction-field process of step S104 in FIG. 32.

Firstly, the field number fn indicative of the field in the motion-compensation prediction process unit is set to be 0 (step S101). Referring to FIG. 4, this field number fn will be described. Intra-field F1 which comes first in the motion-compensation prediction process unit is identified by the field number fn=0, intra-field F2 is identified by the field number fn=1, next intra-field F3 is identified by the field number fn=2, and intra-field F4 which comes last in the motion-compensation prediction process unit is identified by field number fn=3. Since a motion-compensation process has been just started, the field to be initially processed is surely the first field in the motion-compensation prediction process unit and an intra-field, and therefore the field number fn is set to be 0 (fn=0) in step S101. A reference picture switching flag Rfn which functions as a flag for determining whether a scene change exists is set in a later prediction-field process, but in this step the flag Rfn is set to be 0 (Rfn=0) for initialization.

Then, the field number fn is checked to determine whether it is 0 or whether the field is the first field in the motion-compensation prediction process unit and an intra-field (step S102). If the field number fn is 0 (fn=0), this field is processed as an intra-field (step S103). In contrast, if the field number fn is not 0 (fn≠0), this field is processed as a prediction-field. These processes will be described in detail later. After each field is processed, the field number fn is incremented so as to indicate the next field (step S105). In an actual hardware, such a field number can be controlled by a microcomputer signal or the like.

It is judged whether the field number fn indicating the next field is a number indicating a field within the motion-compensation prediction process unit (step S106). If the field number fn is a number not indicating a field within the motion-compensation prediction process unit, for example, as in FIG. 4, wherein since the motion-compensation process unit has been completed within four fields and the field number fn of an intra-field has been set to be 0, if fn=4, it means that a series of motion-compensation prediction units have been completed. If fn<4, it is judged that the next field is still within the motion-compensation process unit, and the process is repeated.

When a series of the motion-compensation prediction process units have been completed, it is judged whether all of the required fields have been processed (step S107). This judgment can be done by, for example, checking the operation of an end switch of the high-efficiency encoder. If the next field is to be processed, in order to encode the next motion-compensation prediction process unit, the variables are initialized, and the process is repeated. If the operation of the high-efficiency encoder has been completed, the encoding is ended.

The intra-field process will be described with reference to the flowchart in FIG. 33. The field which is determined in step S102 in FIG. 32 to be processed as an intra-field is segmented into the predetermined size of m [pixels]×n [lines] in the processed field (step S201). Then, an orthogonal transform such as DCT is performed on the blocks of that size (step S202). The data on which orthogonal transform has been performed are quantized into a predetermined bit number which is set for each sequence (step S203). In an orthogonal transform such as DCT, generally, a quantization is performed in such a manner that a larger bit number is assigned to a DC and low-order segments of AC, and a smaller bit number is assigned to a high-order sequence of AC. The quantized data are converted into codes suitable for transmission (step S204), and the encoded data are transmitted (step S205). It is judged by, for example, counting the number of processed blocks, whether the process of one field has been completed (step S206). If the process of one field has not yet been completed, the process for the next block is pursued. If the process of one field has been completed, the intra-field process is ended.

The prediction-field process will be described with reference to the flowchart in FIG. 34. The field which is determined in step S102 in FIG. 32 to be processed as a prediction-field is checked to judge whether Rfn−1=0, in the reference picture switch flag, in the process of the previous field or whether a scene change has been detected in the process of the field preceding the field currently being processed (step S301). If Rfn−1=0, motion-compensation prediction is performed using the reference picture in the same position as before (step S302). If Rfn−1=1, it means that a scene change has been detected when field number fn−1 being processed. Therefore, in the motion-compensation prediction for field number fn the reference picture is switched to a picture of a field in a position different from the previous position, and motion-compensation prediction is performed using the new reference picture (step S303).

Then, a variable COUNT for counting the number of blocks which select an intra mode in one field to be processed is set to be 0 (step S304). The variable COUNT will be described in detail later. An input picture is segmented into the predetermined size of m [pixels]×n [lines] in the processed field (step S305). The blocks segmented into the size of m×n are subjected to motion-compensation prediction (step S306). Using the reference picture set in step S302 or S303, the difference in the unit of pixel between a predetermined area of a past image and a newly divided block is input as a difference block into difference power calculator 4, and a difference power P1 is calculated (step S307). Namely, by using such preset reference picture, the information amount generated by motion-compensation prediction can be reduced. Then, the newly segmented block is input into original power calculator 5 to calculate an original AC power P2 (step S308).

The calculated powers P1 and P2 are compared in magnitude with each other (step S309). When the difference power P1 is smaller than the original AC power P2, the difference block (the difference value of the block subjected to motion-compensation prediction) is selected (step S310). When the difference power P1 is greater than the original AC power P2, the input block (the original which is still in block form is selected (step S311), and the number of times when an input block is selected as an encoded block or the number of blocks in one field which are to be processed as an intra mode is counted (step S312). A variable that functions as a counter in this step is the COUNT which has been set to be 0 in step S304. This counter is surely set to be 0 when the process in the unit of field starts, and counts the number of blocks which select an intra mode in the processing of one field.

Each selected block is subjected to the orthogonal transform (step S313), and quantized to a predetermined bit number which is set for each sequence (step S314). In an orthogonal transform such as DCT, a quantization is performed in such a manner that a larger bit number is assigned to a DC and low-order sequences of AC, and a smaller bit number is assigned to a high-order sequence of AC. The quantized data are converted into codes suitable for transmission (step S315), and the encoded data are transmitted (step S316). For example, the number of processed blocks is counted to judge whether the process of one field has been completed (step S317). If the process of one field has not yet been completed, the process for the next block is pursued.

If the process of one field has been completed, the number of input blocks which have been processed as encoded blocks in the process of that one field or the number of blocks which have selected an intra mode is compared with a preset threshold TH (step S318). The threshold TH is a predetermined number which is less than the number of blocks in one field. When the total number of blocks in one field is 2,700, for example, the threshold TH is set to be 1,000 which is less than 2,700. If the variable COUNT indicating the number times when input blocks being selected as encoded blocks is smaller than the threshold TH, there is no scene change between the field (field number fn) which has been just processed and the reference picture which has been used in motion-compensation prediction of that field, and the reference picture switch flag Rfn is set to be 0 (Rfn=0) so that the reference picture in a normal position is used as the reference picture for the motion-compensation of the next field (field number fn+1) (step S319). If the variable COUNT indicating the number of times when input blocks being selected as encoded blocks is greater than the threshold TH, there is a scene change between the field (field number fn) which has been just processed and the reference picture which has been used in motion-compensation prediction of that field, and the reference picture for the motion-compensation of the next field (field number fn+1) is switched from the reference picture in a normal position to a field in a position different from the position taken till then, for example, the field which has been just processed and is positioned in a place where a reference picture has not existed till then. For that purpose, the reference picture switch flag Rfn is set to be 1 (Rfn=1) (step S320). In this way, the reference picture switch flag Rfn is set and the prediction-field process is ended.

Figure 35:
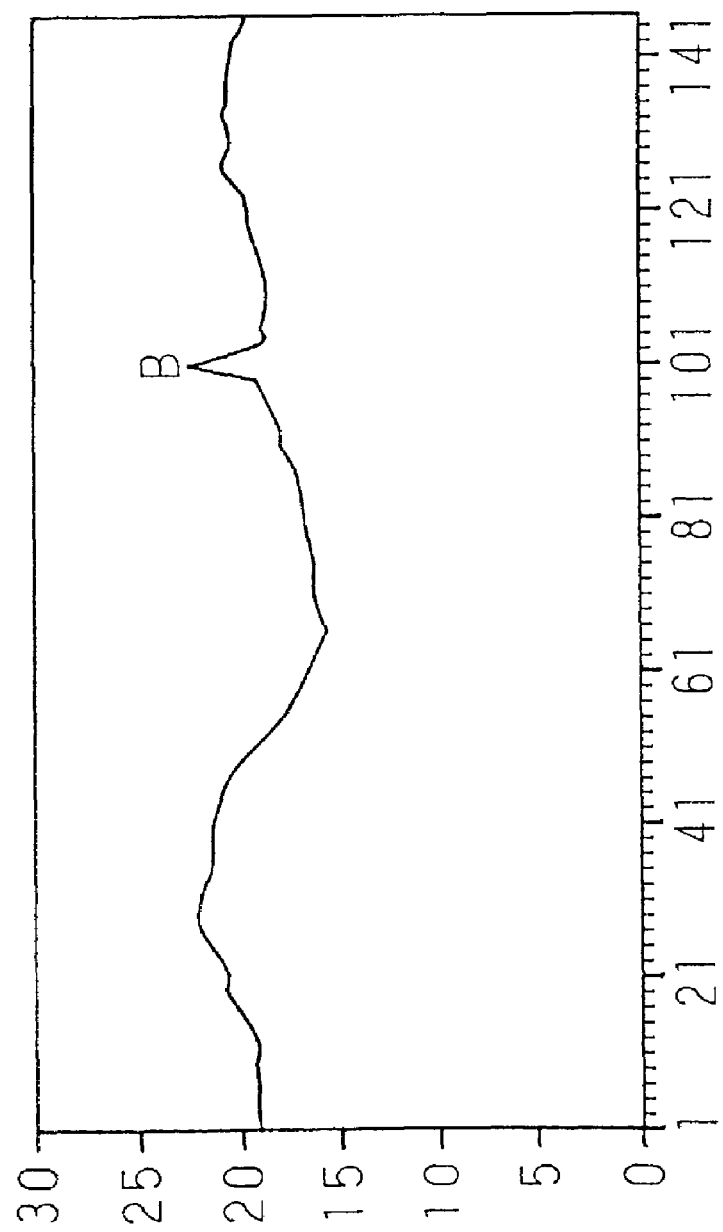
FIG. 35 shows the change of the information amount for five seconds in the case that a reference picture is switched.
Figure 36:
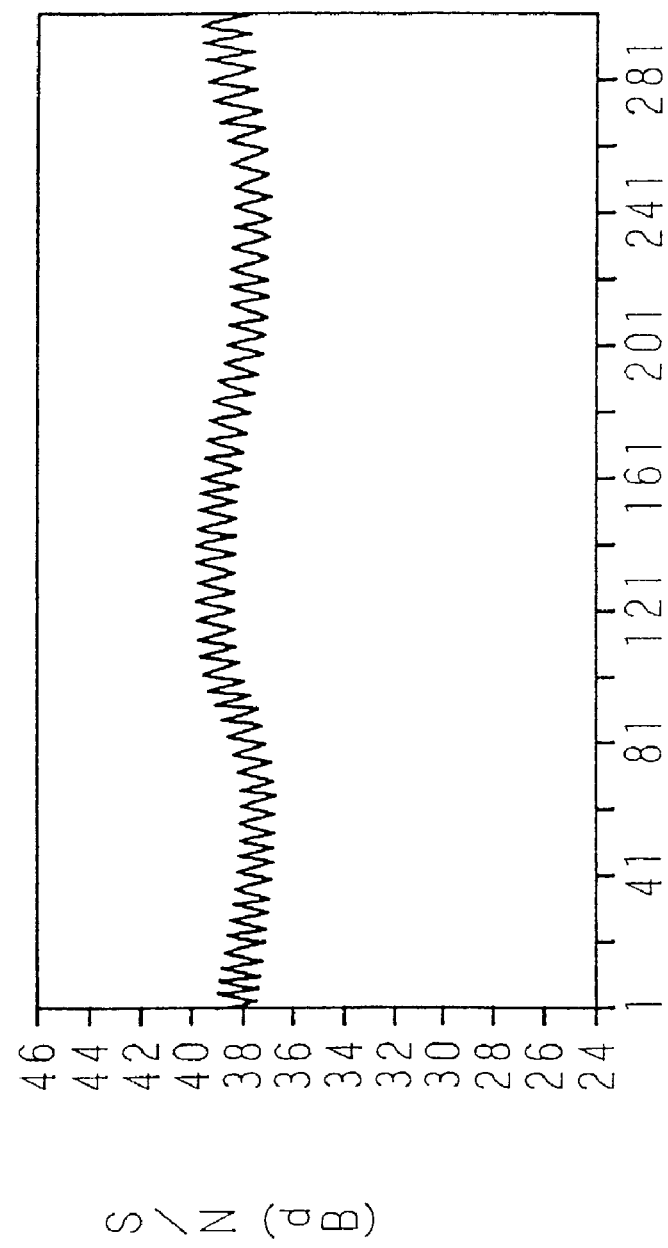
FIG. 36 shows the variation of the S/N ratio for five seconds in case that a reference picture is switched.

FIG. 35 shows the change of the information amount for five seconds in case that the predictive encoding is performed according to the Embodiment 3, and FIG. 36 shows the variation of the S/N ratio for five seconds in this case. Although a scene change exists at point B, the increase of information amount is suppressed as compared with point A shown in FIG. 7. Furthermore, there is no conspicuous deterioration of the S/N ratio.

Embodiments 4 and 5

In Embodiment 3, in order to select an encoded block from a difference block and an input block, their powers are calculated and compared with each other, and the number of blocks selecting an intra mode are counted.

According to Embodiment 4, in order to select an encoded block from a difference block and an input block, the entropy in each block is calculated, and the entropy of the difference block is compared with that of the input block in the same manner as in Embodiment 3 by the determiner 6, to determine which block is to be selected as an encoded block.

According to Embodiment 5, in order to select an encoded block from a difference block and an input block, adding of absolute values of pixels is performed in each block, the rth power of the sum of absolute values of the input block and that of difference block are calculated, and the rth power of the sum of absolute values of the difference block is compared with that of the input block in the same manner as in Embodiment 3 by the determiner 6, to determine which block is to be selected as an encoded block.

Embodiment 6

In Embodiment 3, the determiner 6 compares the power of an input block with that of a difference block. According to Embodiment 6, when the power of an input block is to be compared with that of a difference block, at least one of the powers of the input and difference blocks is provided with an offset, and then the two powers are compared with each other. For example, the power of the input block is provided with a positive offset, and then compared with the power of the difference block. When there is not a great difference in power between the input and difference blocks, this configuration allows the number of blocks selecting the difference power to be increased, thereby preventing an intra mode from being excessively created.

Figure 37:
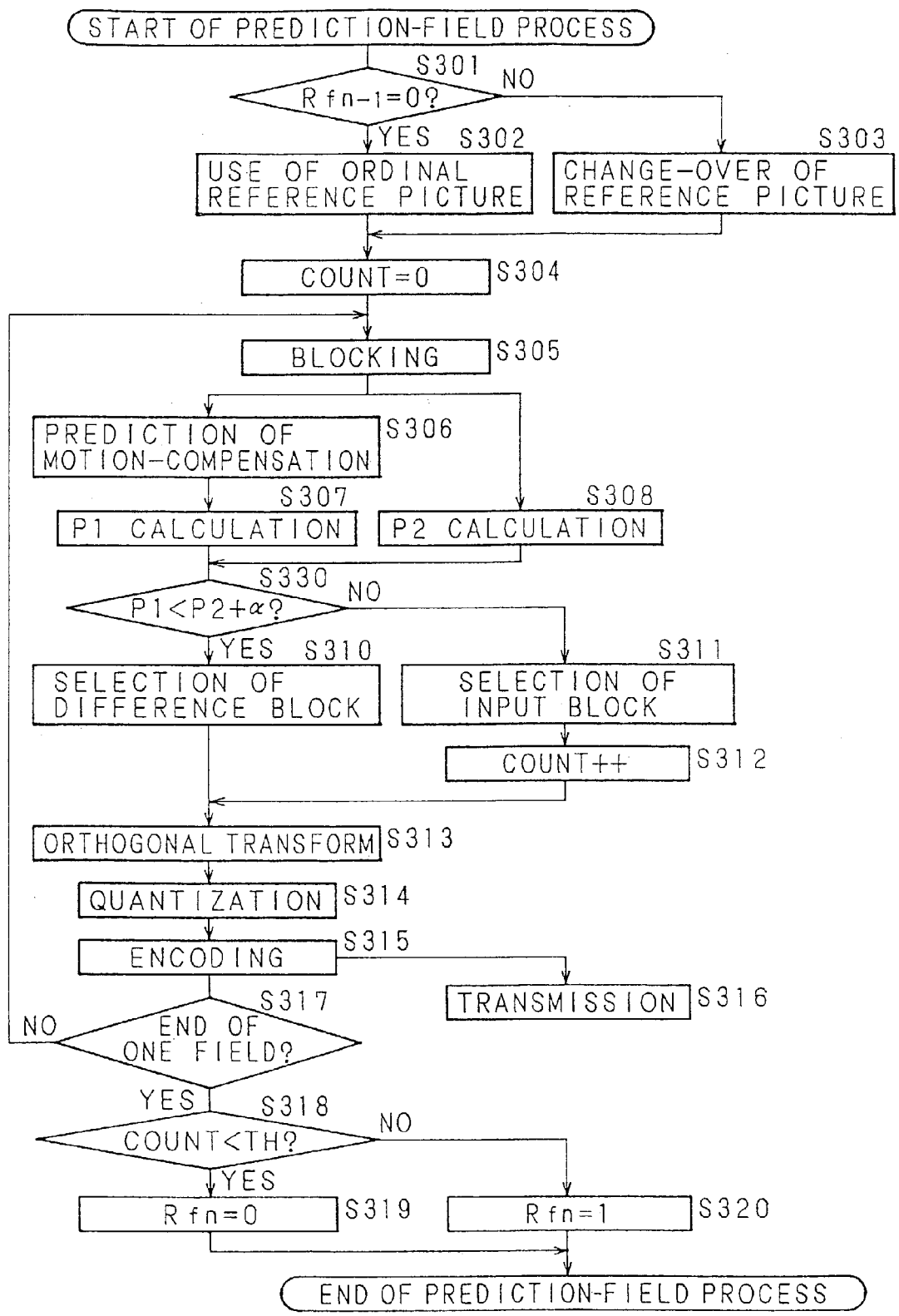
FIG. 37 is a flowchart of another prediction-field process in FIG. 32.

FIG. 37 is a flowchart of a prediction-field process in Embodiment 6. In FIG. 37, portions designated by the same step numbers used in FIG. 34 are identical with those of FIG. 34. The processes from step S301 to step S308 are the same as in Embodiment 3. A difference power P1 calculated from a difference block is compared with a value which is obtained by adding a predetermined offset $\alpha$ to an original AC power P2 calculated from an input block (original block) (step S330). This makes it difficult to obtain P1<P2+$\alpha$ compared with Embodiment 3, so that the number of blocks selecting an intra mode is reduced. As a result, an intra mode is prevented from being excessively created, and the generated information amount can be stably kept at a constant level. The succeeding processes from step S310 to step S320 are the same as in Embodiment 3.

Embodiments 7 and 8

According to Embodiment 7, when the entropy of a difference block is compared with that of an input block in a similar manner as in Embodiment 4, at least one of the entropy of the input and the entropy of the difference block is provided with an offset, and then the two values are compared with each other. For example, the entropy of the input block is provided with a positive offset, and then compared with the entropy of the difference block. When there is not a great difference between the entropy of the input block and the entropy of difference block, this configuration allows the number of blocks selecting difference power to be increased, thereby preventing an intra mode from being excessively created.

According to Embodiment 8, when the sum of absolute values of a difference block is compared with that of an input block in a similar manner as in Embodiment 5, at least one of the rth power of the sum of absolute values of the input block and that of the difference block is provided with an offset, and then the two values are compared with each other. For example, the rth power of the sum of absolute values of the input block is provided with a positive offset, and then compared with the rth power of the sum of absolute values of the difference block. When there is not a difference greater than the offset between the rth power of the sum of absolute values of the input and that of the difference block, this configuration allows the number of blocks selecting the difference power to be increased, thereby preventing an intra mode from being excessively created.

Embodiment 9

In Embodiment 3, the mode counter 50 counts the number of all blocks selecting an intra mode among blocks for one field. In Embodiment 9, blocks for one field are not counted, but, at the time a mode signal in a predetermined number of blocks during one field is determined, the ratio of the number of blocks selecting an intra mode to the total number of blocks or the number of the blocks in which a mode signal has been determined is supplied to the direction switching circuit 51. Based on this ratio, a reference picture switching signal is output from the direction switching circuit 51. This configuration allows the reference picture for the next field to be determined even when encoding of all blocks for one field has not yet completed.

Figure 38:
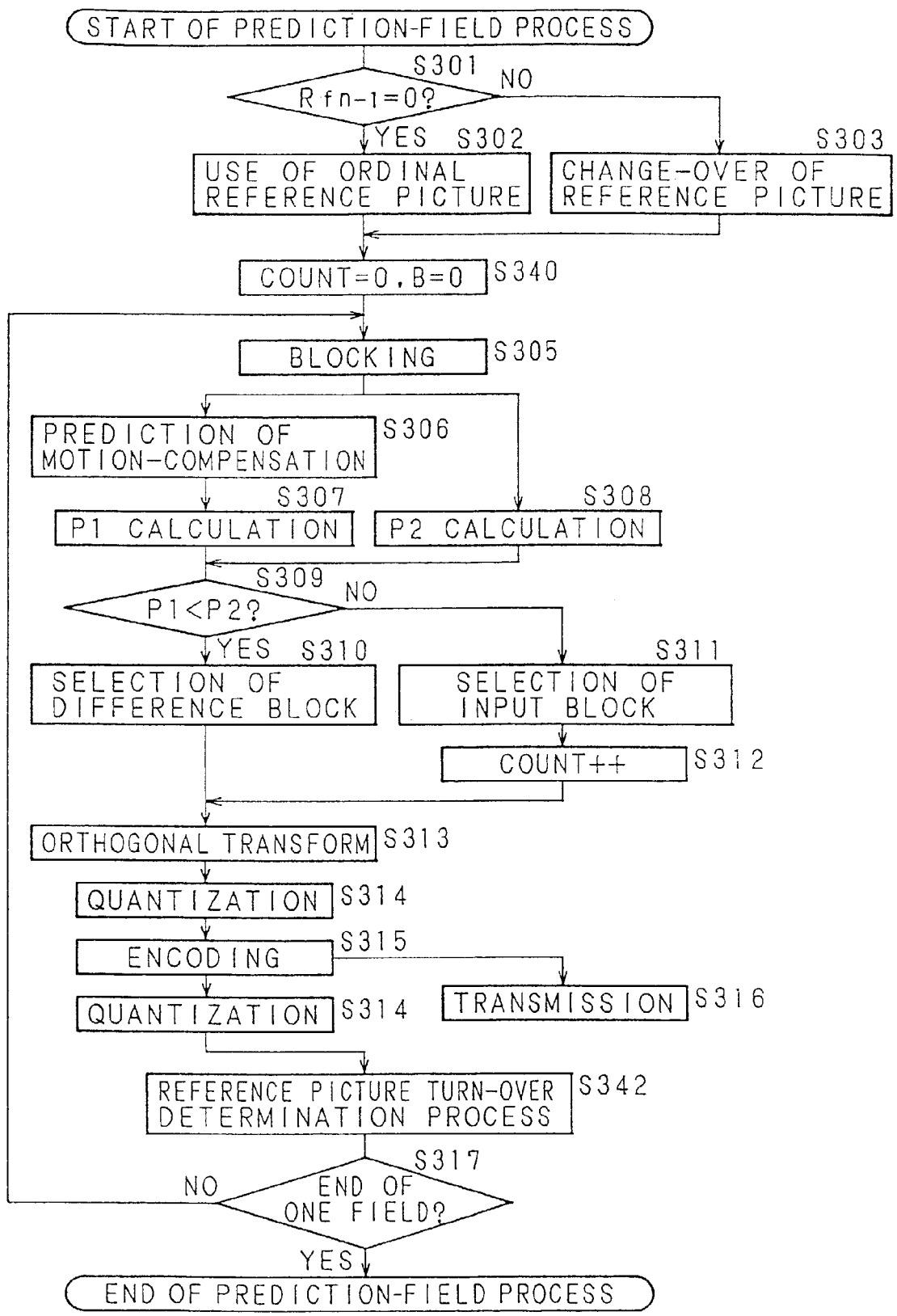
FIG. 38 is a flowchart of a further prediction-field process in FIG. 32.

FIG. 38 is a flowchart of a prediction-field process in Embodiment 9. In FIG. 38, portions designated by the same step numbers used in FIG. 34 are identical with those of FIG. 34. The processes from step S301 to step S303 are the same as in Embodiment 3. After the reference picture for motion-compensation prediction for the next field is set (steps S302 and S303), the variable COUNT for counting the times when intra modes being generated in one field during the processing of the field or the number of blocks selecting input blocks as encoded blocks, and variable B for counting the number of blocks which have been processed in the processing of the one field till then are set to be 0 (step S340). The succeeding steps S305 to S316 are the same as those of in Embodiment 3. After encoding, the number of block which have been processed till then is counted by incrementing the variable B one by one (step S341). The variable B changes from 0 to the maximum number of blocks which can exist in one field. The reference picture switching determination processing for determining whether the reference picture for motion-compensation prediction of the next field is to be switched is performed (step S342). The next step S317 is the same as that of Embodiment 3.

Figure 39:
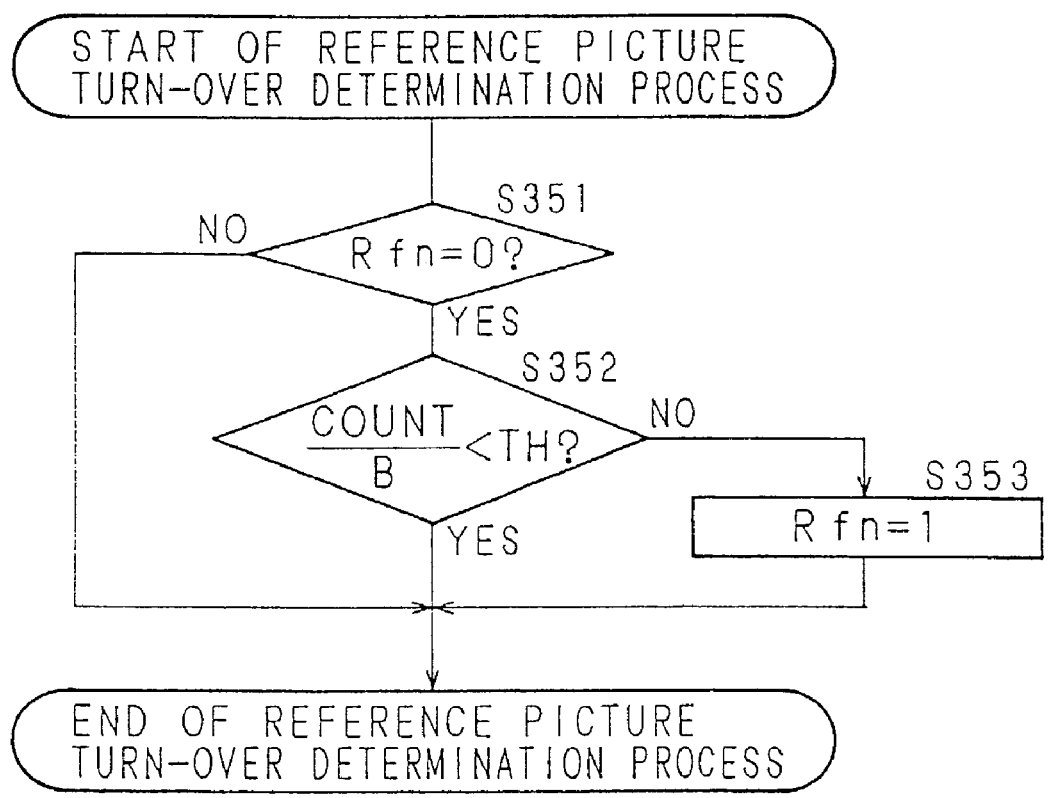
FIG. 39 is a flowchart of a reference picture switching judging process in FIG. 38.

FIG. 39 is a flowchart of the reference picture switch determination process in step S342 in FIG. 38. The process will be described with reference to FIG. 39. It is judged whether the reference picture switch flag Rfn is 0 (step S351). If the flag Rfn is not 0, the process is ended. If the flag Rfn is 0, the ratio of the COUNT for counting the times when input blocks being as encoded blocks to the variable B for counting blocks which have been processed in the processing of the one field till then is compared with the threshold TH (step S352). If the ratio is smaller than the threshold TH, the process is ended. If the ratio is greater than the threshold TH, the flag Rfn is set to be 1 (step S353), and the process is ended.

Embodiment 10

Figure 40:
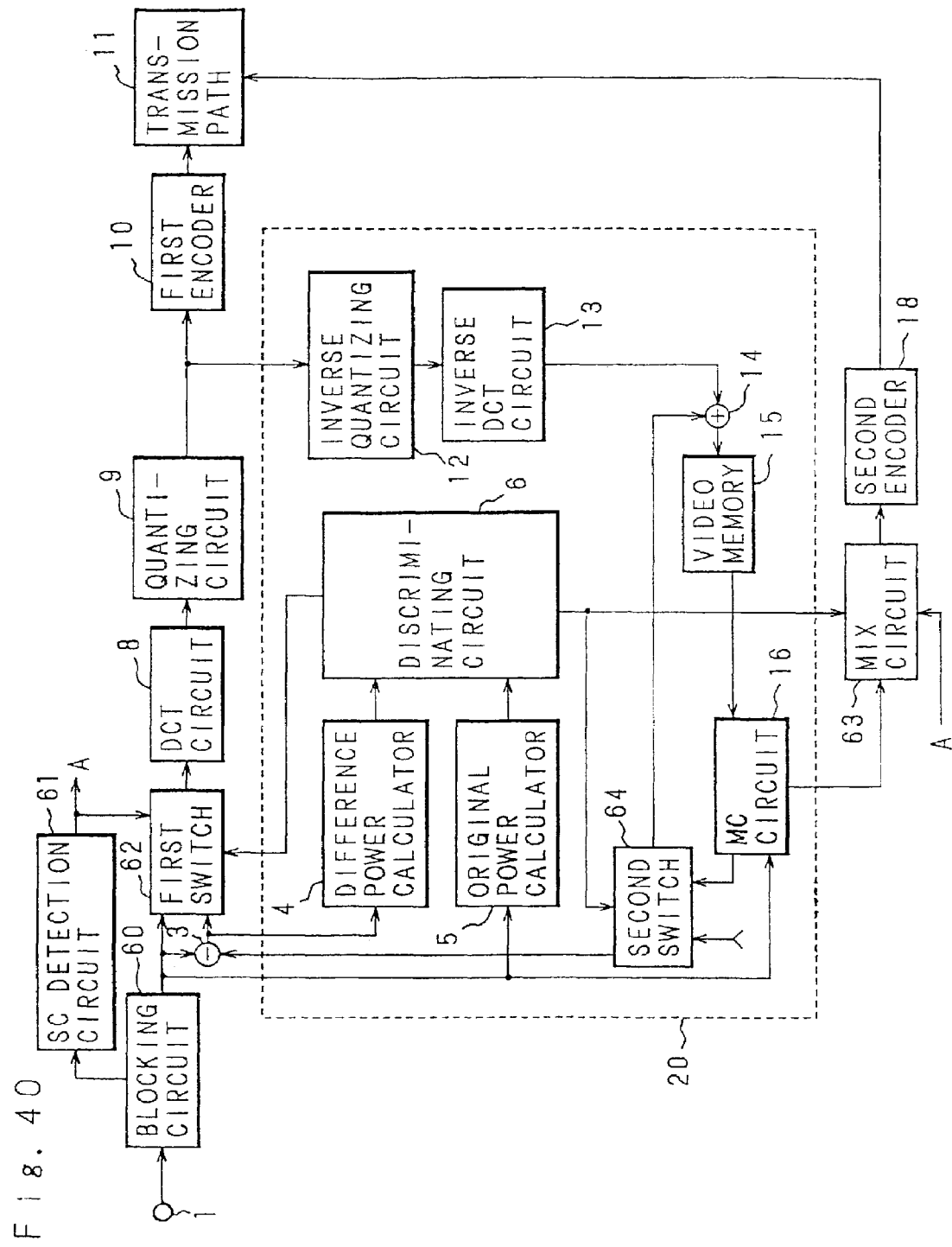
FIG. 40 is a block diagram showing the configuration of a still further high-efficiency encoder according to the invention.

Embodiment 10 will be described with reference to FIG. 40 which shows the configuration of the embodiment. In FIG. 40, the reference numerals 1, 3 to 6, 8 to 16, 18 and 20 are the same as those used in the conventional apparatus in FIG. 2. The reference numeral 60 designates a video memory in which input pictures are stored, 61 designates an SC detection circuit which detects a scene change in a picture and outputs a signal indicative of this, 62 designates a first switch which switches from an input block segmented from an original picture to a difference block generated from a prediction block due to motion-compensation prediction, 63 designates a MIX circuit in which a motion vector, the mode signal of a block from the determiner 6 and the scene change (SC) detection signal from the SC detection circuit 61 are combined, and 64 designates a second switch which switches a prediction block.

Then, the operation will be described. It is assumed that motion-compensation prediction is performed, for example, as shown in FIG. 4 and is completed within four fields. Digital video signals input through the input terminal 1 are stored in the video memory 60. The video memory 60 has a memory for at least two fields, and, while storing video signals of one of the two fields, blocks video data for scene change detection or processing into a predetermined size are output from the other field. Namely, the video memory 60 firstly sends digital video signals to SC detection circuit 61, and characteristics of a picture, for example, obtained from preset parameters, and the presence of a scene change is detected. Then, digital video signals are output from one of the outputs of the video memory 60 while being blocked into the size of, for example, m [pixels]×n [lines] (where m and n are positive integers). The size of m [pixels]×n [lines] corresponds to the block size for performing the two-dimensional orthogonal transform, and also to the block size of a prediction block based on the motion-compensation prediction.

An input block which is obtained only by blocking an original output from the video memory 60, and a difference block that is a difference between the input block and a prediction block which has been subjected to motion-compensation prediction by the subtracter 3 are input to the first switch 62. The input block and the difference block are respectively input to the original power calculator 5 and the difference power calculator 4 in order to obtain the power of each block. Th e original power calculator 5 calculates the AC power of the input block, and the difference power calculator 4 calculates the power of the difference block. The calculated AC power of the input block and the calculated power of the difference block are input to the determiner 6. When the power of the difference block is smaller than that of the input block, the determiner 6 outputs a prediction mode signal, and, when the power of the input block is smaller than that of the difference block, the determiner 6 outputs an intra mode signal. These signals are supplied as a mode signals to the first switch 62, the MIX circuit 63 and the second switch 64.

The first switch 62 to which the input and difference blocks are input outputs either of the blocks as an encoded block. For that purpose, the first switch 62 receives the scene change detection signal from the SC detection circuit 61 and also the mode signal from the determiner 6, to determine the switch mode, and outputs either of the input and difference blocks as an encoded block. The switching states at this time are shown in FIG. 41. Since the process step of motion-compensation prediction completes within four fields as shown in FIG. 4, in the ordinary mode an intra-field is the first field, a prediction-field then continues from the second field to the fourth field, an intra-field is again the first field, and the above is repeated continuously. With respect to the detection of the presence and absence of a scene change shown in FIG. 41, when the scene change detection signal from the SC detection circuit 61 indicates the detection of a scene change, a signal of the presence is output, and, when the scene change detection signal does not indicate the detection of a scene change, a signal of the absence is output. The discriminant mode means the mode signal which is an output of the determiner 6 and described above. The symbol "X" in FIG. 41 means that the state is not affected irrespective of the detection of a scene change or the discriminant mode. As shown in FIG. 41, the first switch 62 determines a selection block, and outputs the selection block as an encoded block.

The encoded block which has been selected and output by the first switch 62 is subjected to two-dimensional orthogonal transform by the DCT circuit 8. The orthogonal-transformed data is subjected to the weighting and threshold processes or the like in the quantizing circuit 9 to be quantized to a predetermined bit number in the respective sequence. The data quantized by the quantizing circuit 9 are converted by the first encoder 10 into codes suitable for the transmission path 11 and then output to the transmission path 11. The data quantized by the quantizing circuit 9 are input also to the local decoding loop 20 so that motion-compensation prediction is performed. The data input to the local decoding loop 20 are subjected to inverse quantizing and inverse weighting processes in inverse quantizing circuit 12, and then subjected to the inverse orthogonal transform by the inverse DCT circuit 13. A decoded block which is an output of inverse DCT circuit 13 is added in the unit of pixel to the prediction block in the adder 14 to become a reproduced image. The prediction block used in this process is identical with that used in the subtracter 3. The block which has become a reproduced image in the adder 14 is written in a predetermined address of the video memory 15.

The memory size of the video memory 15 depends on the type of the employed predictive method. In this embodiment, it is assumed that the video memory 15 consists of a plurality of field memories, and that output blocks reconstructed by the local decoding loop 20 are stored in a predetermined address. These stored images are used as data of the search range for motion-compensation prediction. A block which is segmented from an image reconstructed from past output blocks and is in a motion estimation search range is output from the video memory 15 to the MG circuit 16. The size of the block of the motion estimation search range is i [pixels]×j [lines] (where i≧m, j≧n, and i and j are positive integers). Data in the search range for motion-compensation prediction from video memory 15 and an input block from video memory 60 are input to the MC circuit 16 as reference data, thereby motion vectors being extracted.

The motion vectors extracted by the MC circuit 16 are input to the MIX circuit 63, and combined therein with the mode signal determined by the determiner 6 and the SC detection signal from the SC detection circuit 61. The combined signals are converted by the second encoder 18 into codes suitable for the transmission path 11, and then output together with the corresponding encoded block to the transmission path 11. The MC circuit 16 outputs blocked signals which are segmented from the search range in the size (m [pixels]×n [lines]) equal to that of the input block, as a prediction block. The prediction block output from the MC circuit 16 is produced from past video information. The prediction block is supplied to the second switch 64, and output in accordance with the currently processed field, the mode signal of the decoded block and the SC detection signal from the SC detection circuit 61. Namely, the prediction block is output from one of the output terminals of the second switch 64 to the subtracter 3 in accordance with the processed field and the SC detection signal, and from the other output terminal in accordance with the mode signal of the current decoded block, the SC detection signal arid the processed field.

Figure 42:
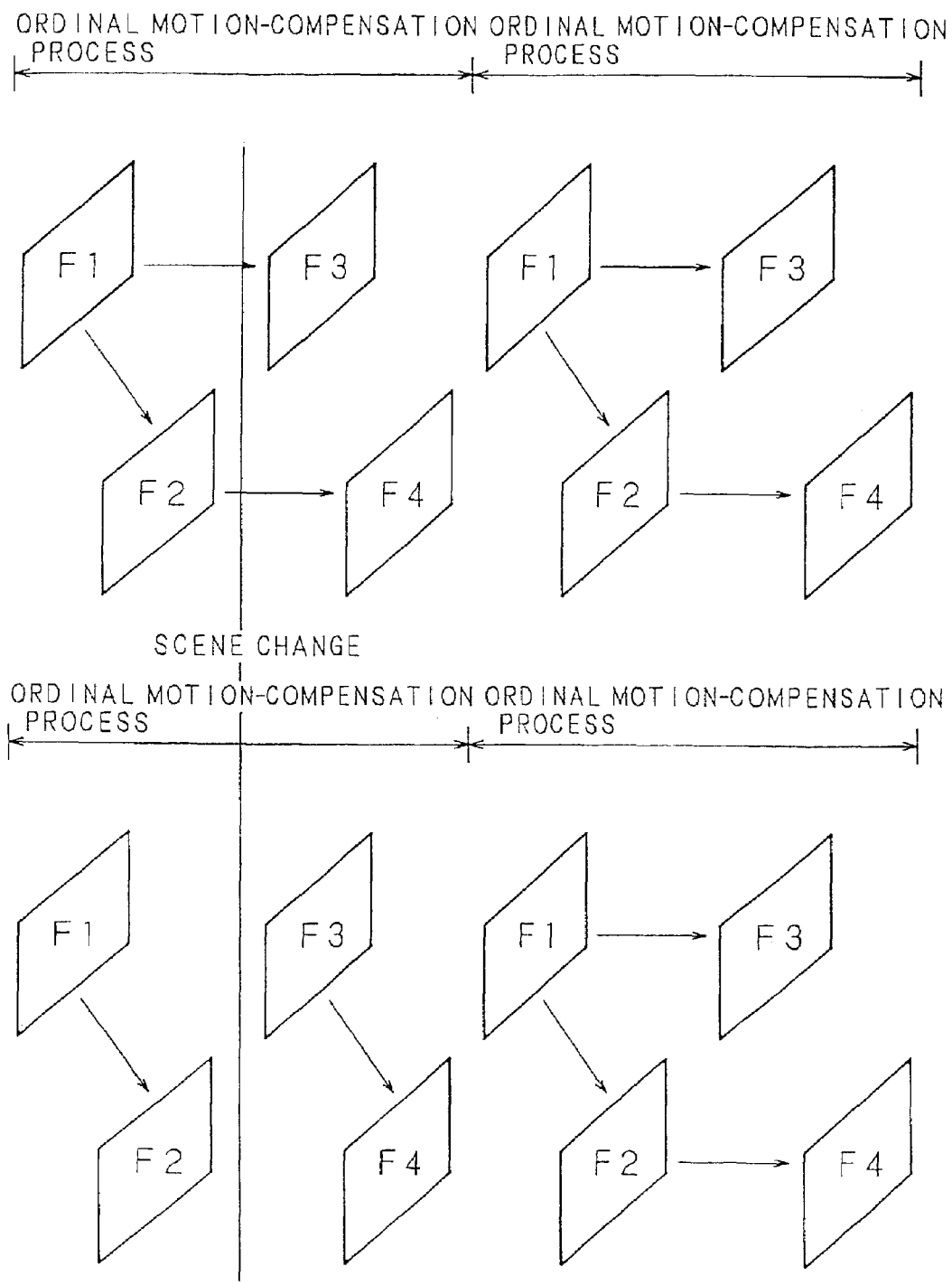
FIG. 42 is a diagram showing a switching between a reference picture and an intra-field in the high-efficiency encoder of FIG. 40.

The motion-compensation prediction process is shown in FIG. 42. In FIG. 42, it is assumed that a scene change occurs between second field F2 and third field F3. Since there is no scene change between first field F1 and second field F2, second field F2 is predicted from first field F1. The scene change between second and third fields F2 and F3 is detected, and third field F3 becomes an intra-field in the same manner as first field F1. Then, fourth field F4 is predicted from third field F3. The prediction is never made on the basis of an image which exists before that scene change. After the motion-compensation prediction process for fourth field F4 is completed, motion-compensation prediction is again performed while using the next field as an intra-field. Therefore, an intra-field surely appears every four fields once the motion-compensation prediction process starts, and, when a scene change occurs, an intra-field exists also in the motion-compensation process.

Figure 43:
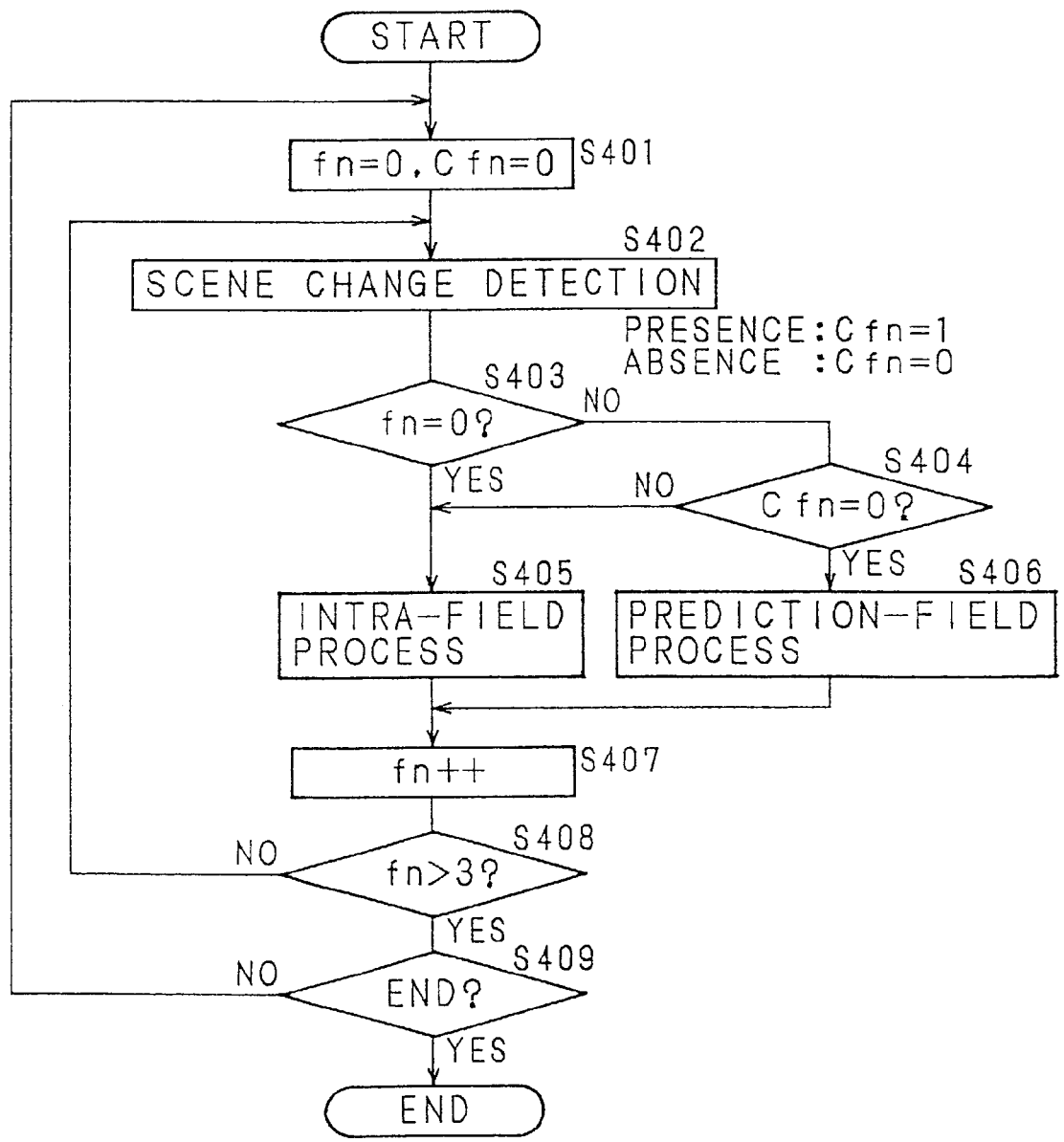
FIG. 43 is a flowchart of an operation of the high-efficiency encoder of FIG. 40.
Figure 44:
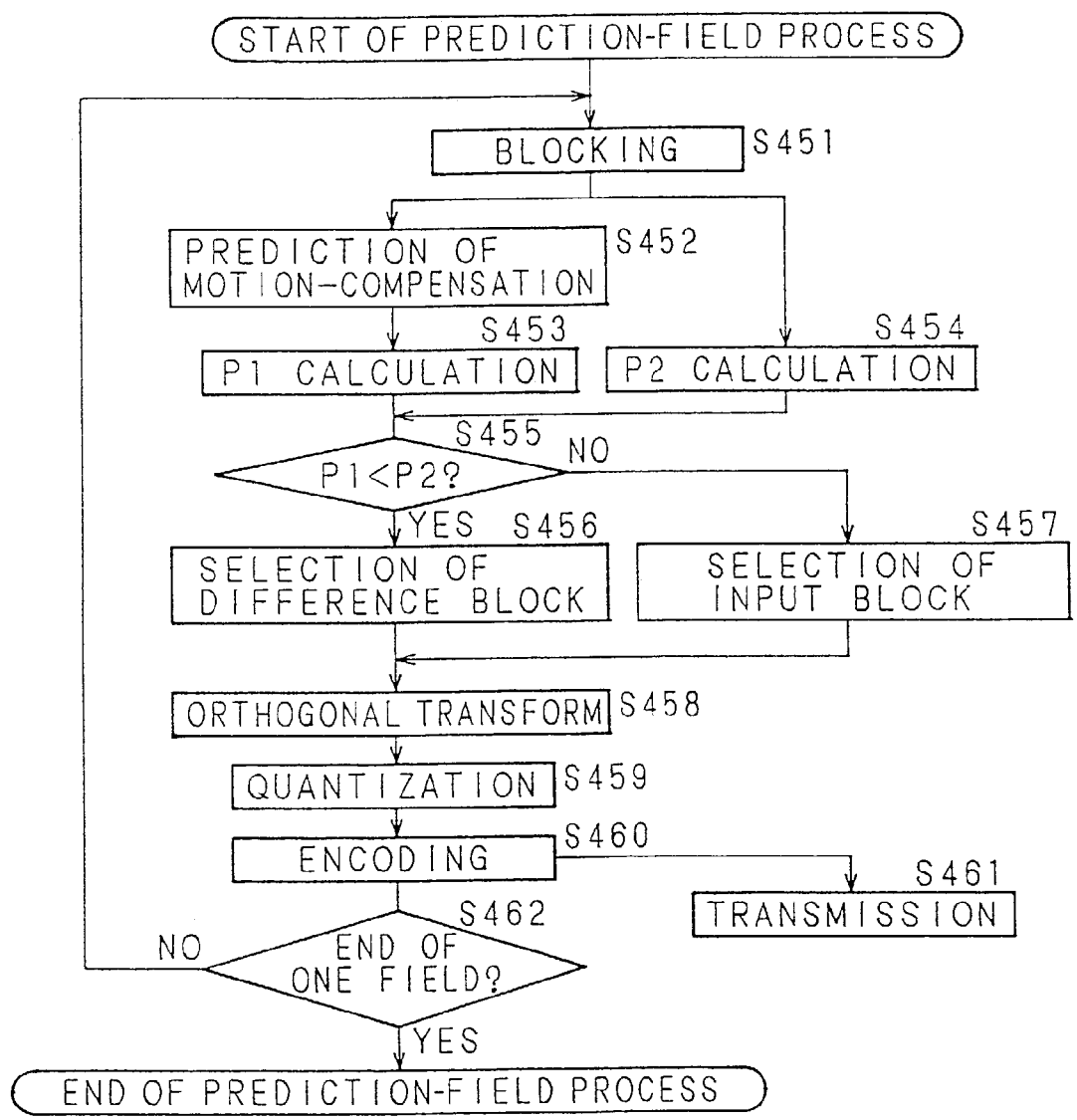
FIG. 44 is a flowchart of a prediction-field process in FIG. 43.

The operation in Embodiment 10 will be summarized with reference to flowcharts of FIGS. 43 and 44. FIG. 43 is a flowchart showing the whole operation in Embodiment 10, and FIG. 44 is a flowchart of the prediction-field process in step S406 in FIG. 43.

At first, the field number indicative of a field in a motion-compensation prediction process unit is set to be 0 (step S401). This setting of the field number is the same as that in Embodiment 3. Since the motion-compensation process has been just started, the field to be initially processed is surely the first field in the motion-compensation prediction process unit and an intra-field, and therefore the field number fn is set in step S401 to be 0. A scene change detection flag Cfn which functions as a flag for judging whether a scene change is present is set in step S401 to be 0 for the initialization.

Then, the characteristics of an input image are compared with those of a past image by a certain parameter to detect the presence of a scene change (step S402). For example, the presence of a scene change is detected by comparing the variance of values of pixels in some predetermined areas of the past image with the variance of values of pixels in some predetermined areas of the currently processed image. When a scene change is detected, the scene change detection flag Cfn is set to be 1 (Cfn=1), and, when a scene change is not detected, the scene change detection flag Cfn is set to be 0 (Cfn=0).

Then, the field number fn is checked to judge whether it is 0 or the field is the first field in the motion-compensation prediction process unit and an intra-field (step S403). If the field number fn is 0 (fn=0), this field is processed as an intra-field (step S405). In contrast, if the field number fn is not 0 (fn≠0), the process proceeds to next step S404. It is judged whether the scene change detection flag Cfn is 0 (Cfn=0) or there is a scene change between the processed field and the reference picture required for encoding the field with motion-compensation prediction (step S404). If the flag Cfn is 0 (Cfn=0), there is no scene change, and the field to be processed is processed as a prediction-field (step S406). If the flag Cfn is 1 (Cfn=1), there exists a scene change, and therefore the field to be processed is processed as an infrafield (step S405). Therefore, even in the case that a field is in the motion-compensation prediction process unit and the field number is not 0, when a scene change is detected and the flag Cfn is 1, the field is processed as an intra-field.

After each field is processed, the field number fn is incremented so as to indicate the next field (step S407). In an actual hardware, such a field number can be controlled by a signal from a microcomputer or the like.

It is then judged whether the field number fn indicating the next field is a number indicating a field within the motion-compensation prediction process unit (step S408). If the field number fn is a number not indicating a field within the motion-compensation prediction process unit, for example, in FIG. 4 (if fn=4, FIG. 4), it indicates that a series of motion-compensation prediction process units have been completed because, the motion-compensation prediction process unit has been completed within four fields and the field number fn of an intra-field has been set to be 0. If fn<4, it is judged that the next field is within the motion-compensation prediction process unit, and the process is restarted from the scene change detection for the next field process. When the motion-compensation prediction process unit has been completed, it is judged whether all of the required fields have been processed (step S409). This judgment can be done by, for example, checking the operation of an end switch of the high-efficiency encoder. If the next field is to be processed, in order to encode the next motion-compensation prediction process unit, the variables are initialized, and the process is restarted from the scene change detection. If the operation of the high-efficiency encoder is completed, is ended.

Next, the prediction-field process (step S406 in FIG. 43) in Embodiment 10 will be described with reference to the flowchart of FIG. 44. The field which has been determined in step S404 in FIG. 43 to be processed as a prediction-field is blocked into a predetermined size of m [pixels]×n [lines] in the processed field (step S451). The blocks segmented into the size of m×n are subjected to motion-compensation prediction (step S452). The difference power P1 is calculated from a difference block which is the difference in the unit of pixel between a predetermined area of a past image and the block which has been just segmented (step S453). The original AC power P2 kept in the state of the block is calculated (step S454).

The calculated powers P1 and P2 are compared in magnitude with each other (step S455). When the difference power P1 is smaller than the original AC power P2, the difference block (the difference value of the block subjected to motion-compensation prediction) is selected (step S456). When the difference power P1 is greater than the original AC power P2, the input block (the original which has been blocked and not subjected to any further process) is selected (step S457). Each selected block is subjected to the orthogonal transform (step S458), and the quantized to a predetermined bit number which is set for each sequence (step S459). In an orthogonal transform such as DCT, for example, a quantization is performed in such a manner that a larger bit number is assigned to a DC and low-order sequences of AC, and a smaller bit number is assigned to a high-order sequence of AC. The quantized data are converted into codes suitable for transmission (step S460), and the encoded data are transmitted (step S461). It is judged by, for example, counting the number of processed blocks whether the process of one field has been completed (step S462). If the process of one field has not yet been completed, the process for the next block is pursued. If the process of one field has been completed, the prediction field process is ended.

According to Embodiment 10, when a scene change occurs in a motion-compensation prediction step as shown in FIG. 42, the field immediately after the scene change is set to be an intra-field, whereby a subjective appreciation of the image immediately after the scene change can be improved.

Embodiment 11

In Embodiment 10, even when a scene change occurs in a step of a motion-compensation prediction process and the field immediately after the scene change is set to be an intra-field, the time-constraint length in the motion-compensation prediction processing step is fixed for four fields. Namely, an intra-field surely appears every four fields once the motion-compensation prediction process starts, and, when a scene change occurs, an intra-field exists also in the motion-compensation processing step. This is a configuration in which a prediction-field is replaced with an intra-field.

According to Embodiment 11, when a scene change occurs as shown in FIG. 45 and the field immediately after the scene change is set to be an intra-field, the intra-field is set to be the first field in the motion-compensation prediction process unit. That is, the time-constraint length in the motion-compensation prediction step is variable. Usually, the time-constraint length in the motion-compensation prediction step is set for four fields as shown in FIG. 45. When a scene change occurs in the motion-compensation prediction step, the field immediately after the scene change is set to be a new intra-field, and motion-compensation prediction is performed in the unit of four fields beginning with that field. When a scene change occurs in this motion-compensation prediction step, the field immediately after this scene change, is set in a similar manner to be a new intra-field, and motion-compensation prediction is performed in the unit of four fields beginning with that field.

Figure 46:
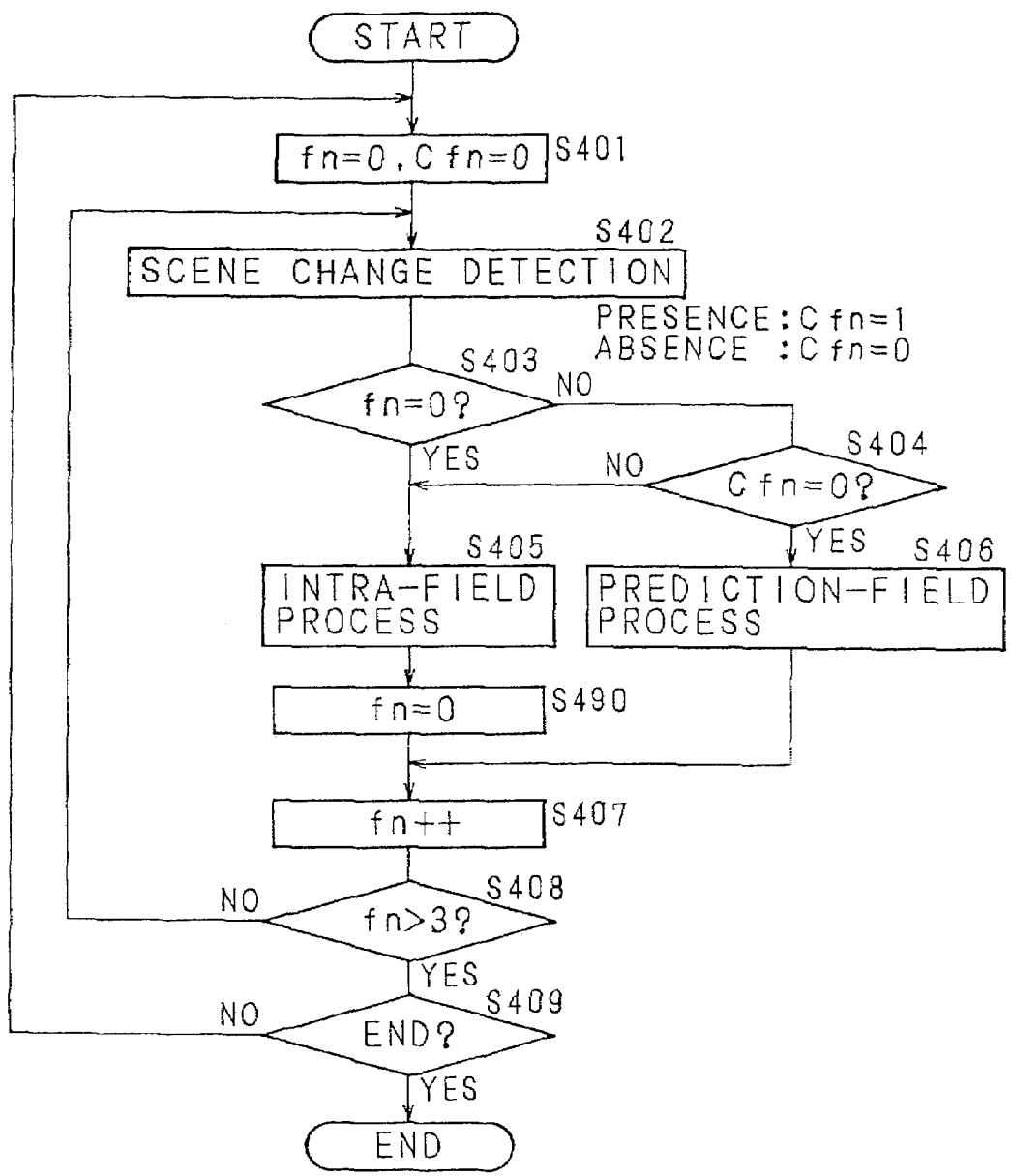
FIG. 46 is a flowchart of another operation of the high-efficiency encoder of FIG. 40.

FIG. 46 is a flowchart showing the whole operation in Embodiment 11. In FIG. 46, portions designated by the same step numbers used in FIG. 43 are identical with those in FIG. 43. The processes from step S401 to step S406 are the same as in Embodiment 10. The intra-field process and prediction-field process in steps S405 and S406 are the same as in Embodiment 10. With respect to a field which has been processed as an intra-field in step S405, the field number fn is set to be 0 (fn=0) in order to switch to the motion-compensation prediction process unit in which the first field is that processed field (step S490). In Embodiment 10, even when a field is processed as an intra-field, for example, the field number fn is sequentially changed in the order of 0→1→2→3→0→ . . . as shown in FIG. 45. In Embodiment 11, when a field which is not the first field in the motion-compensation prediction process unit is processed as an intra-field, the field number fn of that field is forcedly set to be 0, and that field is set to be the first field of the new motion-compensation prediction process unit. This allows the time-constraint length in the motion-compensation prediction process unit to be variable. When scene changes occur at a frequency shorter in terms of time than the time-constraint length in the motion-compensation prediction process unit which is set at that time, the time-constraint length in the motion-compensation prediction process unit becomes a series of short lengths. The processes from step S407 to step S409 are the same as in Embodiment 10.

According to Embodiment 11, the image immediately after the scene change is set to be an intra-field, thereby improving a subjective appreciation of the image. When the frequency of the occurrence of scene changes is longer than the time-constraint length in the motion-compensation prediction process unit and is low in level, the number of fields of an intra-field is smaller than that in Embodiment 3 so that the information amount can be reduced.

Embodiment 12

In Embodiments 10 and 11, a process is performed while setting a field (or frame), in which a scene change is detected, to be an intra-field (or intra-frame). Alternatively, without setting as an intra-field (or intra-frame), the reference picture of the field (or frame) may be set to be intra-field (or intra-frame) belonging to the next motion-compensation prediction process unit.

Figure 47A:
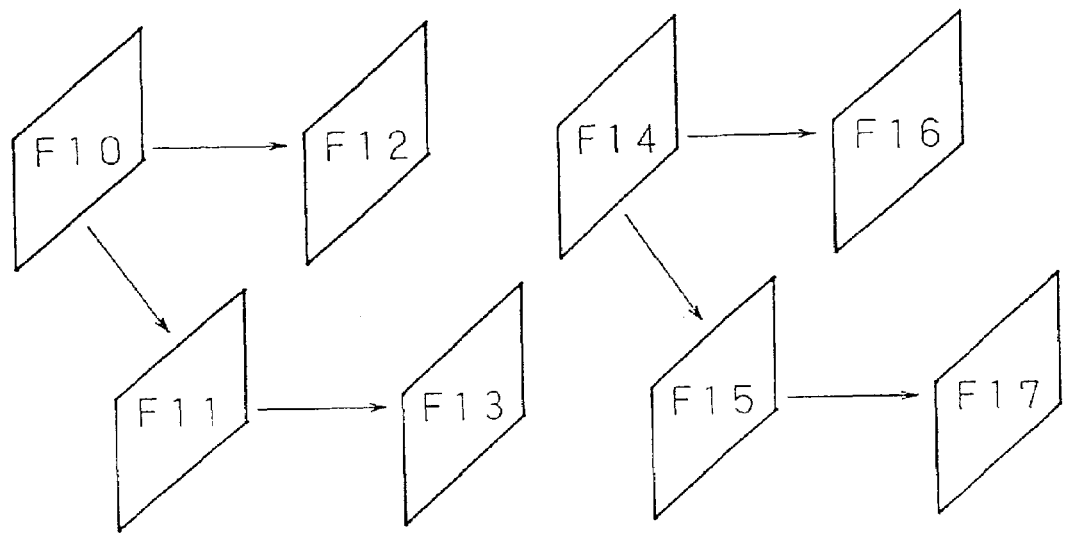
FIGS. 47A and B is a diagram showing the relationship between fields in a motion-compensation prediction process.
Figure 47B:
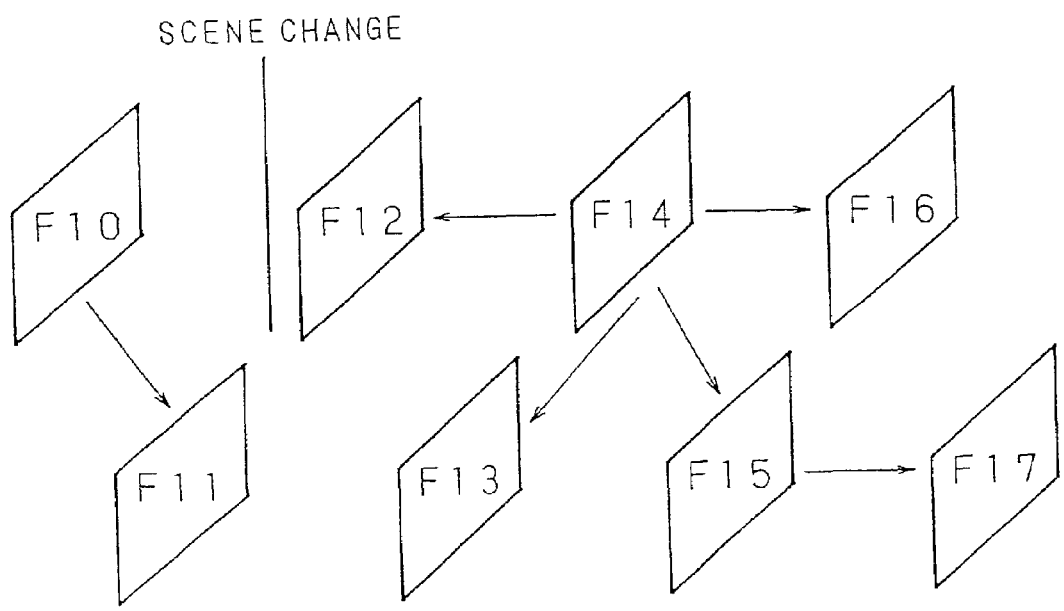

Embodiment 12 will be described with reference to FIG. 47. FIG. 47(a) shows a usual motion-compensation prediction process which is performed by the method in FIG. 4. In this example, fields F10 and F14 function as an intra-field. The motion-compensation prediction is performed while setting these fields F10 and F14 to be the first field of the motion-compensation prediction process unit. Then, when a scene change occurs between field F11 and field F12 as shown in FIG. 47(b) and the scene change is detected in field F12, fields from field F12 to the last field (in this example, field F13) of the motion-compensation prediction process unit including field F12 are combined with the next motion-compensation prediction process unit, and fields F12 and F13 are subjected to motion-compensation prediction in which an intra-field belonging to the next motion-compensation prediction process unit is used as the reference picture. In the next motion-compensation prediction process unit combined with those fields, a normal motion-compensation prediction and the motion compensation prediction for the combined field as above are performed.

Embodiment 13

In Embodiment 12, the motion-compensation prediction process unit is sometimes longer than the usual one. According to Embodiment 13, P fields (or P frames) which begin with a field (or frame) wherein a scene change is detected and have the total length corresponding to the length of a usual motion-compensation prediction process unit are subjected to motion-compensation prediction.

Figure 48A:
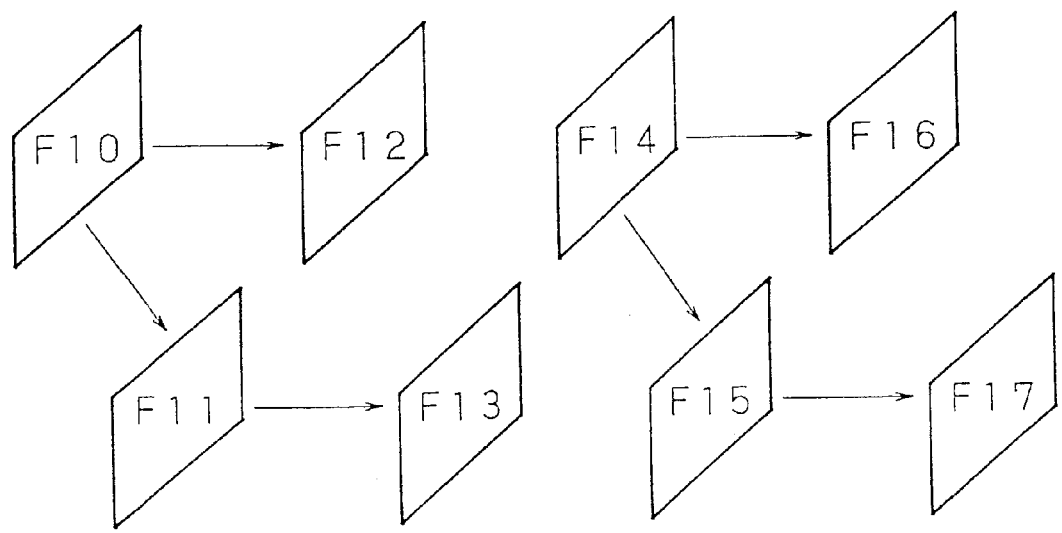
FIGS. 48A and B is a diagram showing the relationship between fields in a motion-compensation prediction process.
Figure 48B:
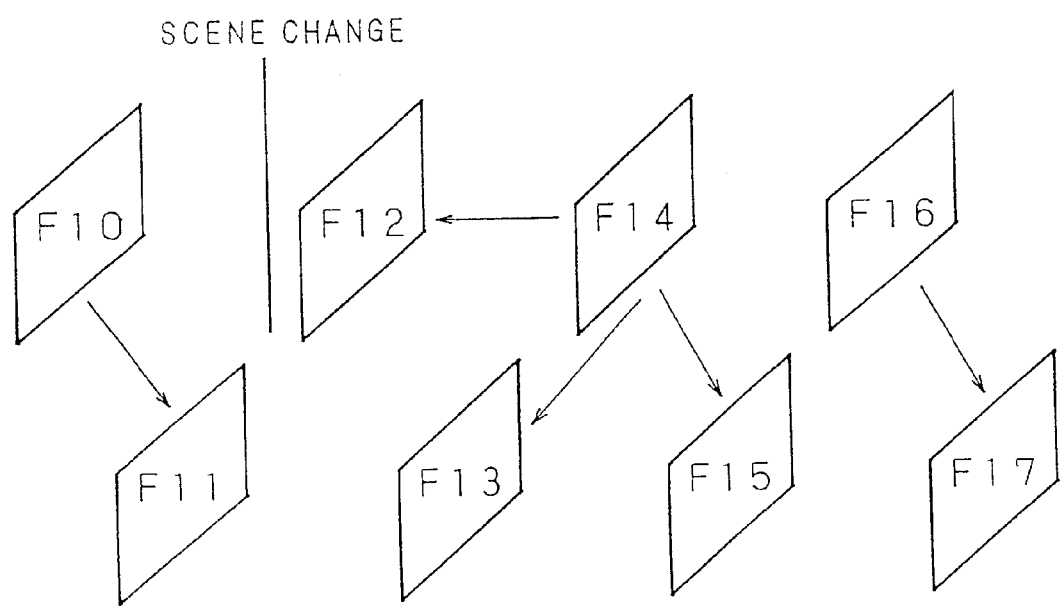

Embodiment 13 will be described with reference to FIG. 48. FIG. 48(a) shows a usual motion-compensation prediction process which is performed by the method in FIG. 4. In this example, fields F10 and F14 function as an intra-field. While setting these fields F10 and F14 to be the first field of a motion-compensation prediction process unit, motion-compensation prediction is performed. Then, when a scene change occurs between field F11 and field F12 as shown in FIG. 48(b) and the scene change is detected in field F12, a series of four fields (this is because a motion-compensation prediction process unit consists of four fields) which begins with field F12 wherein the scene change is detected are formed into a motion-compensation prediction process unit. Field F14 which, in a usual case, may be the first field of the next motion-compensation prediction process unit and an intra-field is set to be an intra-field in the current motion-compensation prediction process unit, and then motion-compensation prediction is performed. When motion-compensation prediction for four fields beginning with field F12, or that for fields F12 to F15 is completed, the usual motion-compensation prediction restarts at field F16 as it was before.

Embodiment 14

In Embodiments 3 to 13, a switching is explained with reference to a scene change. A reference picture may be switched in accordance with the number of intra modes which have been forcedly generated in blocks. Accordingly even in a picture wherein many forcible intra modes appear, or in a case that an object which has not existed in one field before appears suddenly in the current field or an object which has existed in one field before disappears suddenly from the current field, a reference picture can be switched by a similar method.

Embodiment 15

Figure 49:
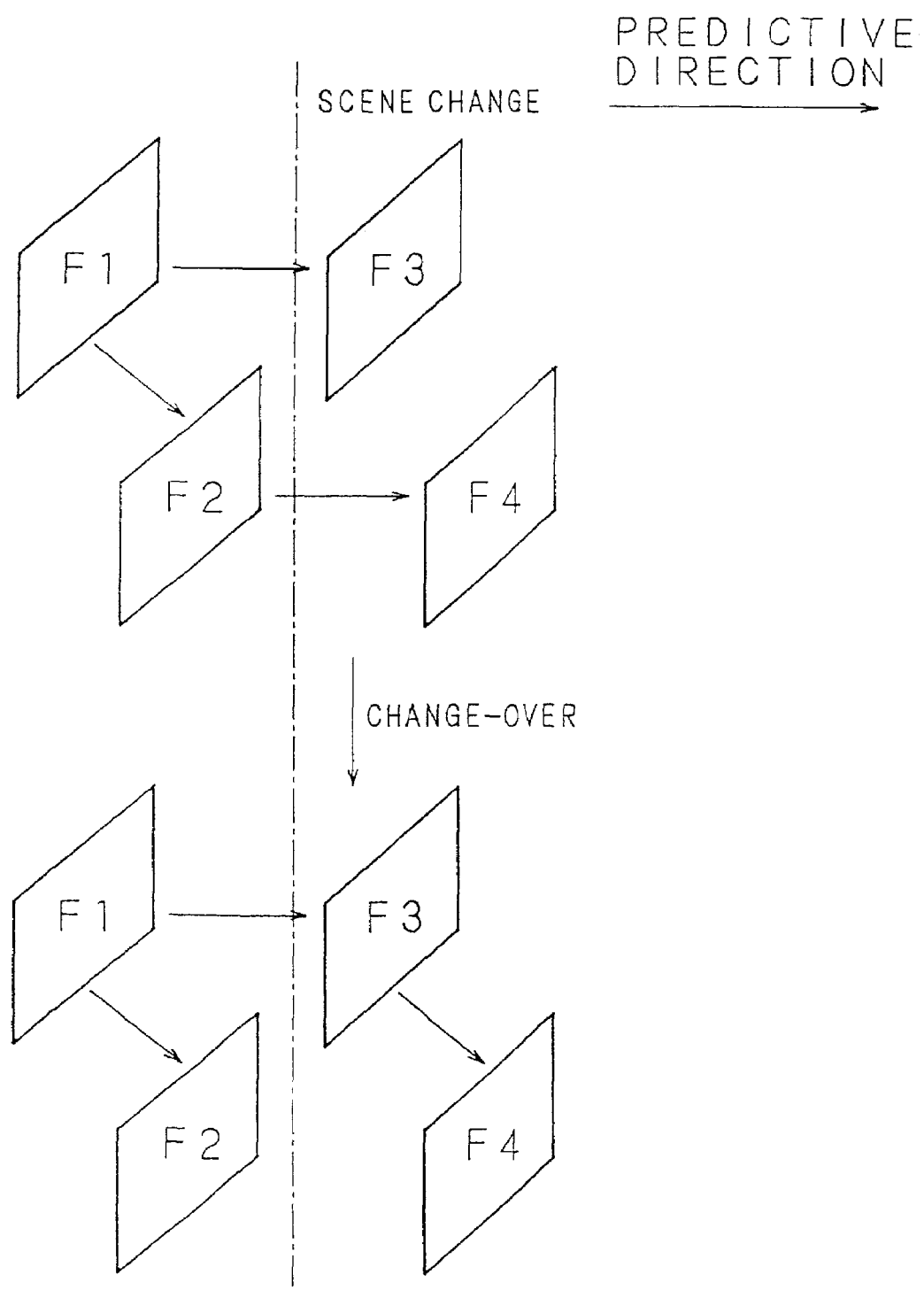
FIG. 49 is a diagram showing the switching of a reference picture.

In Embodiments 3 to 13, for example, a process in which motion-compensation prediction as shown in FIG. 4 is performed is switched to a process in which motion-compensation prediction as shown in FIG. 28 is performed. Before the switching, motion-compensation prediction of any kind may be performed as shown in FIG. 49. After the detection of a scene change or the like, the process is switched to motion-compensation prediction in which the generated information amount is reduced to a level lower than that before the switching as shown in FIG. 28.

Embodiment 16

In Embodiments 3 to 15, the motion-compensation prediction process is performed in the unit of four fields. The number of fields which may be used as the unit is not necessarily four. The process may be performed in the unit of an arbitrary number of fields on which the motion-compensation prediction process can be performed.

According to Embodiments 3 to 16, without largely increasing the memory amount by additionally providing a hardware as described above, even when a scene change occurs in the motion-compensation prediction process unit, a reference picture is switched from the originally set reference picture so as to minimize the influence caused by the scene change, etc., the image immediately after the scene change is set to be a reference picture for motion-compensation prediction, and, after the detection of the scene change, fields before the scene change are not used as the reference picture for motion-compensation prediction, whereby transmission can be done while suppressing the increase of the code amount due to the scene change to a minimum and without deteriorating the image quality.

When motion-compensation prediction is performed before and after a scene change, the information amount of the predicted picture is usually increased. Therefore, by processing the field as an intra picture with an information amount equal to that information amount, a subjective appreciation of the picture can be improved. While setting a picture immediately after a scene change as an intra picture by detecting the scene change, encoding between fields or frames can be performed so that a subjective appreciation of the picture immediately after the scene change can be improved. When a scene change occurs, the picture immediately after the scene change is handled as an intra picture, and motion-compensation prediction is performed with the intra picture being the first picture, whereby the number of generated intra pictures can be reduced and the amount of generated information can be reduced.

Embodiment 17

Figure 23:
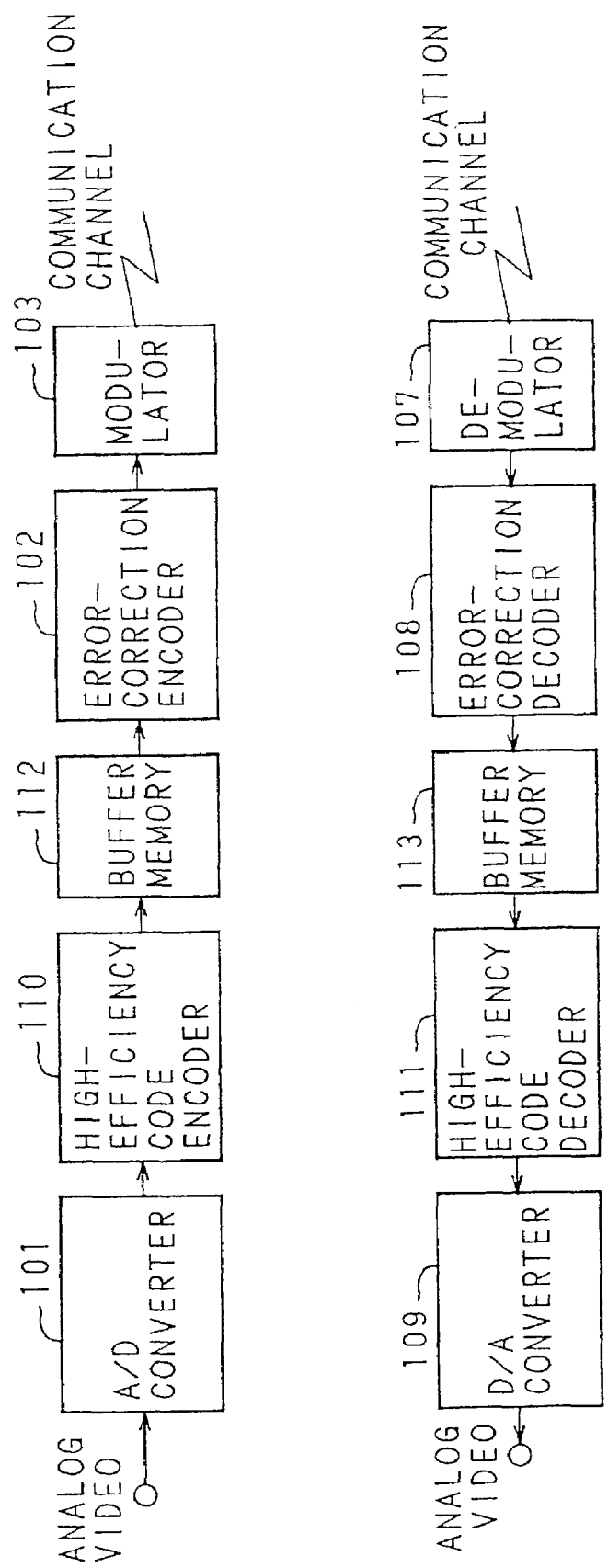
FIG. 23 is a block diagram showing the configuration of a communication apparatus of a high-efficiency encoded video information compression method.
Figure 24:
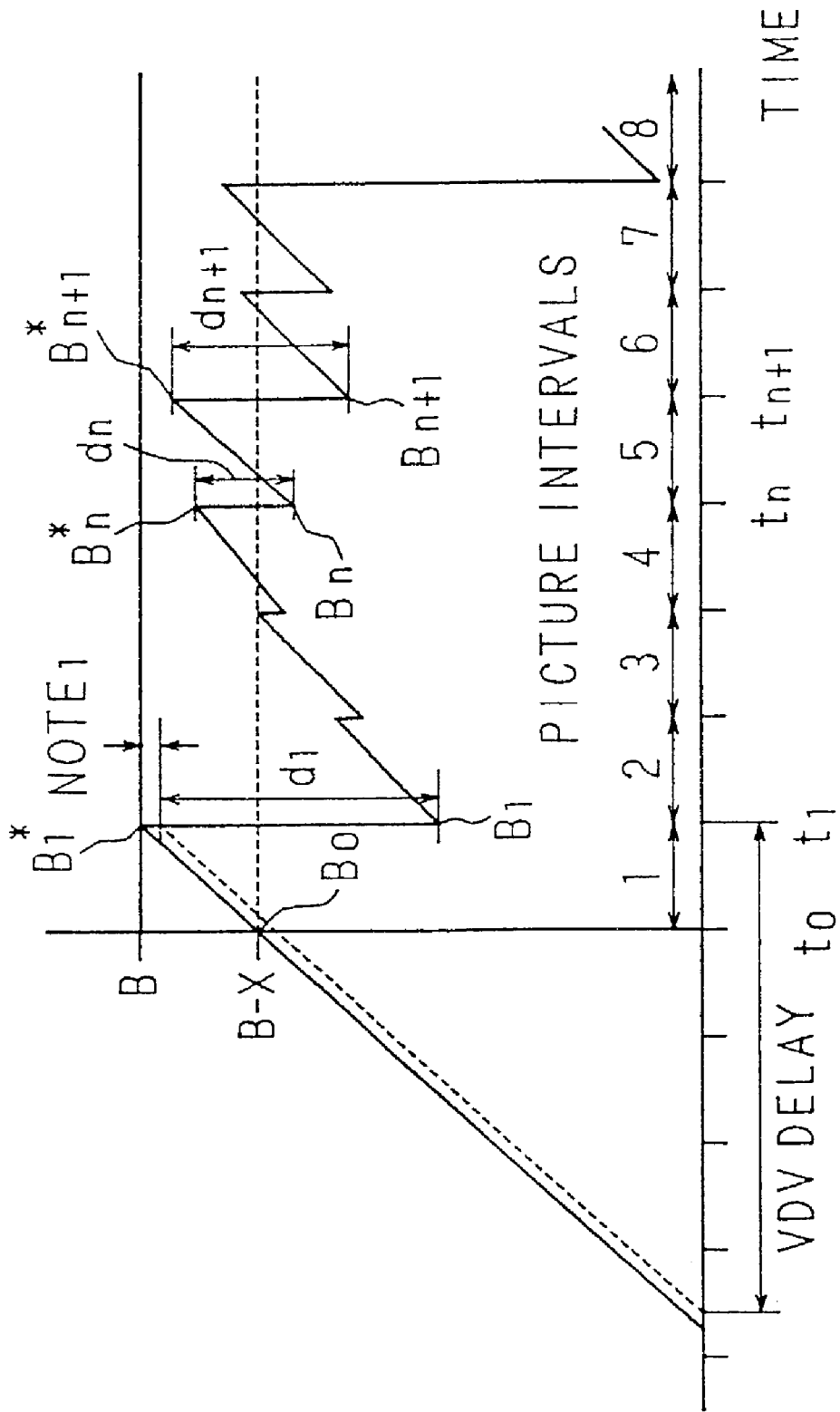
FIG. 24 illustrates the buffer operation of the high-efficiency code communication apparatus.

FIG. 50 is a block diagram showing the configuration of a video information recording/reproducing apparatus according to the invention. In FIG. 50, the reference numerals 101 to 111 are the same as those used in the conventional apparatus in FIG. 17 or 23.

The recording operation will be described. A video signal input to the A/D converter 101 is converted into a digital video signal, and output to the high-efficiency encoder 110. The high-efficiency encoder 110 performs the reduction of redundancy using auto-correlation of the video information, the human visual characteristics and the bias of the data generation frequency, to compress the information (its detail will be described later). The output of the high-efficiency encoder 110 is supplied to the error-correction encoder 102 in which error-correcting codes for correcting transmission errors are added to it. In this process, codes having a high error correction capability and a small information amount to be added are used, in order to perform a high-density recording and because even a small error in compressed information exerts an influence over a wide range. The data to which error-correcting codes have been added are modulated by the modulator 103 to a signal suitable for magnetic heads 106 and the magnetic tape 105. The modulator 103 also performs other operations such as suppression of DC and low-frequency components for the azimuth recording, and the addition of a tracking signal which assists the trace function of the magnetic heads 106. The record signal which has been modulated by the modulator 103 is recorded through the magnetic heads 106 on the magnetic tape 105. The magnetic heads 106 are mounted on the rotary head drum 104 so as to be rotated by the rotation of the drum 104. The so-called helical scanning recording is conducted on the magnetic tape 105.

Next, the reproduction operation will be described. The signal which has been recorded by the helical scanning on the magnetic tape 105 is picked up by the magnetic heads 106 mounted on the rotary head drum 104, and then demodulated by the demodulator 107. The demodulated signal is subjected to the error detection and error correction by the error-correction decoder 108. The error-corrected data are expanded by the high-efficiency decoder 111 to be changed from the compressed codes to the original digital video signal. The reconstructed digital video signal is converted to an analog video signal by the D/A converter 109, and then output.

Figure 51A:
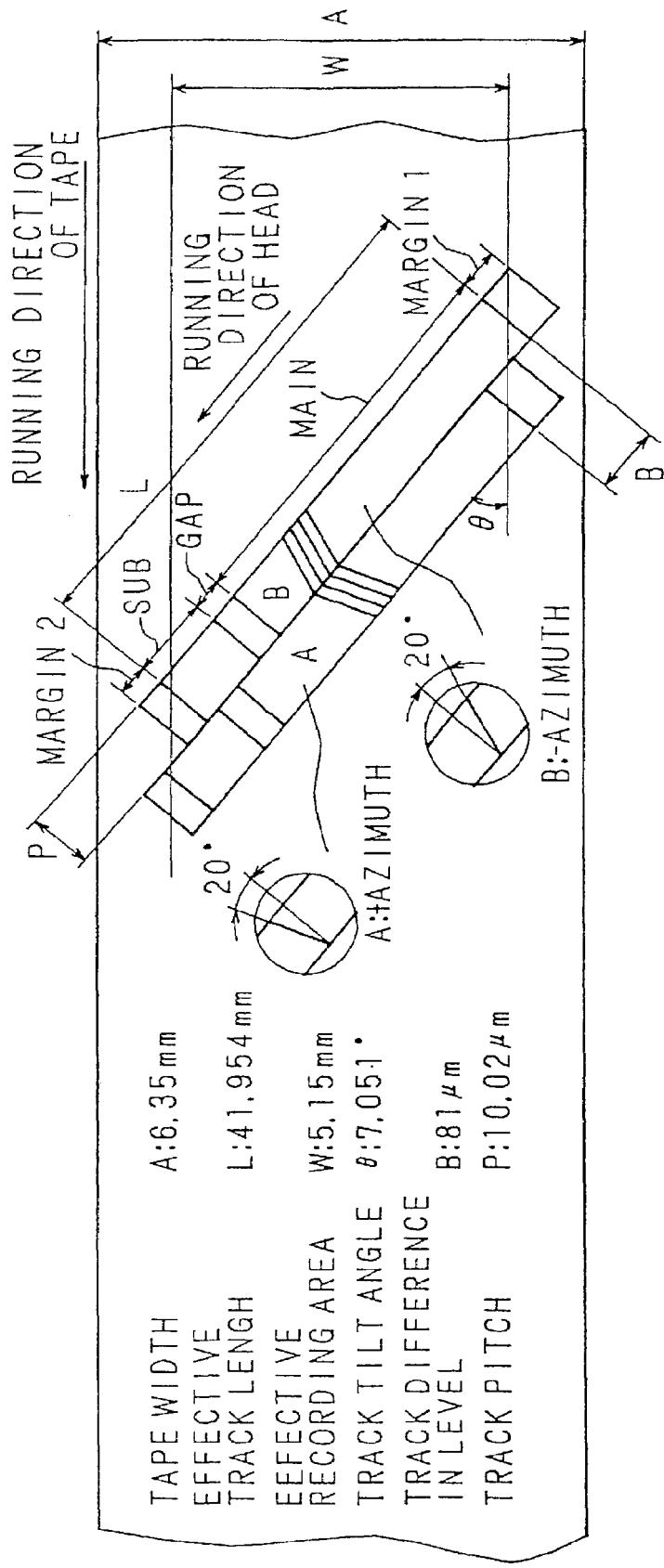
FIGS. 51A and B is a diagram showing an example of the tape format according to the invention.

FIG. 51 is a diagram showing an example of the tape format in Embodiment 17. Video information of four fields ({720+360×2}×480×4/2=11.06 Mbits) is compression-encoded to about 1.3 Mbits and then recorded together with an audio signal and error correction codes in ten tracks. In the guardbandless recording using the azimuth method, the area recording density is 2.5 $\mu m^2$/bit.

Figure 52:
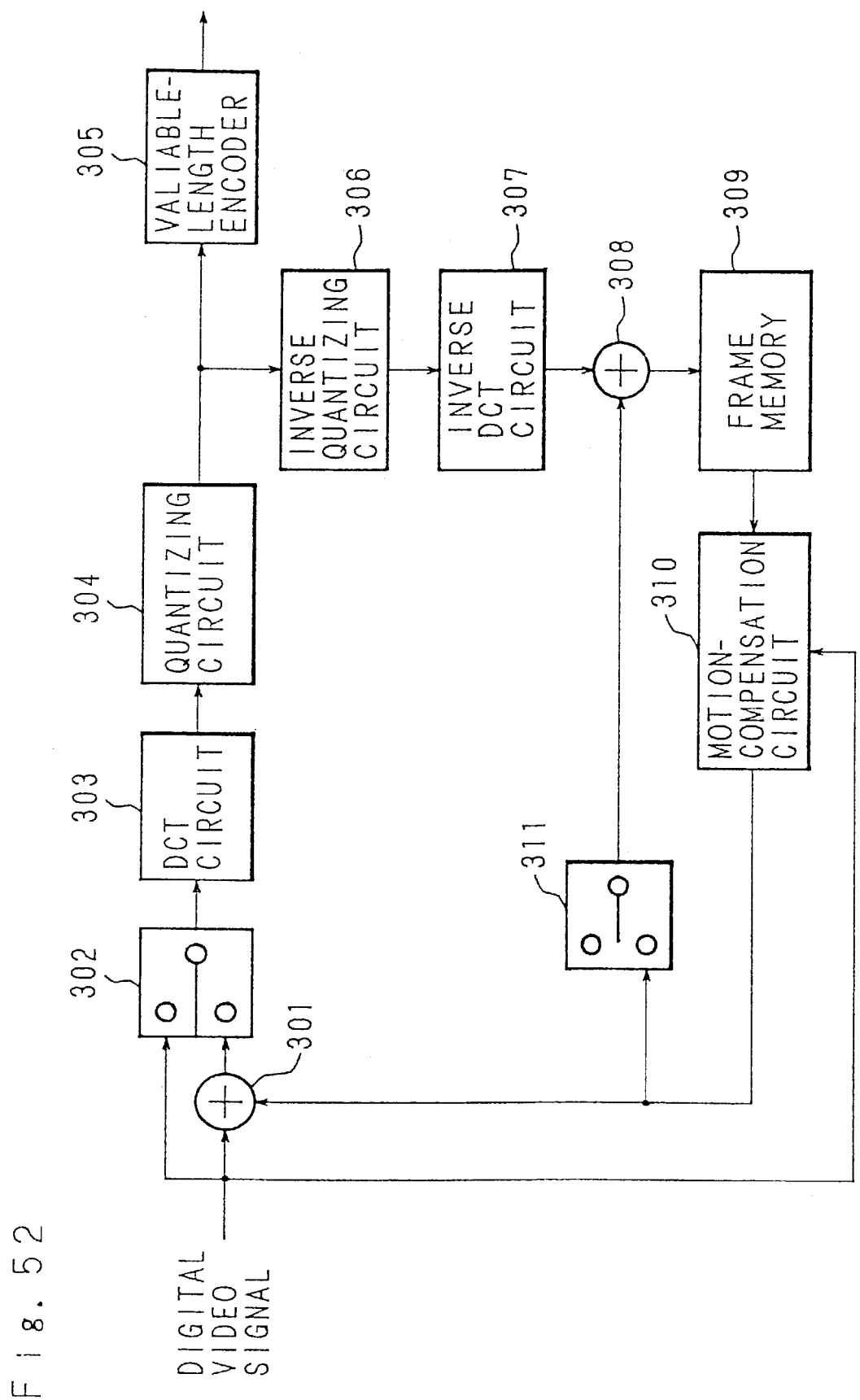
FIG. 52 is a block diagram showing the internal configuration of the high-efficiency encoder shown in FIG. 50.

FIG. 52 is a block diagram showing the internal configuration of the high-efficiency encoder 110 in FIG. 50. In FIG. 52, 301 designates a subtracter which outputs the difference between an input original signal and a prediction signal, 302 designates a first switch which selects either of the input original signal and the output of the subtracter 301, 303 designates a DCT circuit which performs the orthogonal transform of DCT, 304 designates a quantizing circuit which quantizes data to be encoded, and 305 designates a variable-length encoder which assigns a short code to a data of a high frequency so as to eliminate the statistical redundancy of data. The elements 306 to 311 constitute a local decoder for obtaining a prediction signal. The reference numeral 306 designates an inverse quantizing circuit which restores the quantized data, 307 designates an inverse DCT circuit which performs the inverse DCT, 308 designates an adder which adds the prediction signal to the difference signal to reconstruct the original signal, 309 designates a video memory which stores local-reconstructed video data, 310 designates a motion-compensation circuit which detects motion from the input original signal and outputs the next prediction data, and 311 designates a second switch which switches data to be input to the adder 308.

The operation of the high-efficiency encoder 110 will be described. The initial field of a recording unit block is encoded as an intra-field which does not use the inter-plane prediction. Since the first switch 302 selects the upper contact, an input digital video signal is subjected to orthogonal transform by the DCT circuit 303. The transformed data are quantized by the quantizing circuit 304, and encoded by the variable-length encoder 305 to a variable-length code such as a Huffman code, to be output. At the same time, the quantized data are inverse-quantized by the inverse quantizing circuit 306, and then supplied to the inverse DCT circuit 307. In the inverse DCT circuit 307, the orthogonal-transformed data are inverted to the original video data and then output to the adder 308. In the intra-field, the second switch 311 also selects the upper contact so that the one input of the adder 308 is zero. Therefore, the output of the inverse DCT circuit 307 is supplied as it is to the video memory 309 to be stored thereinto.

In encoding of the next field, interplane prediction is used. In interplane prediction, both the first and second switches 302 and 311 select their lower terminal. An input digital video signal enters the subtracter 301 and motion-compensation circuit 310. The motion-compensation circuit 310 compares the stored picture with the input picture, and outputs motion vectors of the input picture and a prediction picture to be used in the predictive encoding. The subtracter 301 calculates the difference between the input picture and the prediction picture, and output it as a prediction difference signal to the DCT circuit 303. Compared with a raw video signal, a prediction difference signal has a smaller information amount as the prediction accuracy becomes higher. For example, a prediction difference signal for an entirely still picture is zero. In the same manner as the initial field, the data input to the DCT circuit 303 are subjected by the DCT circuit 303 and quantizing circuit 304,to the orthogonal transform and quantization, and then converted into variable-length codes by the variable-length encoder 305 to be output. On the other hand, the quantized data are supplied through the inverse quantizing circuit 306 to the inverse DCT circuit 307 to be subjected to the inverse quantization and inverse orthogonal transform, and then sent to the adder 308. Since the prediction picture used in the process of obtaining the prediction difference is supplied to the other input terminal of adder 308, the output of the adder 308 is the same as the input picture. The output of the adder 308 is stored into the video memory 309. In the same manner as described above, the process of encoding n fields is pursued.

Figure 53:
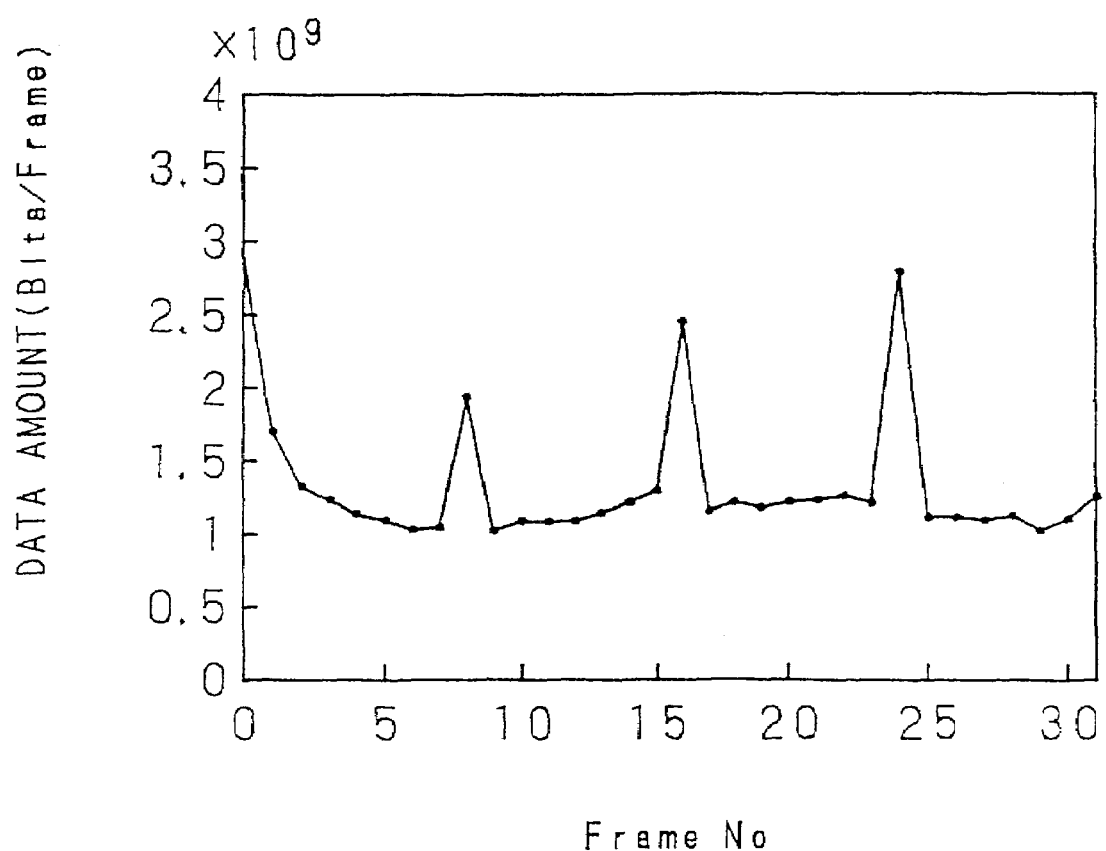
FIG. 53 is a graph showing an example of the variation of the amount of generated data for each frame.
Figure 54:
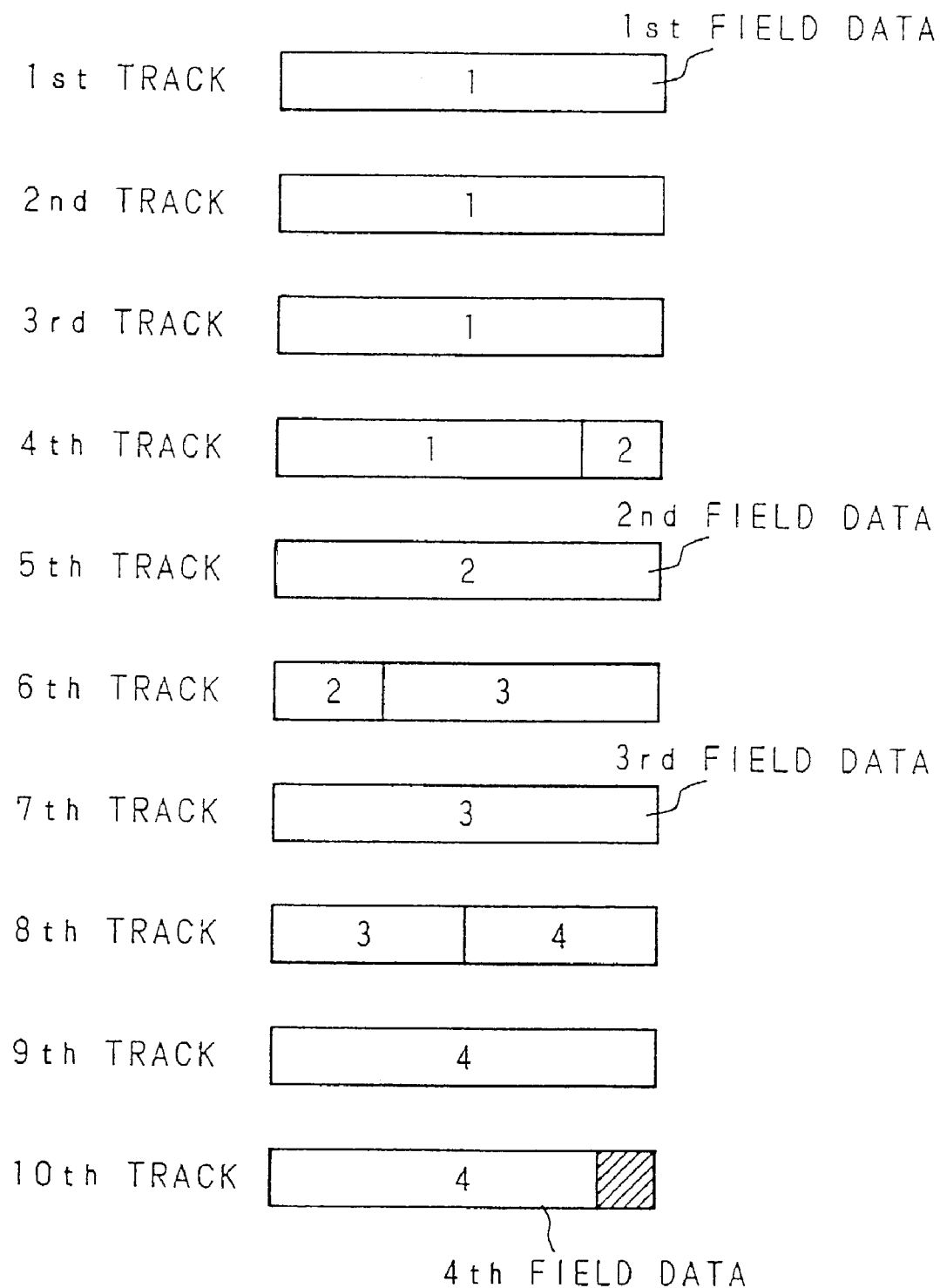
FIG. 54 is a diagram illustrating the relationship between recorded information in each field and the writing in tracks according to the invention.

FIG. 53 shows an example of the variation of the amount of generated codes for each frame. In this example, it will be noted that an intra-field which does not use the inter-plane prediction is placed after every seven fields, thereby increasing the information amount. FIG. 54 shows an example of the relationship between recorded information in each field and the writing in tracks. In this example, data of four fields are recorded in ten tracks. The data amount of one field may not be an integral multiple of the recording capacity of a track.

Embodiment 18

In Embodiment 17, data of four fields are recorded in ten tracks. It is not necessary to always record data in ten tracks, and data may be recorded in eight or six tracks depending on the amount of information to be recorded.

As described above, in Embodiments 17 and 18, since signals of a plurality of fields or frames are collected in one recording unit to be recorded in a predetermined number of tracks, all of the recorded fields can be reconstructed by performing reproduction processing on a predetermined number of tracks. Therefore, the embodiments can cope with the special reproduction and edition required in a VTR. Since the number of tracks to be used in the recording is selected depending on the amount of information to be recorded, there is no wasted track, thereby recording and reproduction can be performed for a long period. Furthermore, since it is not necessary to control information to be recorded so as to match the recording capacity of each track, there is no useless portion in each track, with the result being that recording can be performed efficiently. Moreover, since an intra-picture which does not use inter-plane prediction surely exists in each recording unit, a reconstructed picture can be easily obtained even in a special reproduction such as a speed search, and the amount of information to be recorded can be reduced as compared with a prediction picture which uses the interplane prediction.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A video information recording medium, including a plurality of recording segments of predefined length, said recording medium storing an encoded video signal including a plurality of video units, each of said video units comprising: an intra-field or an intra-frame obtained by encoding at least one field or one frame of the video signal of n fields or n frames, where n is an integer not less than 2, in an intra mode; and a prediction filed or a prediction frame obtained by encoding the other fields or frames of the video signal of n fields or n frames, in a prediction encoding mode using motion compensation prediction, with setting said intra-field or intra-frame as a reference image, wherein video unit is recorded in recording segments of an integral multiple number, in accordance with the total data amount in the respective recording video unit.

2. A video information recording medium of claim 1, wherein said recording segment is a track of the medium.

3. A video information reproducing apparatus for reproducing video information recorded in the video information recording medium of claim 1, comprising:

data accessing unit for reading the encoded video signal of video unit from the recording medium, by accessing a head of a recording segment which corresponds to a head of the recording video unit;

first decoding unit for extracting and decoding a video signal of a field or a frame encoded in the intra mode from the encoded video signal; and second decoding unit for decoding a video signal of a field or a frame encoded in the prediction encoding mode on the basis of the video signal decoded by the first decoding unit.

4. A video information reproducing method for reproducing video information recorded in the video information recording medium of claim 1, comprising the steps of:

reading the encoded video signal of video unit from the recording medium, by accessing a head of a recording segment which corresponds to a head of the recording video unit;

extracting and decoding a video signal of a field or a frame encoded in the intra mode from the encoded video signal; and decoding a video signal of a field or a frame encoded in the prediction encoding mode on the basis of the video signal obtained by decoding the video signal of a field or a frame encoded in the intra mode.

* * * * *